US012741385B2

(12) United States Patent
Bixby et al.

(10) Patent No.: US 12,741,385 B2
(45) Date of Patent: Sep. 22, 2026

(54) ROBOTIC LAUNDRY DEVICES AND METHODS OF USE

(71) Applicant: Monotony.ai, Inc., Watertown, MA (US)

(72) Inventors: Benjamin D. Bixby, Newton Highlands, MA (US); Samuel Duffley, Somerville, MA (US); Elliot Sinclair Pennington, Lexington, MA (US); Jesse Sielaff, Norfolk, MA (US); Wilson J. Mefford, Watertown, MA (US); Madeline R. Hickman, Arlington, MA (US)

( * ) Notice: Subject to any disclaimer, the term of this patent is extended or adjusted under 35 U.S.C. 154(b) by 55 days.

(21) Appl. No.: 18/908,963

(22) Filed: Oct. 8, 2024

(65) Prior Publication Data

US 2025/0083330 A1 Mar. 13, 2025

Related U.S. Application Data

(63) Continuation of application No. 18/321,339, filed on May 22, 2023, now Pat. No. 12,138,776, which is a
(Continued)

(51) Int. Cl.
*B25J 11/00* (2006.01)
*B25J 9/00* (2006.01)
(Continued)

(52) U.S. Cl.
CPC ........... *B25J 11/008* (2013.01); *B25J 9/0093* (2013.01); *B25J 9/161* (2013.01); *B25J 9/1682* (2013.01);
(Continued)

(58) Field of Classification Search
CPC ........ B25J 11/008; B25J 9/0093; B25J 9/161; B25J 9/1682; B25J 9/1697; B25J 13/08;
(Continued)

(56) References Cited

U.S. PATENT DOCUMENTS 4,885,853 A 12/1989 Mccabe
9,969,041 B2 5/2018 Endo et al.
(Continued)

FOREIGN PATENT DOCUMENTS

CN 103237937 A 8/2013
JP 2009279700 A 12/2009
(Continued)

OTHER PUBLICATIONS

Australian Examination Report No. 1 issued in corresponding AU 2021282368 on Mar. 3, 2026, (4 pages).
(Continued)

*Primary Examiner* — Basil T. Jos
(74) *Attorney, Agent, or Firm* — Myers Bigel, P.A.

(57) ABSTRACT

Methods and systems for spreading out and folding a suspended laundry article are described. A robotic system for spreading out and folding a laundry article includes at least three lifters disposed about a perimeter of a surface, two or more sensors disposed at fixed locations about the surface, and a controller in operative communication with the two or more sensors and the at least lifters. The controller is configured to receive output signals from the two or more sensors, determine whether the laundry article suspended by at least two lifters of the at least three lifters is spread out, and instruct, based on a determination of the laundry article being spread out, one or more of the at least three lifters to fold the spread out laundry article one or more times.

25 Claims, 53 Drawing Sheets

Related U.S. Application Data continuation of application No. 17/332,802, filed on May 27, 2021, now Pat. No. 11,738,467.

(60) Provisional application No. 63/168,555, filed on Mar. 31, 2021, provisional application No. 63/106,891, filed on Oct. 29, 2020, provisional application No. 63/106,829, filed on Oct. 28, 2020, provisional application No. 63/030,920, filed on May 28, 2020.

(51) Int. Cl.

| | |
|---|---|
| ***B25J 9/16*** | (2006.01) |
| ***B25J 13/08*** | (2006.01) |
| ***B25J 15/00*** | (2006.01) |
| ***B25J 18/02*** | (2006.01) |
| ***D06F 89/00*** | (2006.01) |
| ***G06F 18/2431*** | (2023.01) |
| ***G06V 10/82*** | (2022.01) |
| ***G06V 20/10*** | (2022.01) |

(52) U.S. Cl.

CPC ............. *B25J 9/1697* (2013.01); *B25J 13/08* (2013.01); *B25J 15/0028* (2013.01); *B25J 18/02* (2013.01); *D06F 89/00* (2013.01); *G06F 18/2431* (2023.01); *G06V 10/82* (2022.01); *G06V 20/10* (2022.01)

(58) Field of Classification Search

CPC ........ B25J 15/0028; B25J 18/02; B25J 9/045; B25J 15/0206; B25J 9/0084; B25J 9/1612; D06F 89/00; D06F 95/00; D06F 34/18; D06F 67/04; D06F 71/38; D06F 89/023; D06F 93/00; G06F 18/2431; G06V 10/82; G06V 20/10; G05B 2219/39571

See application file for complete search history.

(56) References Cited

U.S. PATENT DOCUMENTS

| | | | | |
|---|---|---|---|---|
| 10,435,836 | B2 | 10/2019 | Lundt et al. | |
| 2017/0073881 | A1 | 3/2017 | Bringewatt et al. | |
| 2018/0370737 | A1 | 12/2018 | Bringewatt et al. | |
| 2019/0390396 | A1* | 12/2019 | Kwak | D06F 89/00 |
| 2020/0224348 | A1 | 7/2020 | Yano et al. | |

FOREIGN PATENT DOCUMENTS

| | | | |
|---|---|---|---|
| JP | 2019041969 | A | 3/2019 |
| WO | 2017153511 | A1 | 9/2017 |
| WO | 2019137585 | A1 | 7/2019 |
| WO | 2020003127 | A1 | 1/2020 |

OTHER PUBLICATIONS

Hata, et al., "Robot system for cloth handling", Industrial Electronics, 2008, IECON 2008, 34th Annual Conference of IEEE, Nov. 10, 2008, 2008, 3449-3454.

European Examination Report corresponding to EP 21733670.0; date Nov. 12, 2024, (5 pages).

International Search Report and Written Opinion corresponding to PCT/US2021/034603; mailed Sep. 22, 2021, (15 pages).

Ambarita, H. , et al., "Performance and Characteristics of Heat Pump Clothes Drier", IOP Conference Series: Materials Science and Engineering, 180: 012027, 2017, (9 pages).

Clopema Certh , "Autonomous Active Recognition and Unfolding of Clothes using Random Decision Forests and Probabilistic Planning", YouTube video retrieved from: https://www.youtube.com/watch?v=YpD-ip6g5IY (Video Date: Feb. 3, 2014), (1 page).

Clopema Certh , "Autonomous Folding of Shorts—CloPeMa Robot", Complete Autonomous Folding of Shorts Starting from Random Configuration using the CloPeMa testbed YouTube video retrieved from: https://www.youtube.com/watch?v=mrh4TJK1gdQ (Video Date: Apr. 23, 2014), (1 page).

Jensen-Group , "Innovation", YouTube video retrieved from: https://www.youtube.com/watch?v=MZAilk2_vul (Video Date: Jul. 13, 2010), (1 page).

Le, Thuy-Hong-Loan , et al., "Application of a Biphasic Actuator in the Design of the CloPeMa Robot Gripper", Journal of Mechanisms and Robotics, 7(1), Feb. 2015, 011011-1-011011-8.

Le, Thuy-Hong-Loan , et al., "On the Development of a Specialized Flexible Gripper for Garment Handling", Journal of Automation and Control Engineering, 1(3), Sep. 2013, 255-259.

Maitin-Shepard, Jeremy , et al., "Cloth Grasp Point Detection based on Multiple-View Geometric Cues with Application to Robotic Towel Folding", YouTube video retrieved from: https://www.youtube.com/watch?v=gy5g33S0Gzo (Video Date: May 17, 2010), (1 page).

Triantafyllou, Dimitra , et al., "Visual Feature Extraction and Topological Analysis for Inferring the Configuration of Hanging Cloth", Retrieved from: https://www.iti.gr/iti/files/document/publications/02_ICCVIP2013.pdf, 2013, (6 pages).

Zhang, Yanda, et al., "Commercial Clothes Dryers—Codes and Standards Enhancement (CASE) Initiative For PY 2013: Title 20 Standards Development", Analysis of Standards Proposal for Commercial Clothes Dryers, California Energy Commission. Docket No. 12-AAER-2D, Jul. 2013, (57 pages).

* cited by examiner

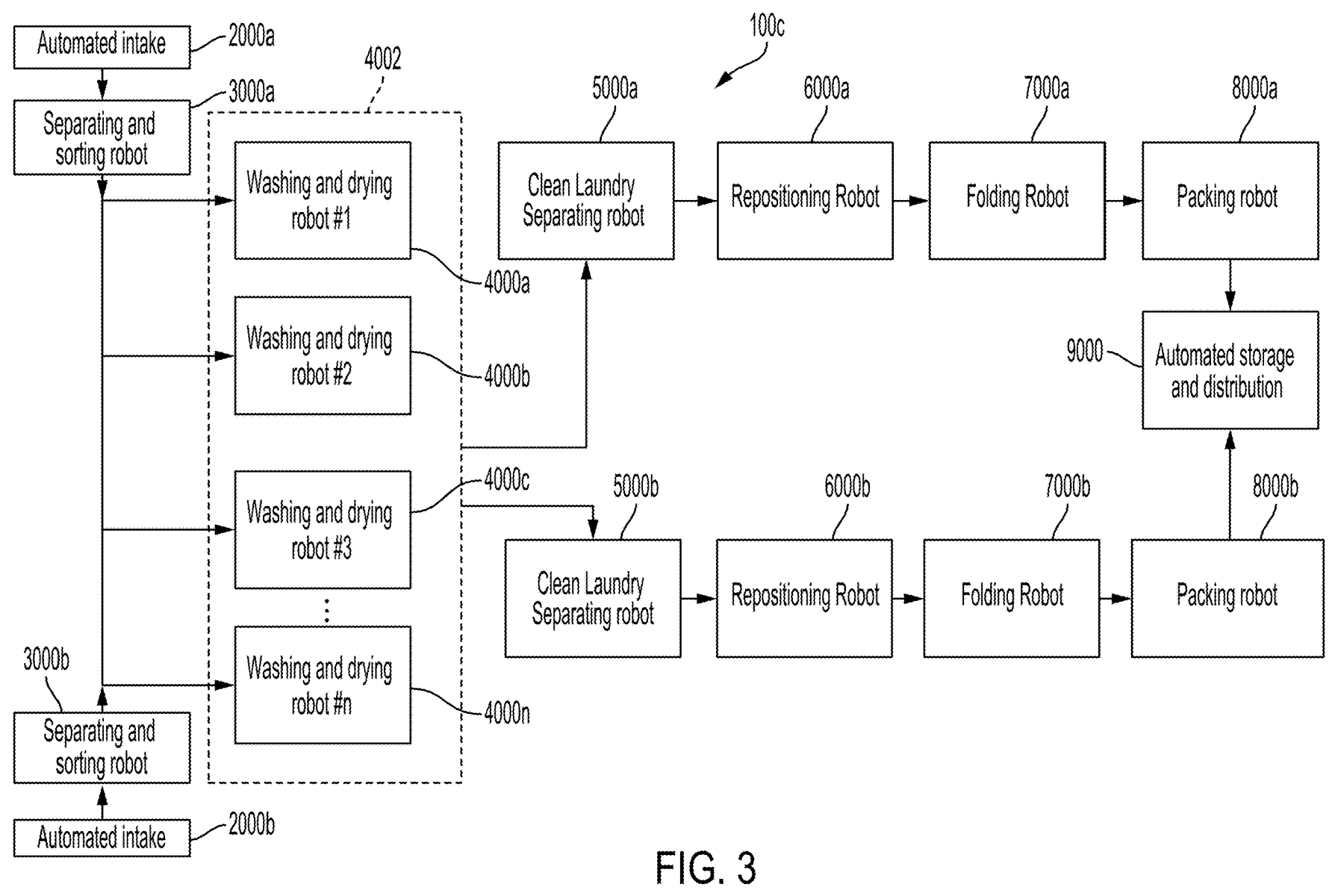

100c

2000a Automated intake

3000a Separating and sorting robot

4002

4000a Washing and drying robot #1

4000b Washing and drying robot #2

4000c Washing and drying robot #3

...

4000n Washing and drying robot #n

2000b Automated intake

3000b Separating and sorting robot

5000a Clean Laundry Separating robot

6000a Repositioning Robot

7000a Folding Robot

8000a Packing robot

9000 Automated storage and distribution

5000b Clean Laundry Separating robot

6000b Repositioning Robot

7000b Folding Robot

8000b Packing robot

FIG. 3

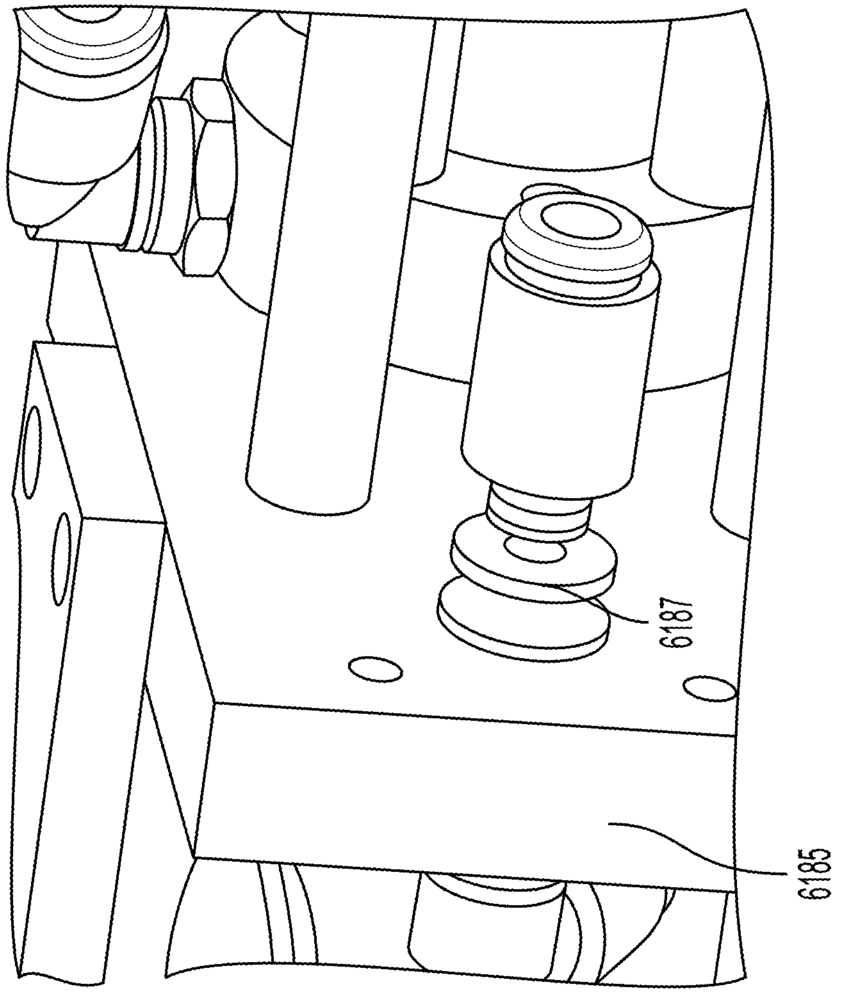
FIG. 15B
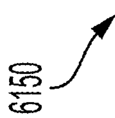

10
6105b
20b
20a
6105c
6105a
Z

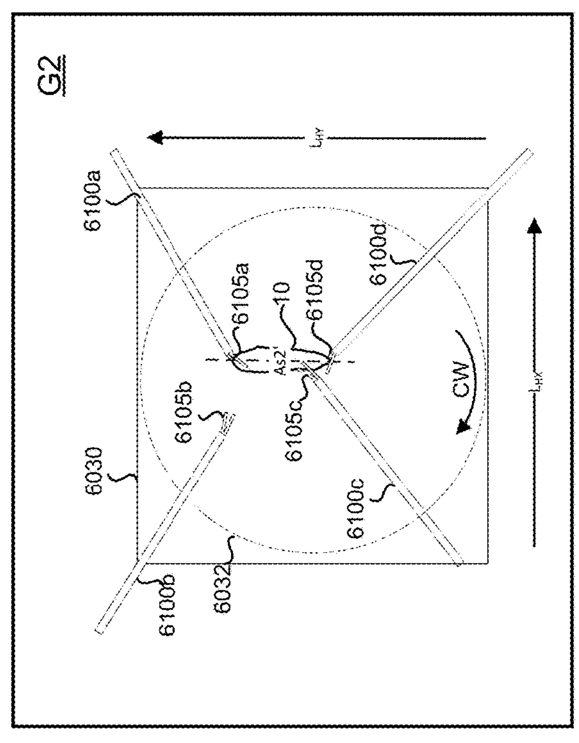
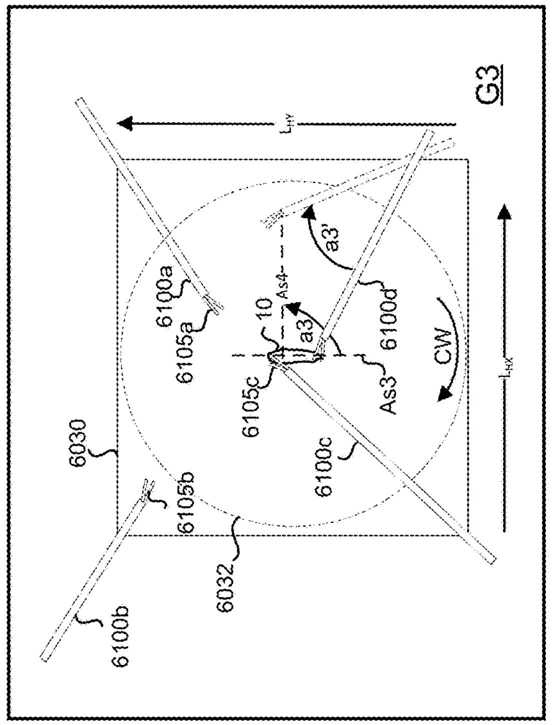
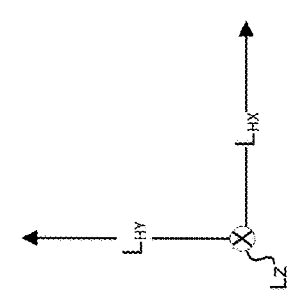
FIG. 35

ROBOTIC LAUNDRY DEVICES AND METHODS OF USE

CROSS-REFERENCE TO RELATED APPLICATIONS

This application is a continuation application of U.S. patent application Ser. No. 18/321,339, filed May 22, 2023, titled "Robotic Laundry Devices And Methods Of Use, which in turn is a continuation of U.S. patent application Ser. No. 17/332,802, filed May 27, 2021, titled "Robotic Laundry Devices And Methods Of Use, which in turn claims priority under 35 U.S.C. § 119(e) to U.S. Provisional Patent Application Ser. No. 63/030,920 filed May 28, 2020, titled "Robotic Laundry Devices And Methods Of Use," U.S. Provisional Patent Application Ser. No. 63/106,829 filed Oct. 28, 2020, titled "Robotic Laundry Separating And Repositioning Devices, Systems, And Methods Of Use," U.S. Provisional Patent Application Ser. No. 63/106,891 filed Oct. 29, 2020, titled "Autonomous Devices, Systems, And Methods For Handling Folded Laundry," and U.S. Provisional Patent Application Ser. No. 63/168,555 filed Mar. 31, 2021, titled "Autonomous Devices, Systems, And Methods For Queuing Folded Laundry," the entirety of each of these applications is hereby incorporated by reference.

BACKGROUND

The present disclosure is directed to robotic laundry devices, systems, and methods.

Automating and outsourcing mundane, time-consuming household chores to robotic devices is increasingly common. Time-saving home robots include, for example, floor vacuuming and floor washing robots. Outsourcing responsibilities include, for example, engaging grocery shopping and delivery services, and manually operated and human-operator dependent laundry washing and dry-cleaning pick up and return services.

Many homes are appointed with a dedicated washer and dryer for family use. Domestic washers and dryers are increasingly sophisticated and include IoT connectivity features and push notifications for alerting users about cycle progress and energy and resource usage. These technologically advanced machines, however, require human interaction and cannot eliminate the time required for processing loads of laundry in the home. Although more modern, "high efficiency" machines are equipped with sensors for metering water usage and dryer temperatures, the efficiency gains are capped by the constraints of sequentially processing single loads of laundry. Grey water is output to the city water and sewer system for mitigation with each load of laundry processed. Energy is consumed with each load of laundry washed and dried.

Households can outsource laundry chores to laundromat facilities for a fee in exchange for time. Laundromats offering residential mixed load laundering services, however, require human interaction for intake and sorting of dirty laundry, transferring loads from washer to dryer, and then manually folding clean laundry. These are costly processes as measured in time, energy consumption, water consumption, and wastewater output, and they rely on human intervention to keep the process running at every transition and throughout several process steps. This invites delays at every stage. Because these processes are human-dependent and inefficient, the costs are passed along to customers outsourcing their laundry for cleaning. Human-reliant laundering services also require that employees touch the belongings of the customer, potentially exposing the employee to contaminants in the dirty laundry and potentially exposing the clean laundry to transferable pathogens, dust, hair, and other debris emanating from a laundromat employee. In addition to potentially introducing undesirable contact contamination from the employees processing the loads of laundry, a privacy barrier is breached. Outsourcing household laundry to a laundromat involves employees interacting with customers' personal belongings including bodily worn garments.

Industrial laundry services exist for handling uniform business-related items, such as hospital bed sheets, medical scrubs, and hotel towels. Such industrial machines are tailor-made to accept one type of laundry item of one size or style. For example, unique folding machines exist to accept a dedicated one of washed flat sheets, fitted sheets, hotel towels, and hotel bathrobes. These machines require human operators to load the washed article into its dedicated machine, which is sized and designed to fold that one type and size of article. This type of process line relies on a human operator for properly aligning and loading the clean article into the machine, which could introduce bodily contaminants, bacteria, and viral matter into the clean articles. Like laundromat services, these industrial services rely on human intervention and potentially introduce bio-contaminants into clean loads of laundry. Because these services are only profitable by processing large volumes of like items, these industrial processors are generally subscription-based services for large clients like hotels and hospitals producing standard-size, repeat laundry articles and are not available to consumers at an individual household level. Additionally, these services are configured to combine laundry from more than one source and are not configured to isolate and process separate loads for individual households.

Autonomous robotic devices are provided to process loads of household laundry. Such devices eliminate human contact with deformable laundry articles. As such, the devices need to be designed to be efficient and reliable for replacing the common, human-dependent chore of laundry.

SUMMARY

In one example, robotic system for repositioning a deformable laundry article for folding, includes a conveyor disposed at a bottom of a work volume, the conveyor being configured to transfer the deformable laundry article beyond a perimeter of the work volume. The system includes at least three lifters disposed about the perimeter of the work volume, each one of the at least three lifters includes a gripper and at least one drive motor and configured to move within the work volume for releasably engaging the deformable laundry article, and operate at least one of independently of and in tandem with another of the at least three lifters to suspend the deformable laundry article above the conveyor. The system includes two or more sensors disposed at two or more fixed locations about the work volume, each of the two or more sensors configured to at least one of detect one or more features and capture one or more images of the deformable laundry article disposed within the work volume, and output a signal including the at least one of the detected one of one or more features and captured one or more images. The system includes a memory storing data indicative of one or more repositioned deformable laundry articles; and a controller in operative communication with the memory, the two or more sensors, and the at least one drive motor and gripper of each of the at least three lifters. The controller is configured to receive the output signal from one or more of the two or more sensors, identify, based on the output signal, one or more grip points adjacent one or more free-hanging edges of the deformable laundry article suspended above the conveyor by one of the at least three lifters, the gripper associated with the one of the at least three lifters being engaged with the deformable laundry article and positioned at a suspension height, instruct another of the at least three lifters to grip, with an associated gripper, one of the one or more grip points on the deformable laundry article and lift the gripped one of the one or more grip points to the suspension height along a shared axis defined by an associated gripper of each of the engaged one and another lifter, determine whether the deformable laundry article suspended by the one and the another of the two or more lifters is repositioned based on a comparison of the output signal to the data indicative of one or more repositioned deformable laundry articles, and instruct, based on a determination of the deformable laundry article being repositioned, the one and the another of the at least three lifters to lower the repositioned deformable laundry article onto the conveyor, and release the repositioned deformable laundry article disposed on the conveyor.

Implementations of the system may include one or more of the following features.

In examples, the controller, upon determining the laundry article is not repositioned, is further configured to detect, based on the received one or more output signals, a grip point disposed on the deformable laundry article below the suspension height, instruct an available gripper of the at least three lifters to engage the detected grip point, determine the available gripper is engaged with the grip point, instruct the engaged available gripper to lift the grip point to the suspension height, and instruct the engaged available gripper to release the laundry article.

In examples, the controller is further configured to iteratively execute a loop including detecting, based on the received one or more output signals, a grip point disposed on the deformable laundry article below the suspension height, instructing an available gripper of one of the at least three lifters to engage the grip point, determining the available gripper is engaged with the grip point, instructing the engaged available gripper to lift the grip point to the suspension height, and instructing a longest engaged gripper to release the laundry article, until the controller at least one of: determines a match of the output signal to the data indicative of one or more repositioned laundry articles, exceeds a threshold number of iterations without determining a match, and exceeds a threshold time limit without determining a match.

In examples, the at least three lifters are disposed about the work volume at individually anchored positions spaced apart from at least two others of the at least three lifters by between about 30 cm to 400 cm.

In examples, the two or more sensors include at least 3 sensors, each of one of the three sensor is being mounted to a base of the at least lifters.

In examples, each one of the two or more sensors is calibrated to at least one of the at least three lifters.

In examples, deformable laundry article is one of a plurality of deformable laundry articles including two or more article types of at least one of different sizes and different shapes and each of the two or more article types includes a longest dimension of between about 4 cm to 500 cm. In examples, the data is indicative of one or more repositioned deformable laundry articles includes data associated with of each of the two or more article types.

In examples, the controller is configured instruct the one and the another of the at least three lifters to lower the article onto the conveyor at least one of at a rate of movement of the conveyor and along a non vertical slope.

In examples, the two or more sensors include at least one of a 3-D point cloud sensor, a 2-D camera, LIDAR, LADAR, a sonar proximity sensor, an ultrasonic ranging sensor, a radar sensor (e.g., including Doppler radar and/or millimeter-wave radar), and a pair of stereo depth cameras.

In examples, at least one of the two or more sensors is a 3-D point cloud sensor, the memory further includes a neural network, and the comparison of the output signal to the data indicative of one or more repositioned deformable laundry articles includes an analysis based on a neural network.

In examples, the neural network includes a trained classifier configured to generate a descriptor indicative of trained class including at least one of repositioned and not repositioned. In examples, the trained classifier includes a plurality of classes trained on images of at least one of a plurality of article types and sizes of a plurality of laundry articles.

In examples, the analysis further includes determining whether the comparison meets or exceeds a threshold confidence value indicative of an unfolded state. In examples, the controller is further configured to adjust the threshold confidence value after at least one of a period of time and a number of grips by grippers associated with the at least three lifters for determining a match between the repositioned deformable laundry article and the data, wherein the period of time is between about 5 seconds and 2 minutes, and wherein the number of grips ranges between about 2 and 20.

In examples, the at least one drive motor includes a pan motor, a tilt motor, and an extend motors configured to engage an extendable arm, the extendable arm including no more than one joint and terminating at an associated gripper including at least two actuatable fingers.

In examples, the extendable arm includes a monolithic arm including no joints and being configured to fixedly receive thereon a wrist assembly including the associated gripper and at least one of an actuatable swivel joint and an actuatable hinge joint disposed between the associated gripper and the arm. The actuated joints can be in operable communication with the controller.

In examples, the controller is further configured to instruct at least one of the one and the another of the at least three lifters engaged with the deformable laundry article to rotate a shared axis between associated grippers of the engaged lifters perpendicular to a run direction of the conveyor prior to instructing the one and the another of the at least three lifters to lower the repositioned deformable laundry article onto the conveyor. The controller can be further configured to detect at least one of a front side and a back side of the deformable laundry article and instruct at least one of the one and the another of the at least three lifters engaged with the deformable laundry article to rotate the shared axis perpendicular to a run direction of the conveyor such that the back side of the repositioned deformable laundry article is configured to contact the conveyor.

In examples, the system further includes a robotic folding device in operable communication with the controller, and wherein the conveyor, operating in a forward run direction, is configured to transfer the repositioned one of a plurality of deformable laundry articles to a robotic folding device. In examples, the system includes at least one of a transfer conveyor configured to retrieve the repositioned one of the plurality of deformable laundry articles from the conveyor and transfer the one of the plurality of deformable laundry articles to a receiving surface of robotic folding device.

In one example, a method of selecting a laundry article repositioning routine includes receiving at a controller including a memory and a neural network, one or more camera images of a laundry article suspended at a suspension height by at least one lifter within a work volume of a repositioning robot, wherein the repositioning robot includes a floor disposed at a bottom of the work volume and three or more lifters disposed about the floor at fixed positions not traced along a single straight line. The method includes processing the received one or more camera images with a neural network trained classifier, receiving a descriptor output from the trained classifier, the descriptor being indicative of a next action by the repositioning robot and the next action being one of a plurality of trained classes, and instructing, based on the descriptor, one or more motor drives associated with pan, tilt, and extend motors of each of the lifters of the three or more lifters to execute the received next action.

In examples, the plurality of classes are manually tagged on training data including a plurality of images of known classes of articles, the images being ascertained by stationary sensors collocated with the three or more lifters and including overlapping fields of view trained on the work volume.

In examples, the plurality of images of the training data are at least one of a 2-D camera and a 3-D point cloud sensor images.

In examples, the next action includes at least one of continue executing an iterative repositioning sequence for a not flat article, sweeping the repositioned flat article onto the floor, executing a recovery sequence for a missed grab, inverting a flat but inverted article, executing a shirt fold with sleeves gripped, executing a shirt fold with one sleeve and one front corner gripped, retrieving an article on the floor, and executing a shake. The iterative repositioning sequence iteratively can include an available gripper of the at least three lifters grasping and hoisting a low point of the laundry article to the suspension height of one or more grippers of one or more engaged lifters of the three or more lifters, releasing the article from a longest engaged gripper of three engaged grippers, and rotating a shared axis of a remaining two engaged grippers.

In one example, an autonomous device for repositioning a deformable laundry article for folding includes a conveyor disposed at a bottom of a work volume, the conveyor being configured to transfer the deformable laundry article beyond a perimeter of the work volume. The robotic device includes two or more lifters disposed about the perimeter of the work volume at individually anchored positions spaced apart by between about 30 cm to 400 cm, each of the two or more lifters including a gripper and at least one drive motor. The two or more lifters are configured to move within the work volume for releasably engaging the deformable laundry article, and operate at least one of independently of and in tandem with another of the two or more lifters to at least one of raise and suspend the deformable laundry article above the conveyor. The robotic device includes two or more sensors disposed at two or more fixed locations about the work volume. The two or more sensors are spaced apart by between about 30 cm to 400 cm. In some implementations, the two or more sensors are positioned apart from the two or more lifters. Additionally or alternatively, the two or more sensors are each collocated with one of the two or more lifters disposed about the work volume. Each of the two or more sensors are configured to at least one of detect one or more features and capture one or more images of the deformable laundry article disposed within the work volume, and output a signal that includes (e.g., is indicative of) the at least one of the detected one of one or more features and captured one or more images. The robotic device includes a memory storing data indicative of one or more repositioned deformable laundry articles and a controller in operative communication with the memory, the two or more sensors, and the at least one drive motor and gripper of each of the two or more lifters. The controller is configured to receive the output signal from one or more of the two or more sensors. The controller is configured to identify, based on the output signal, one or more grip points adjacent one or more free-hanging edges of the deformable laundry article suspended above the conveyor by one of the two or more lifters, the gripper associated with the one of the two or more lifters being engaged with the deformable laundry article and positioned at a suspension height. The controller is configured to instruct another of the two or more lifters to grip, with an associated gripper, one of the one or more grip points on the deformable laundry article and lift the gripped one of the one or more grip points to the suspension height. The controller is configured to determine whether the deformable laundry article suspended by the one and the another of the two or more lifters is repositioned based on a comparison of the output signal to the data indicative of one or more repositioned deformable laundry articles. The controller is configured to instruct the one and the another of the two or more lifters to lower the repositioned deformable laundry article onto the conveyor, and release the repositioned deformable laundry article disposed on the conveyor.

Implementations of the device may include one or more of the following features.

In examples, the deformable laundry article is one of a plurality of deformable laundry articles including two or more article types of at least one of different sizes and different shapes. Each of the two or more article types can include a longest dimension of between about 4 cm to 500 cm. In examples, the data indicative of one or more repositioned deformable laundry articles includes data associated with each of the two or more article types.

In examples, the work volume includes between about 3 cubic meters to 25 cubic meters.

In examples, the one or more grip points are within a range of between about 6 mm to 130 mm of the one or more free-hanging edges.

In examples, the controller is configured to instruct the one and the another of the two or more lifters to lower the article onto the conveyor at least one of at a rate of movement of the conveyor and along a non vertical slope.

In examples, the two or more sensors include at least one of a 3-D point cloud sensor, a 2-D camera, LIDAR, LADAR, a sonar proximity sensor, an ultrasonic ranging sensor, a radar sensor (e.g., including Doppler radar and/or millimeter-wave radar), and a pair of stereo depth cameras.

In examples, the two or more sensors are configured to output a 3-D image to the controller and the controller is further configured to determine a pose of the deformable laundry article based on the 3-D image.

In examples, the two or more sensors are configured to output a 2-D image to the controller.

In examples, the two or more sensors are configured to provide two or more 2-D images to the controller and the controller is further configured to determine a pose of the deformable laundry article.

In examples, the two or more sensors each includes a field of view including a vertical angle ranging between about 35 and 90 degrees and a horizontal angle ranging between about 50 and 90 degrees. The field of view of each of the two or more sensors extends at least to a center of the work volume. The two or more sensors can include overlapping fields of view.

In examples, the controller is further configured to determine, based on the output signal of each of the two or more sensors, a pose of the deformable laundry article suspended within the work volume relative to at least the two or more fixed locations of the two or more sensors. The controller can be configured to determine, based on the output signal of each of the two or more sensors, a longest dimension of the repositioned deformable laundry article. In implementations, the device can further include a rotatable support for the conveyor, the rotatable support being in operative communication with the controller and configured to align a run direction of the conveyor parallel to the longest dimension of the repositioned deformable laundry article. In implementations, the controller is further configured to instruct the one and the another of the two or more lifters to align the longest dimension of the repositioned deformable laundry article parallel to a run direction of the conveyor.

In examples, the controller is further configured to determine an orientation of a shared axis extending between the engaged grippers of the one and the another of the two or more lifters relative to a run direction of the conveyor. The controller is further configured to instruct at least one of the one and the another of the two or more lifters engaged with the deformable laundry article to rotate the shared axis perpendicular to a run direction of the conveyor prior to instructing the one and the another of the two or more lifters to lower the repositioned deformable laundry article onto the conveyor. The controller can be further configured to determine, based on a comparison of the received output signal to the data, a back side of the repositioned deformable laundry article. In examples, the controller is further configured to instruct at least one of the one and the another of the two or more lifters engaged with the deformable laundry article to rotate the shared axis perpendicular to a run direction of the conveyor prior to instructing the one and the another of the two or more lifters to lower the repositioned deformable laundry article onto the conveyor such that the back side of the repositioned deformable laundry article is configured to contact the conveyor.

In examples, the conveyor includes a run direction. The run direction can be reversible.

In examples, the conveyor is configured to transfer the repositioned one of the plurality of deformable laundry articles to a robotic folding table in series with the robotic device.

In examples of the robotic device, at least one of the two or more sensors is a 2-D camera and the data associated with the repositioned deformable laundry article is size invariant image data.

In examples of the robotic device, at least one of the two or more sensors is a 3-D point cloud sensor and the memory further includes a neural network.

In examples, the comparison of the output signal to the data indicative of one or more repositioned deformable laundry articles includes an analysis based on a neural network. The analysis determines whether the comparison meets or exceeds a threshold confidence value indicative of an unfolded state. The controller is further configured to adjust the threshold confidence value after at least one of a period of time and a number of grips by grippers associated with the two or more lifters for determining a match between the repositioned deformable laundry article and the data. In examples, the period of time is between about 5 seconds and 2 minutes. In examples, the number of grips ranges between about 2 and 20.

In examples of the robotic device, the one or more features are indicative of at least one of position and orientation of the article relative to the two or more sensors. In examples, the one or more features are indicative of a topology of the deformable article and the controller is further configured to analyze the input signal to determine whether the topology matches at least one datum associated with the one or more repositioned deformable laundry articles.

In examples, at least one of the two or more lifters further includes an extendable arm extending from an anchored base at one of the individually anchored positions, the extendable arm including a fully extended length of between about 0.25 m and 4 m. The extendable arm can include between one and three degrees of freedom and at least one flexible joint. In examples, the extendable arm terminates at an associated gripper including at least two actuatable fingers. The at least two actuatable fingers can include an overmold including a durometer of between about 40 A to 90 A. In examples, each of the at least two of the two or more lifters include an extendable arm, and the at least two extendable arms include overlapping ranges of motion. In examples of the robotic device, the suspension height is predetermined.

In examples, the robotic device further includes one or more weight sensors disposed on at least one of the two or more lifters and the conveyor, the weight sensor being in operative communication with the controller and being configured to continuously detect a rate of change as the deformable laundry article is raised by at least one of the two or more lifters. The controller is configured to determine the deformable laundry article is raised to a suspension height when the one or more weight sensors detect an unchanging measured weight. For example, the one or more weight sensors detect a measured weight not varying withing a measurement tolerance of the one or more weight sensors.

In examples, the controller is further configured to analyze the received output signal to determine that a lowest edge of the deformable laundry article is suspended above the conveyor.

In examples, the at least one of the two or more lifters includes a lift shared with a robot configured to introduce the deformable laundry article to the work volume. In examples, the two or more lifters includes at least three lifts.

In examples, the conveyor is configured to receive thereon the deformable laundry articles in an initial configuration for repositioning by the two or more lifters. In examples, the two or more lifters includes at least three lifts.

In examples, the controller is further configured to instruct the one and the another of the two or more lifters having associated engaged grippers to sweep the repositioned one of the plurality of deformable laundry articles onto a surface outside the work volume.

In one example, a method of robotically repositioning a laundry article for folding includes receiving, at a controller, one or more output signals from two or more sensors configured to at least one of detect one of one or more features and capture one or more images of the laundry article. The method includes determining, based on the received one or more output signals, whether the deformable laundry article is suspended above a conveyor from a suspension height by a first gripper of three or more movable grippers in operative communication with the controller, the three or more moveable grippers being anchored aside the conveyor. The method includes detecting, based on the received one or more output signals, a grip point disposed on the deformable laundry article below the suspension height. The method includes instructing a second one of the three or more movable grippers to engage the grip point of the suspended laundry articles and lift the grip point to the suspension height. The method includes comparing the output signal to data stored in a memory in communication with the controller, the data being indicative of one or more repositioned laundry articles. The method includes determining, based on the comparison, whether the laundry article engaged with the first and second grippers matches the data indicative of the one or more repositioned laundry articles. The method includes instructing the first and second grippers of the three or more lifts to sweep the laundry article onto the conveyor upon determining a match between the laundry article and the data and release the laundry article.

Implementations of the method may include one or more of the following features.

In examples, the method includes, upon determining no match between the laundry article and the data, detecting, based on the received one or more output signals, a grip point disposed on the deformable laundry article below the suspension height, instructing a third gripper of the three or more moveable grippers to engage the grip point, determining the third gripper is engaged with the grip point, instructing the third gripper to lift the grip point to the suspension height, and instructing the engaged first gripper to release the laundry article.

In examples, the method includes iteratively performing the steps of detecting, based on the received one or more output signals, a grip point disposed on the deformable laundry article below the suspension height, instructing the third gripper of the three or more moveable grippers to engage the grip point, determining the third gripper is engaged with the grip point, instructing the third gripper to lift the grip point to the suspension height, and instructing the longest engaged gripper to release the laundry article, until at least one of a time out condition is reached. In implementations, the timeout condition includes at least one of determining a match of the output signal to the data indicative of one or more repositioned laundry articles, exceeding a threshold number of iterations without determining a match, and exceeding a threshold time limit without determining a match. For example, the data indicative of one or more repositioned laundry articles includes data indicative of the laundry article being sufficiently flat for successful folding. Being "sufficiently flat" can include an article including one or more wrinkles, folded over edges, or inverted portions.

In examples, the controller is configured to select one of the three or more grippers closest to the grip point prior to instructing the second of the three or more grippers to engage the grip point.

In examples, the controller is in operative communication with the conveyor and further configured to signal the conveyor to transfer the repositioned laundry articles swept to a robotic folding table configured to be aligned with the conveyor.

In examples, the controller is further configured to instruct an engaged one of the three or more grippers to at least one of rotate and translate the laundry article for alignment of the grip point with another of the three or more grippers. In examples, the controller is configured to instruct an engaged one of the three or more grippers to rotate around a z-axis perpendicular to the conveyor such that a low point of the article is disposed within reach of the another gripper. In examples, the controller is configured to instruct an engaged one of the three or more grippers to translate parallel to one of an x-axis and a y-axis of the conveyor such that a low point of the article is disposed within reach of the another one of the three or more grippers. In examples, the engaged one of the three or more grippers at least one of rotates about the z-axis and translates parallel to one of the x-axis and the y-axis after one other of the three or more grippers is engaged and raised to the suspension height, such that a low point of the article is disposed within reach of a third of the three or more grippers. In examples, the controller is configured to instruct a shared axis of an engaged two or more of the three or more grippers to rotate around a z-axis perpendicular to the conveyor such that a low point of the article is disposed within reach of an available, unengaged gripper.

In examples, the two or more sensors further include one or more force sensors disposed on the three or more grippers. The one or more force sensors are configured to detect a presence of the deformable laundry article gripped between two or more fingers of one of the three or more grippers and output a signal indicative of the presence. Determining that the deformable laundry article is suspended above the conveyor includes receiving at the controller an output signal indicative of a presence of the deformable laundry article gripped by one of the three or more grippers.

In examples the engaged first and second grippers are separated by no more than a distance between the detected grip point and the suspension height at any time while lifting the laundry article by the grip point.

In examples, sweeping the laundry article onto the conveyor includes instructing the first and second grippers to lower the laundry article onto the conveyor at least one of at a rate less than or equal to a rate of movement of the conveyor and along a non vertical slope. Lowering the article at a rate less than the rate of movement of the conveyor enables the conveyor to assist with further spreading or stretching the article to a repositioned state for folding. For example, sweeping an article back along a non-vertical slope at a rate slower than the conveyor is rotating can assist with the conveyor pulling any wrinkles straight as the article is disposed on the conveyor.

In examples, the method further includes, based on the output signal, determining a pose of the laundry article suspended above the conveyor relative to at least two or more fixed locations associated with the two or more sensors.

In examples, the method further includes determining, based on the output signal of each of the two or more sensors, a longest dimension of the laundry article. In examples, sweeping the laundry article onto the conveyor includes rotating a rotatable support of the conveyor to align a run direction of the conveyor parallel to the longest dimension of the laundry article. In examples, sweeping the laundry article onto the conveyor includes instructing the first and second grippers to align the longest dimension of the laundry article parallel to a run direction of the conveyor.

In examples, the method further includes determining an orientation of a shared axis extending between the first and second grippers engaged with the repositioned laundry article relative to a run direction of the conveyor. The method can include instructing at least one of the one and the another of the two or more grippers engaged with the laundry article to rotate the shared axis perpendicular to a run direction of the conveyor prior to instructing the first and second grippers to sweep the repositioned laundry article onto the conveyor. In implementations, the method further includes comparing the received output signal to the data to identify a back side of the repositioned laundry article. In implementations, the controller can be further configured to instruct at least one of the first and second gripper engaged with the deformable laundry article to rotate the shared axis perpendicular to a run direction of the conveyor prior to instructing the first and second grippers to sweep the repositioned laundry article onto the conveyor such that the back side of the repositioned laundry article is configured to contact the conveyor.

In examples, the conveyor includes a run direction. In implementations, the run direction is reversible.

In one example, a robotic device for repositioning a deformable laundry article for folding, includes a moveable platform disposed at a bottom of a work volume, the platform being configured to transfer the deformable laundry article beyond a perimeter of the work volume. The device includes three or more retractable arms disposed about the perimeter of the work volume at individually anchored positions, each of the three or more retractable including a rotating base joint, a gripper, and at least one drive motor. The three or more retractable arms are configured to move within the work volume for releasably engaging the deformable laundry article, and operate at least one of independently of and in tandem with another of the three or more retractable arms to at least one of raise and suspend the deformable laundry article above the moveable platform. The device includes at least one sensor disposed at a fixed location about the work volume. The at least one sensor is configured to at least one of detect one or more features and capture one or more images of the deformable laundry article disposed within the work volume, and output a signal including the at least one of the detected one of one or more features and captured one or more images. The device includes a memory storing data indicative of one or more repositioned deformable laundry articles, the data including at least one of an associated trained data set for a plurality of repositioned deformable laundry articles, a timeout associated with one or more repositioned deformable laundry articles, and a threshold number of grips and lifts associated with one or more repositioned deformable laundry articles. The device includes a controller in operative communication with the memory, at least one sensor, and the at least one drive motor and the associated gripper of each of the three or more retractable arms. The controller is configured to receive the output signal from the at least one sensor. The controller is configured to identify, based on the output signal, one or more grip points adjacent one or more free-hanging edges of the deformable laundry article suspended above the moveable platform by one of three or more retractable arms, the gripper associated with the one of the three or more retractable arms being engaged with the deformable laundry article and positioned at a suspension height. The controller is configured to instruct another of the three or more retractable arms to grip, with an associated gripper, one of the one or more grip points on the deformable laundry article and lift the gripped one of the one or more grip points to the suspension height. The controller is configured to determine whether the deformable laundry article suspended by the one and the another of the three or more retractable arms is repositioned based on at least one of matching the output signal to a datum of the associated trained data set for a plurality of repositioned deformable laundry articles, reaching a timeout associated with one or more repositioned deformable laundry articles, and reaching the threshold number of grips and lifts associated with one or more repositioned deformable laundry articles. The controller is configured to instruct the one and the another of the three or more retractable arms to lower the repositioned deformable laundry article onto the moveable platform, and release the repositioned deformable laundry article disposed on the movable platform.

Implementations of the device may include one or more of the following features.

In examples, the three or more lifters arms are anchored apart at a distance between about 30 cm to 400 cm.

In examples, the at least one sensor includes two or more sensors spaced apart by between about 30 cm to 400 cm.

In examples, the movable platform includes a conveyor.

In examples, the moveable platform is configured to tilt such that a repositioned deformable article disposed thereon slides off under gravity.

In examples, the moveable platform includes a wheeled platform configured to roll outside the work volume.

In examples, the moveable platform includes an extendable surface for delivering the repositioned deformable laundry article outside the work volume.

BRIEF DESCRIPTION OF THE DRAWINGS

FIG. 3 depicts a schematic of a plurality of autonomous robotic laundry process lines including a plurality of intakes and outputs and a plurality of washing and drying robots.

FIG. 15B depicts a close up, partially exploded view of air fittings of the wrist portion of FIG. 15A.

FIG. 35 depicts top down schematic views of an example sequence of gripping, lifting, and translating an article of laundry suspended within a work area of the repositioning robot for repositioning.

DETAILED DESCRIPTION

This disclosure relates to autonomous robotic devices, systems, and methods for handling residential loads of laundry without relying on human labor. Laundry articles are collected from households and delivered to one or more process lines for cleaning, packing, and returning to households. The autonomous processes are time and cost efficient, eliminate human intervention-based delays, eliminate line workers and associated potential introduction of human contaminants introduced by line workers, and eliminate any concerns with having private personal items handled by strangers.

The system includes one or more autonomous process lines comprising a plurality of robotic devices configured to work in concert to process a dirty load of household laundry from a mass of dirty, non-uniform articles to individually separated, cleaned, and folded laundry articles. The plurality of robotic devices operate without human intervention to efficiently and effectively launder a customer's dirty items. This disclosure relates to autonomous robotic devices configured to reposition clean, deformable laundry articles for introduction to a folding robot. The laundry articles are collected from a household and delivered to the process line for cleaning. This disclosure also relates to implementations of autonomous processing of clean, deformable laundry articles and introduction of the clean laundry articles to a robotic repositioning device.

Figure 1:
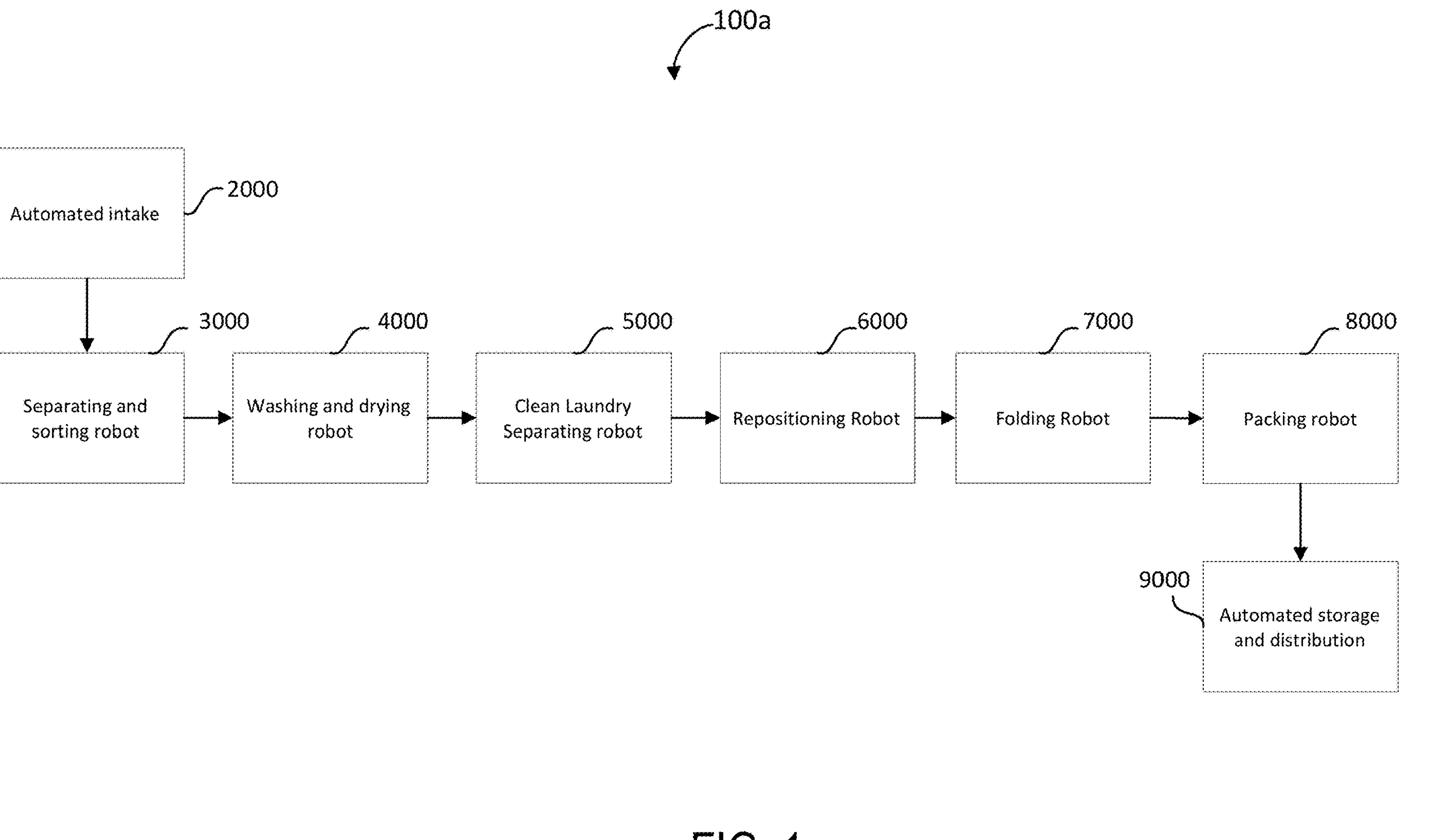
FIG. 1 depicts a schematic of an example autonomous robotic laundry process line.

As shown in FIG. 1, in implementations of the system, a process line 100*a* comprises a plurality of autonomous robots configured to operate in series without human intervention to process and transport dirty laundry through the cleaning process and then fold and repackage the clean laundry for return to a household. In one implementation, the process line 100*a* comprises an autonomously operating intake robot 2000 for receiving a load of dirty household laundry comprising a plurality of deformable laundry articles. The deformable laundry articles can be non-uniform in type, size, shape, color, and fabric. For example, the plurality of deformable laundry articles can include items commonly laundered in homes, such as sheets, towels, table cloths, and adult and children's garments, for example, tee shirts, pants, socks, undergarments, dresses, dress shirts, and blouses. The autonomous intake robot 2000 is configured to introduce the plurality of deformable laundry articles belonging to a single customer (e.g., household) to a dirty laundry separating and sorting robot 3000 configured to separate out each one of the deformable laundry articles of the plurality of deformable laundry articles. In implementations, the separating and sorting robot 3000 is configured to sort each one of the separated deformable laundry articles into one or more related batches for washing. In implementations, the separating and sorting robot 3000 is configured to intelligently batch the separated each one of the deformable laundry articles according to a programmed sorting algorithm based, for example, on criteria including at least one of material color, material type, article size, customer washing preference, water temperature requirements, and load size (e.g., weight and/or physical volume). In implementations, the separating and sorting robot 3000 is configured to identify and record the number and types of garments in the load of laundry and provide this information to one or more robots of the process line 100*a*.

The separating and sorting robot 3000 outputs one or more intelligently sorted batches of deformable laundry articles to one or more washing and drying robots 4000 for laundering. The one or more washing and drying robots 4000 output the clean laundry articles to a clean laundry separating robot 5000. Implementations of the clean laundry separating robot 5000 can be similar or identical to the separating and sorting robot 3000. The clean laundry separating robot 5000 is configured to separate a load of clean laundry into individual deformable laundry articles for introduction into a repositioning robot 6000. In implementations to be described herein in detail, the repositioning robot 6000 receives a single deformable laundry article and manipulates and repositions it for automated introduction into a folding robot 7000, which automatically folds the laundry article for introduction to a packing robot 8000. In implementations, the packing robot 8000 automatically and autonomously packs the clean load of laundry comprising the plurality of clean and folded deformable laundry articles into a shipping container for automated redistribution to the customer. In implementations, the shipping container is a reusable container. In implementations, the shipping container is a disposable container. In implementations, the shipping container is a non-deformable container with an ingress protection rating that includes an intrusion protection rating of 5 or 6 and a moisture protection rating of any and all of 1 through 6 in accordance with the Ingress Protection Code, IEC standard 60529. In reusable implementations, the shipping container can be washable.

Figure 2:
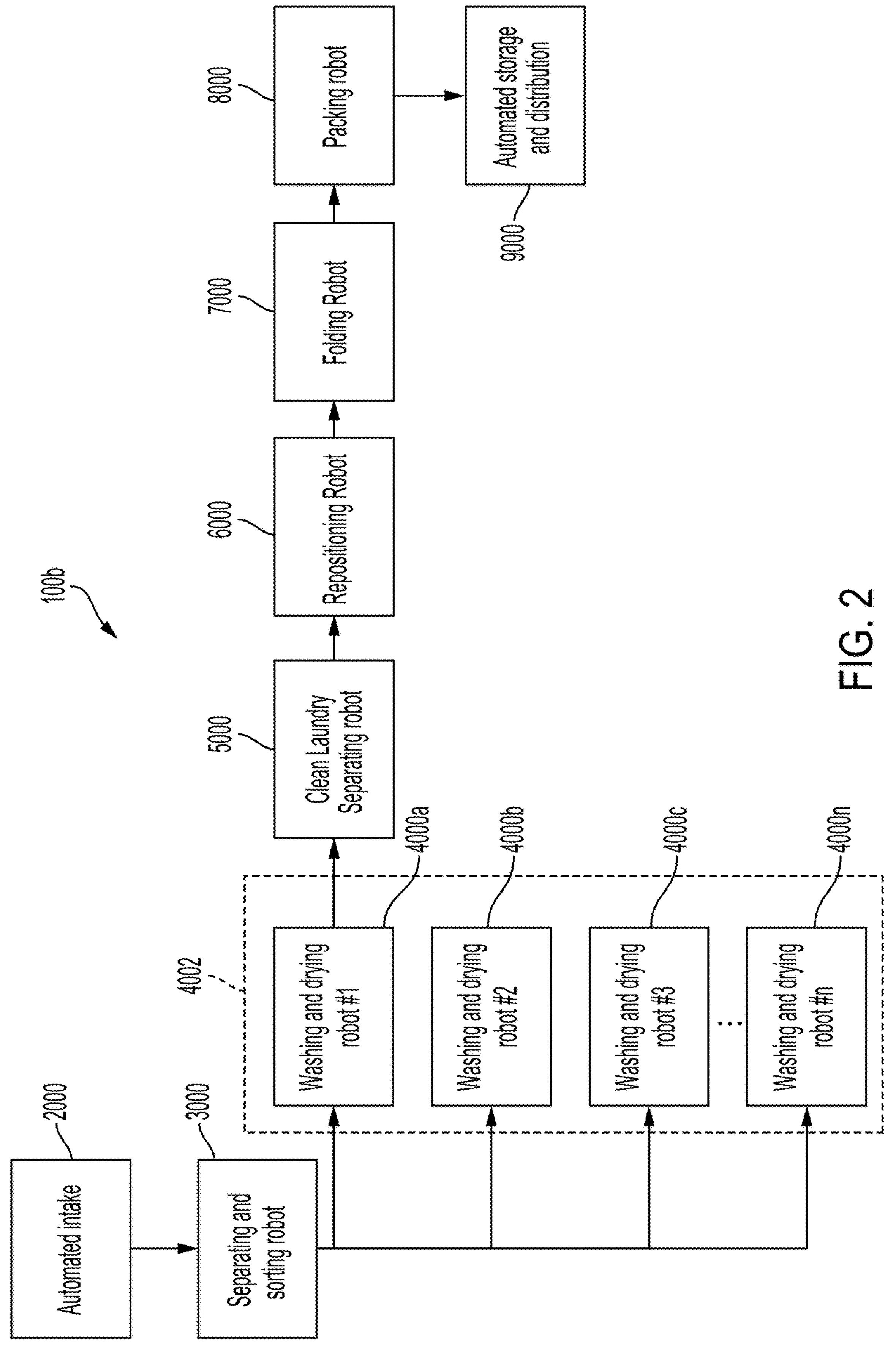
FIG. 2 depicts a schematic of an example autonomous robotic laundry process line including one intake and output and a plurality of washing and drying robots.

Implementations of the process line 100*a* of household laundry cleaning robots can comprise one or more of each of the robots depicted in FIG. 1. For example, as shown in FIG. 2, each autonomous process line 100*b* can include a bank 4002 of washing and drying robots 4000*a-n*. In other implementations, as shown in FIG. 3, the autonomous process line 100*c* includes a bank 4002 of washing and drying robots 4000*a-n* shared by two or more sets of automated intake robots 2000*a-b* and dirty laundry separating and sorting robots 3000*a-b* and two or more sets of clean laundry separating robots 5000*a-b*, repositioning robots 6000*a-b*, folding robots 7000*a-b*, and packing robots 8000*a-b*. Additionally, two or more of the robots can be combined in a single module in alternate implementations. In implementations, one or more of the robots in the process line 100*a-c* (collectively referred hereinafter as process line 100) are configured to communicate over wired connections or wireless communication protocols. For example, in implementations, one or more robots in the process line 100 can communicate with another one or more robots in the process line 100 over a wired BUS, LAN, WLAN, 4G, 5G, LTE, Ethernet, BLUETOOTH, or other IEEE 801.11 standard.

Figure 4:
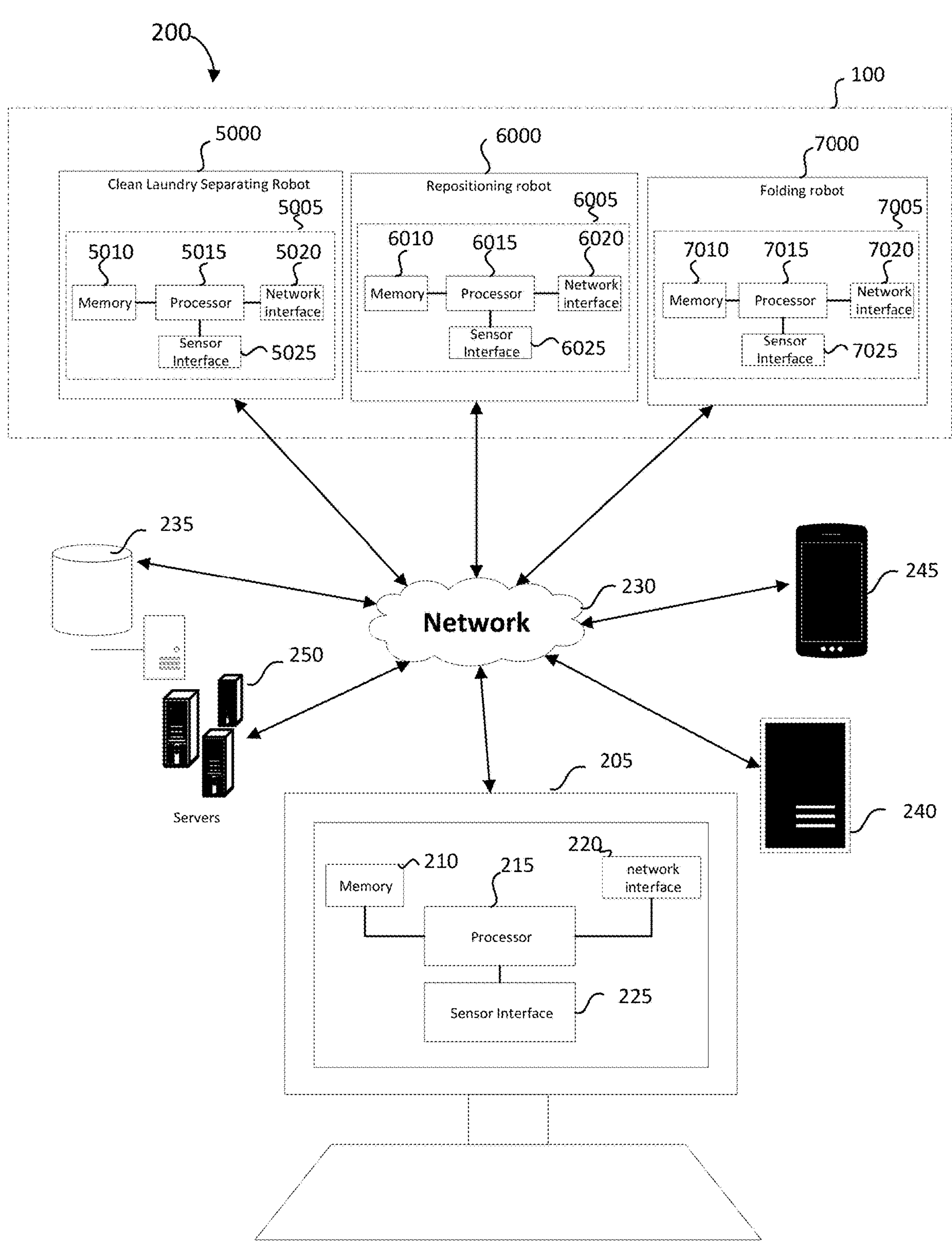
FIG. 4 depicts a schematic example of a system for controlling an autonomous robotic laundry process line.

Referring to FIG. 4, an example of a system 200 of operatively connected autonomous robots is shown. FIG. 4 depicts a schematic implementation of a portion of an autonomous robotic process line 100 that processes the clean deformable laundry articles. A repositioning robot 6000 is in operative communication with a clean laundry separating robot 5000 configured to provide single deformable laundry articles to the repositioning robot 6000 and output a repositioned deformable laundry article to an autonomously operating folding robot 7000. Each robot 5000, 6000, 7000 includes a controller 5005, 6005, 7005 configured to operate the associated robot.

For example, in implementations, the autonomous repositioning robot 6000 includes a controller 6005. The controller 6005 includes a processor 6015 in communication with a memory 6010, a network interface 6020, and a sensor interface 6025. The processor 6015 can be a single microprocessor, multiple microprocessors, a many-core processor, a microcontroller, and/or any other general purpose computing system that can be configured by software and/or firmware. In implementations, the memory 6010 contains any of a variety of software applications, data structures, files and/or databases for executing algorithms and providing stored requirements associated with repositioning a plurality of non-uniform deformable laundry articles. In one implementation, the controller 6005 includes dedicated hardware, such as single-board computers, application specific integrated circuits (ASICs), and field programmable gate arrays (FPGAs).

A network interface 6020 is configured to couple the controller 6005 to a network 230. The network 230 may include both private networks, such as local area networks, and public networks, such as the Internet. It should be noted that, in some examples, the network 230 may include one or more intermediate devices involved in the routing of packets from one endpoint to another. In implementations, the network interface 6020 is coupled to the network 230 via a networking device, such as a bridge, router, or hub. In other implementations, the network 230 may involve only two endpoints that each have a network connection directly with the other. In implementations, the network interface 6020 supports a variety of standards and protocols, examples of which include USB (via, for example, a dongle to a computer), TCP/IP, Ethernet, Wireless Ethernet, BLUETOOTH, ZigBee, M-Bus, CAN-bus, IP, IPV6, UDP, DTN, HTTP, FTP, SNMP, CDMA, NMEA and GSM. To ensure data transfer is secure, in some examples, the controller 6005 can transmit data via the network interface 6020 using a variety of security measures including, for example, TLS, SSL or VPN. In implementations, the network interface 6020 includes both a physical interface configured for wireless communication and a physical interface configured for wired communication. According to various embodiments, the network interface 6020 enables communication between the controller 6005 of the repositioning robot and at least one of the plurality of robots 2000, 3000, 4000, 5000, 7000, 8000, 9000 of the process line 100.

Additionally or alternatively, the network interface 6020 is configured to facilitate the communication of information between the processor 6020 and one or more other devices or entities over the network 230. For example, in implementations, the network interface 6020 is configured to communicate with a remote computing device such as a computing terminal 205, database 235, server 240, smartphone 245, and server farm 250. In implementations, the network interface 6020 can include communications circuitry for at least one of receiving data from a database 235 and transmitting data to a remote server 240, 250. In some implementations, the network interface 6020 can communicate with a remote server over any of the wired protocols previously described, including a WI-FI communications link based on the IEEE 802.11 standard.

In some examples in accordance with FIG. 4, the network 230 may include one or more communication networks through which the various autonomous robots and computing devices illustrated in FIG. 2 may send, receive, and/or exchange data. In various implementations, the network 230 may include a cellular communication network and/or a computer network. In some examples, the network 230 includes and supports wireless network and/or wired connections. For instance, in these examples, the network 230 may support one or more networking standards such as GSM, CMDA, USB, BLUETOOTH®, CAN, ZigBee®, Wireless Ethernet, Ethernet, and TCP/IP, among others. In implementations, the network 230 can implement broadband cellular technology (e.g., 2.5 G, 2.75 G, 3 G, 4 G, 5 G cellular standards) and/or Long-Term Evolution (LTE) technology or GSM/EDGE and UMTS/HSPA technologies for high-speed wireless communication.

Although the controller 6005 is described herein in particular, one or more of the plurality of robots 2000, 3000, 4000, 5000, 7000, 8000, 9000 of the process line 100 includes similar components having similar functionality.

Figure 5:
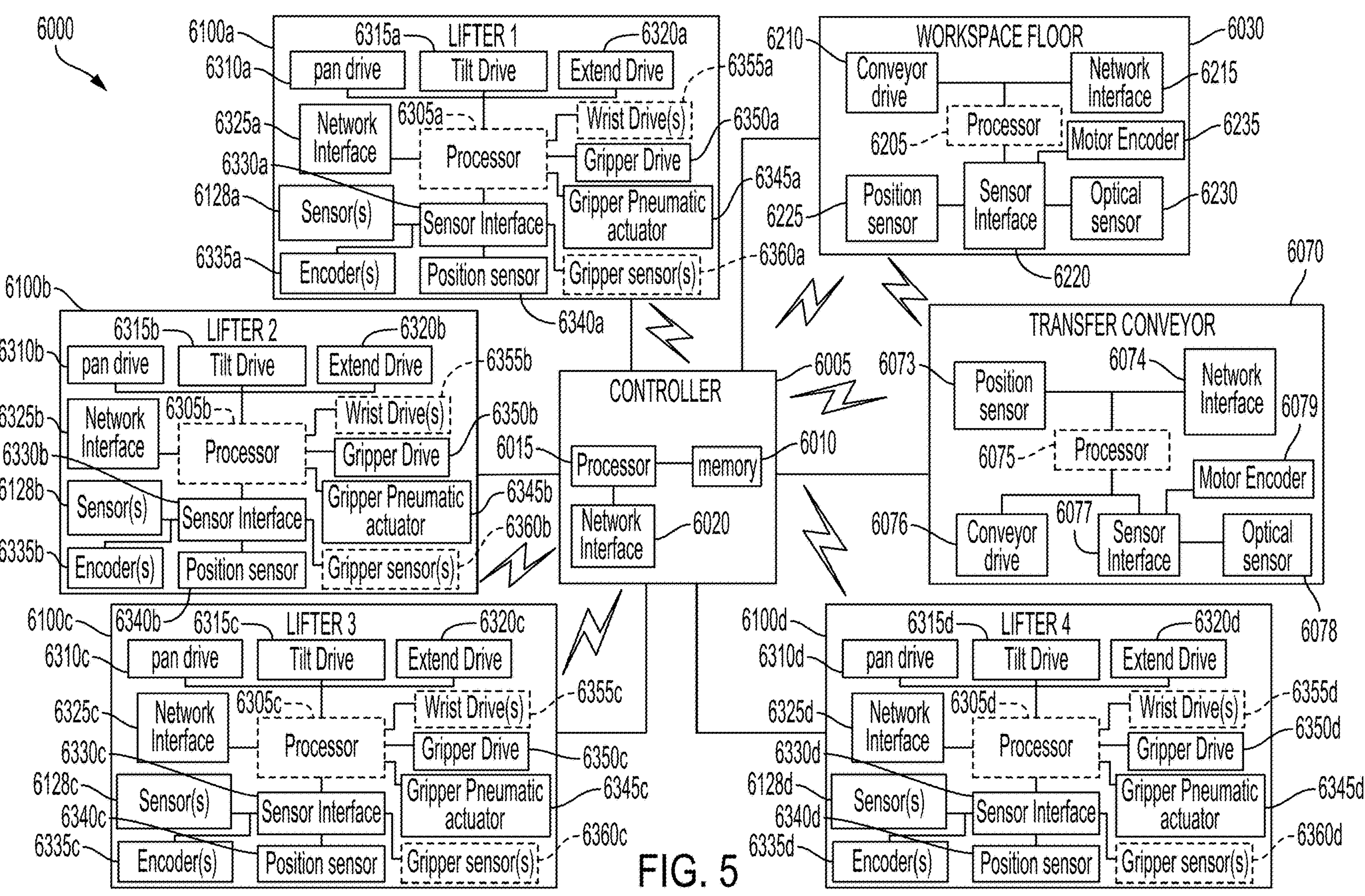
FIG. 5 depicts a system level schematic of an example repositioning robot.

In implementations, the repositioning robot 6000 can be a repositioning system comprising one or more autonomous devices working in concert to reposition one or more deformable laundry articles for automated folding. The repositioning of the one or more deformable laundry articles for automated folding can include manipulating the article so as to flatten or straighten a shape of the deformable laundry article, such as reducing a number of bends in the deformable laundry article. It should be understood, however, that after repositioning, the deformable laundry article does not need to be perfectly flat or without bends, and that some threshold amount of bending may be tolerated by the folding robot 7000. The folding robot 7000 is configured to fold the repositioned deformable laundry article into a shape that is generally flat or elongated having planar fabric portions and folds, which are optionally symmetric in shape. FIG. 5 depicts a schematic of an implementation of concurrently monitored and/or controlled components of the repositioning robot 6000 in operable control with the one or more controllers 6005 of the system 6000. The repositioning system 6000 includes one or more of the features described with regard to the embodiments of FIGS. 1-4.

In implementations the repositioning robot 6000 comprises a workspace floor 6030 (alternatively referred to herein throughout with regard to implementations as "conveyor 6030"), a transfer conveyor 6070 for receiving a repositioned article and delivering the repositioned article to the folding robot 7000, and two or more lifters 6100*a-d* in operable communication with the one or more controllers 6005 for repositioning a deformable laundry article in preparation for folding by the folding robot 7000. As will be described subsequently with regard to implementations, the workspace floor 6030 is a conveyor comprising a rotating belt conveyor that can extend beyond the bottom of the work volume 6035 and move articles in a direction R toward the transfer conveyor 6070. The conveyor 6030 comprises a conveyor drive 6210 configured to rotate the belt conveyor. The drive 6210 can be in operable communication via the processor 6205 with a motor, such as for example, controllable motor (e.g., a brushless DC motor (BLDC)), and a speed encoder 6235 for timing the belt of the rotating conveyor 6030 to the same rotational speed as a belt of a proximate transfer conveyor 6070. As will be described subsequently with regard to implementations, timing the speeds of the two proximate belts effectively creates a continuous combined moving surface for transferring a repositioned article form the repositioning robot to the transfer conveyor 6070 without disruption. In implementations, the at least one controller 6005 is in operable communication with the conveyor drive 6210 and a drive 6076 of the transfer conveyor 6070 via a wired or wireless communication network (e.g., network 230). In implementations, the at least one controller comprises at least one of a centralized controller 8005 configured to communicate with one or more components of the repositioning robot 6000 and a processor 6205, 6075, 6305*a-d*, of one or more of the components of the system 6000.

Additionally or alternatively, the workspace floor 6030 comprises at least one of a position sensor 6225 and an optical sensor 6230 for tracking movement of the rotating belt and/or a position of a deformable article on or above the workspace floor, and the at least one sensor 6225, 6230 can be in communication with at least one of the controller 6005 and the workspace floor processor 6205 via the sensor interface 6220.

As shown in FIG. 5, the repositioning robot 6005 comprises two or more lifters 6100*a-d* in operable communication with at least one of their respective processors 6305*a-d* and the at least one controller 6005 of the system 6000. In implementations, each one of the two or more lifters 6100*a-d* c comprises a pan drive 6310, tilt drive 6315, and extend drive 6320 configured to drive motors configured to pan, tilt, and extend an arm of the lifter 6100 as will be described subsequently with regard to implementations. In implementations, the pan, tilt, and extend arm motors comprise controllable motors (e.g., a brushless DC motor (BLDC)), Each lifter 6100*a-d* comprises a network interface configured to communicate data and sensor signals to at least one of the respective processors 6305*a-d* and the at least one controller 6005 of the system 6000 (via a wireless or wired communication network 230) for processing. The sensor signals can be output from one or more optical sensors 6128*a-d*, one or more encoders 6335*a-d*, and one or more position sensors 6340*d* and routed via the sensor interface 6330*a-d*.

Additionally, each lifter comprises a gripper drive 6350 and a gripper actuator 6345 in communication with at least one of the respective processors 6305*a-d* and the at least one controller 6005 of the system 6000 (via a wireless or wired communication network 230). In implementations comprising a wrist, each lifter 6100*a-d* comprises a wrist drive 6355 in operable communication with the controller for rotating and/or tilting a wrist of a gripper. Additionally or alternatively, in implementations, each lifter comprises one or more gripper sensors 6360 such as an absolute position sensor configured to detect an absolute position of a rotating swivel joint and tilting hinge joint (e.g., an absolute encoder such as a potentiometer, optical encoder, or Hall sensor for detecting an angular position of a gripper wrist that tilts relative to the longitudinal arm axis) and fingertip pressure sensors disposed in the fingers of the gripper for detecting contact forces with an article of clothing and/or the workspace floor 6030.

Each component of the repositioning robot 6000 will subsequently be described with regard to implementations.

Figure 6A:
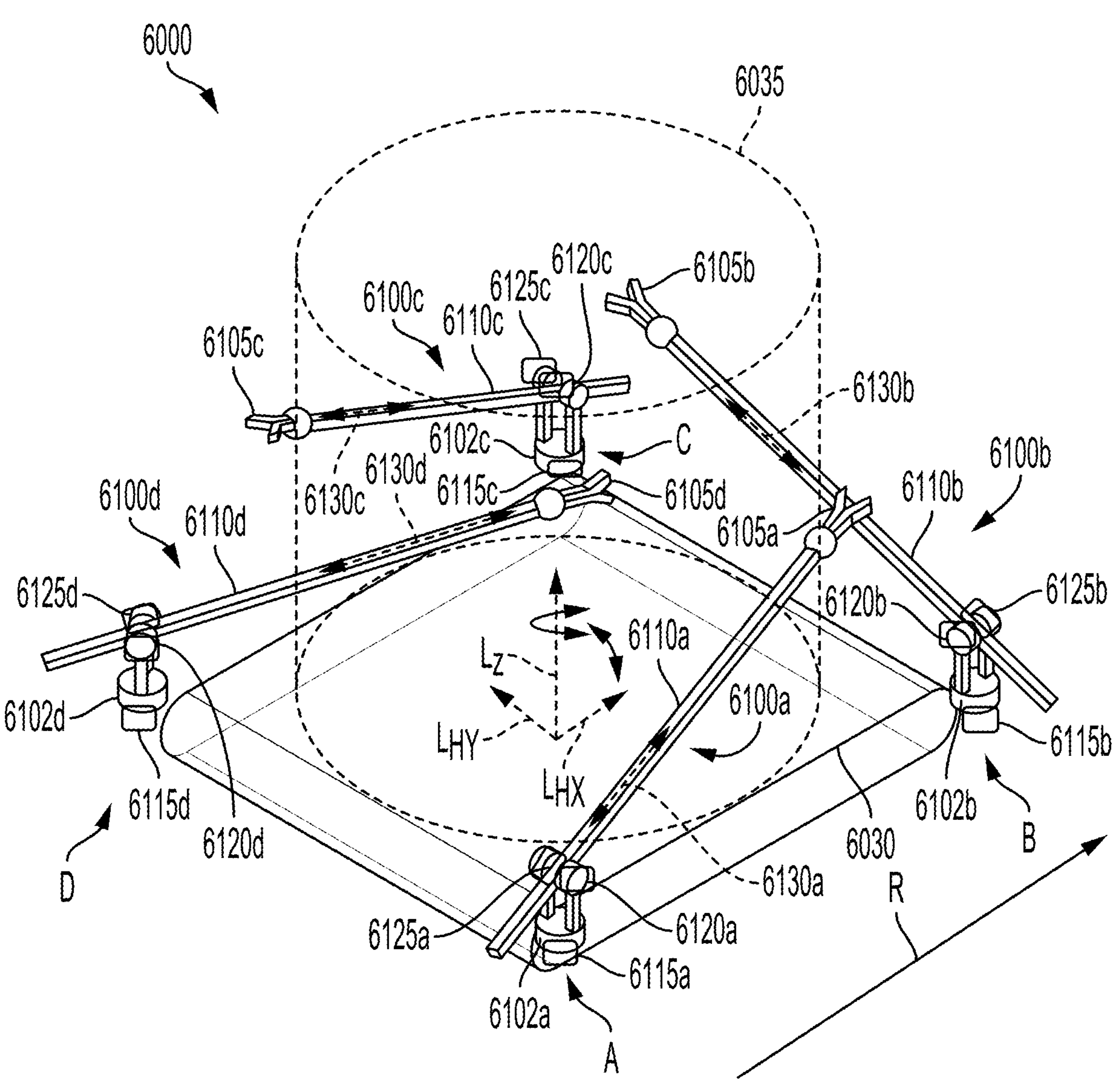
FIG. 6A depicts an isometric view of an example repositioning robot of an autonomous robotic laundry process line.
Figure 6B:
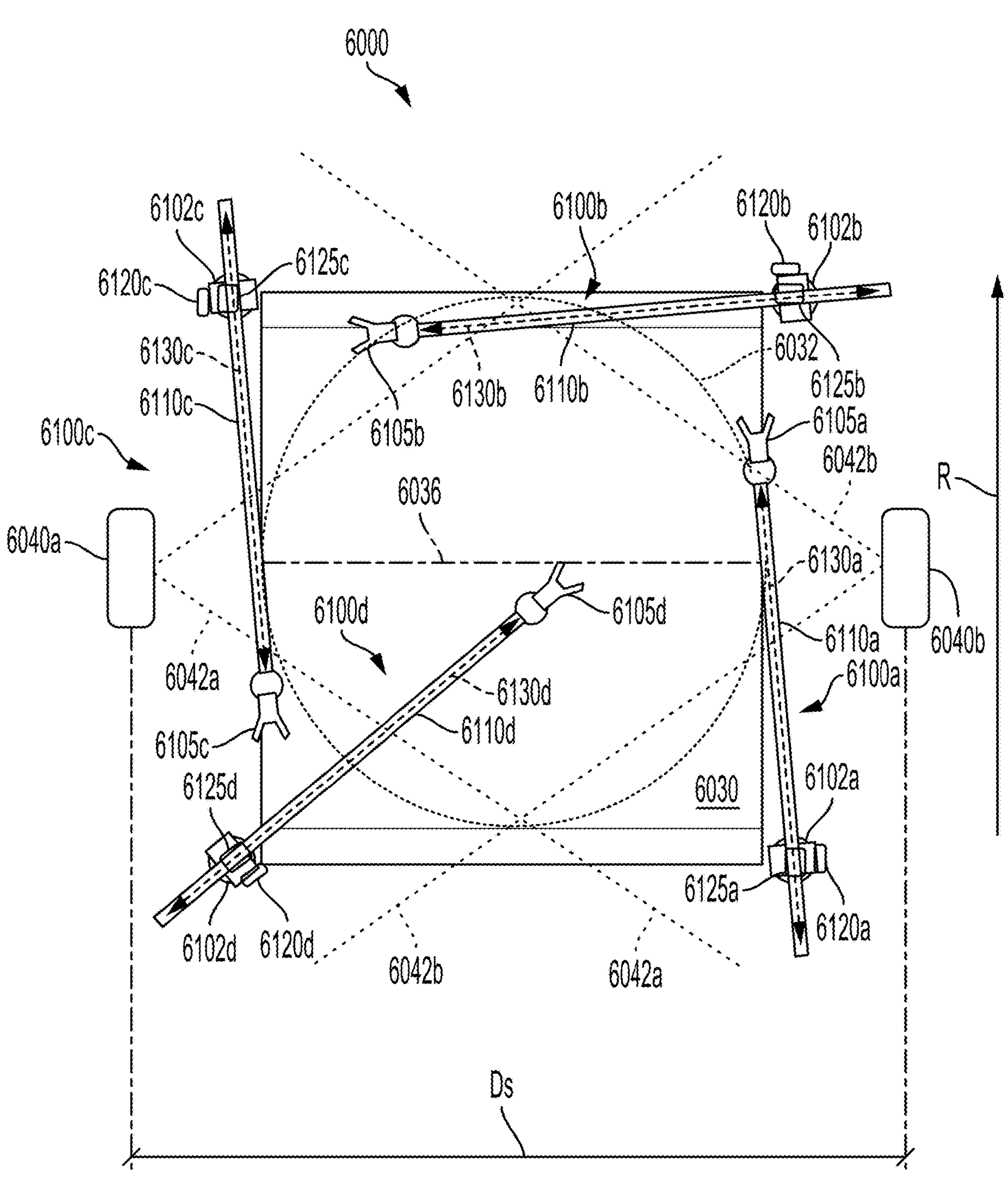
FIG. 6B depicts a plan view of an example autonomous repositioning robot of a robotic laundry process line.

Turning now to FIGS. 6A-B, an implementation of a repositioning robot 6000 (also alternatively referred to hereinafter as "a robotic device") configured to autonomously reposition a deformable laundry article for folding is shown. The repositioning robot 6000 includes one or more of the features described with regard to the embodiments of FIGS. 1-5. In implementations, a the workspace floor 6030 comprises a conveyor 6030 disposed at a bottom of a work volume 6035 indicated by dashed lines in FIG. 6. The work volume 6035 is the volume of space within which the repositioning robot 6000 repositions the deformable laundry article above the conveyor 6030. In implementations, the work volume 6035 includes a diameter 6036 of between about 5 to 9 feet (e.g., 5 ft, 5.25 ft, 5.5 ft, 5.75 ft, 6 ft, 6.25 ft, 6.5 ft, 6.75 ft, 7 ft, 7.25 ft, 7.5 ft, 7.75 ft, 8 ft, 8.25 ft, 8.5 ft, 8.75, 9 ft) and a height of 5-9 feet (e.g., 5 ft, 5.25 ft, 5.5 ft, 5.75 ft, 6 ft, 6.25 ft, 6.5 ft, 6.75 ft, 7 ft, 7.25 ft, 7.5 ft, 7.75 ft, 8 ft, 8.25 ft, 8.5 ft, 8.75, 9 ft). In implementations, the work volume 6035 includes a diameter 6036 of between about 1 to 5 feet (e.g., 1 ft, 1.25 ft, 1.5 ft, 1.75 ft, 2 ft, 2.25 ft, 2.5 ft, 2.75 ft, 3 ft, 3.25 ft, 3.5 ft, 3.75 ft, 4 ft, 4.25 ft, 4.5 ft, 4.75, 5 ft) and a height of 5-9 feet (e.g., 5 ft, 5.25 ft, 5.5 ft, 5.75 ft, 6 ft, 6.25 ft, 6.5 ft, 6.75 ft, 7 ft, 7.25 ft, 7.5 ft, 7.75 ft, 8 ft, 8.25 ft, 8.5 ft, 8.75, 9 ft). In implementations, the work volume 6035 includes a diameter 6036 of between about 0.3 m to 4 m and a height between about 1.5 m to 3 m. In implementations, the work volume 6035 includes a diameter 6036 of between about 1.5 m to 3 m and a height between about 1.5 m to 3 m. In implementations, work volume 6035 comprises between about 0.2 to 50 cubic meters of workspace within which to reposition a deformable laundry article. In implementations, a smaller work volume (e.g., approximately 0.2 cubic meters) can be associated with a small version of the robot 6000 for at least one of repositioning, folding, and matching smaller items, such as socks, underwear and baby clothes. In implementations, the work volume comprises a range of between about 5 to 25 cubic meters of space within which the repositioning robot 6000 is configured to reposition most articles of household laundry. In implementations, the work volume comprises a range of between about 25 to 50 meters of cubic space for longer and overall larger surface area items that require repositioning by a robot 3000 that is at least one of taller, longer, and wider than small-sized and average-sized implementations. The conveyor 6030 is configured to transfer the deformable laundry article beyond a perimeter of the work volume 6035 once the repositioning robot 6000 has repositioned the deformable laundry article in accordance with one or more threshold qualifications for folding, which will be described subsequently with regard to implementations.

The repositioning robot 6000 comprises two or more lifters 6100*a-d*. In implementations, at least one of the two or more lifters 6100*a-d* comprises a lifter shared with a robot configured to introduce the deformable laundry article to the work volume in a suspended configuration. In implementations, the conveyor 6030 can be configured to receive thereon the deformable laundry article in an initial configuration for lifting and repositioning by the two or more lifters 6100*a-d*.

In implementations, the two or more lifters 6100*a-d* are disposed about the perimeter of the work volume 6035 at individually anchored positions A-D spaced apart from each of the other anchored positions by between about 30 cm to 400 cm. In one implementation, the two or more lifters 6100*a-d* are spaced apart by a distance of between about 1.5 m to 3 m or 5 to 9 feet (e.g., 5 ft, 5.25 ft, 5.5 ft, 5.75 ft, 6 ft, 6.25 ft, 6.5 ft, 6.75 ft, 7 ft, 7.25 ft, 7.5 ft, 7.75 ft, 8 ft, 8.25 ft, 8.5 ft, 8.75, 9 ft). In implementations the two or more lifters 6100*a-d* comprise four lifters evenly spaced about the work volume 6035. In implementations, the two or more lifters 6100*a-d* comprise four lifters unevenly spaced about the work volume 6035. In either of the preceding implementations, the four lifters are not all along a single shared line. In implementations, the two or more lifters 6100*a-d* comprise four lifters spaced about the work volume 6035 disposed proximate a perimeter of the floor conveyor 6030 and at corners defining a rectangle. In implementations, the two or more lifters comprise three or more lifters disposed about the work volume 6030 proximate a perimeter of the floor conveyor 6030 and at the corners of defining a polygon or along circumferential points of a circular work area 6032 comprising the area of the floor conveyor 6030 at the bottom of the work volume 6035 within which an article is repositioned. In one implementation, each of the two or more lifters 6100*a-d* includes an associated arm 6110*a-d*. In implementations, each associated arm 6110 has no joints. In some implementations, one or more of the associated arms 6110*a-d* comprises one or more joints. In alternative implementations, one or more of the two or more lifters comprises a stationary vertical riser (not shown) along which a gripper translates up and down. In still yet other implementations, one or more of the two or more lifters comprises a rotatable riser (not shown) along which a gripper translates bidirectionally.

Figure 21A:
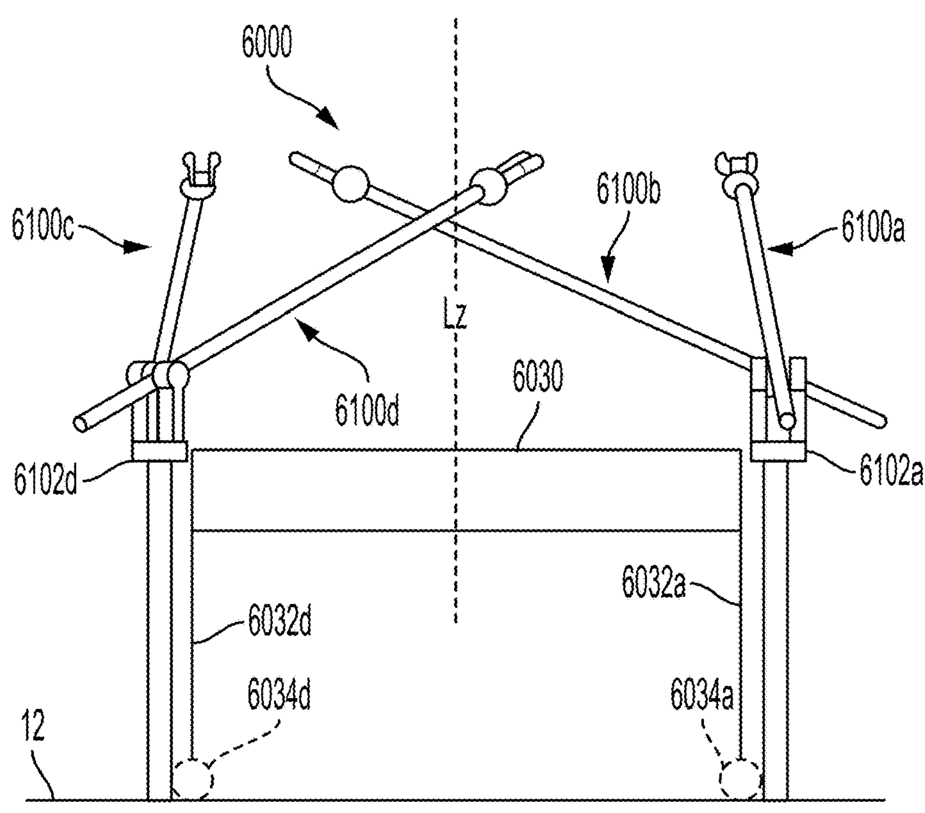
FIG. 21A depicts an end view of an example autonomous repositioning robot comprising a rotating conveyor.
Figure 21B:
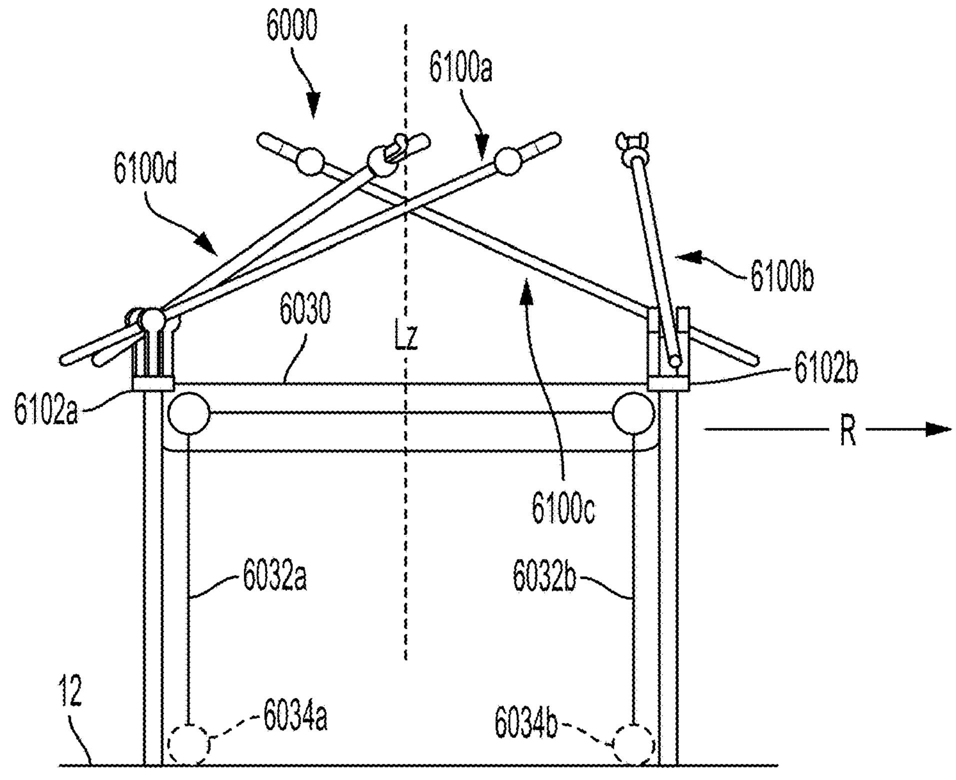
FIG. 21B depicts a side view of the example repositioning robot of FIG. 21A.

In the implementation of FIGS. 6A-B, the repositioning robot 6000 includes four lifters 6100*a-d* connected to bases 6102*a-d* each anchored astride the conveyor 6030 proximate an associated corner of the conveyor 6030. In implementations, one or more of the bases 6102*a-d* is anchored to a floor 12 beneath the conveyor 6030 (as shown in FIGS. 21A-B). In other implementations, one or more of the bases 6102*a-d* is anchored to a ceiling or support frame located above the conveyor for providing access to the work volume 6030. Each of the two or more lifters 6100*a-d* comprises a gripper 6105*a-d*, an arm 6110*a-d* supporting the gripper 6105*a-d*, and at least one drive motor 6115*a-d*, 6120*a-d*, 6125*a-d* schematically represented in FIGS. 3A-B. Each arm 6110*a-d* can comprise between one and three degrees of freedom.

Figure 7A:
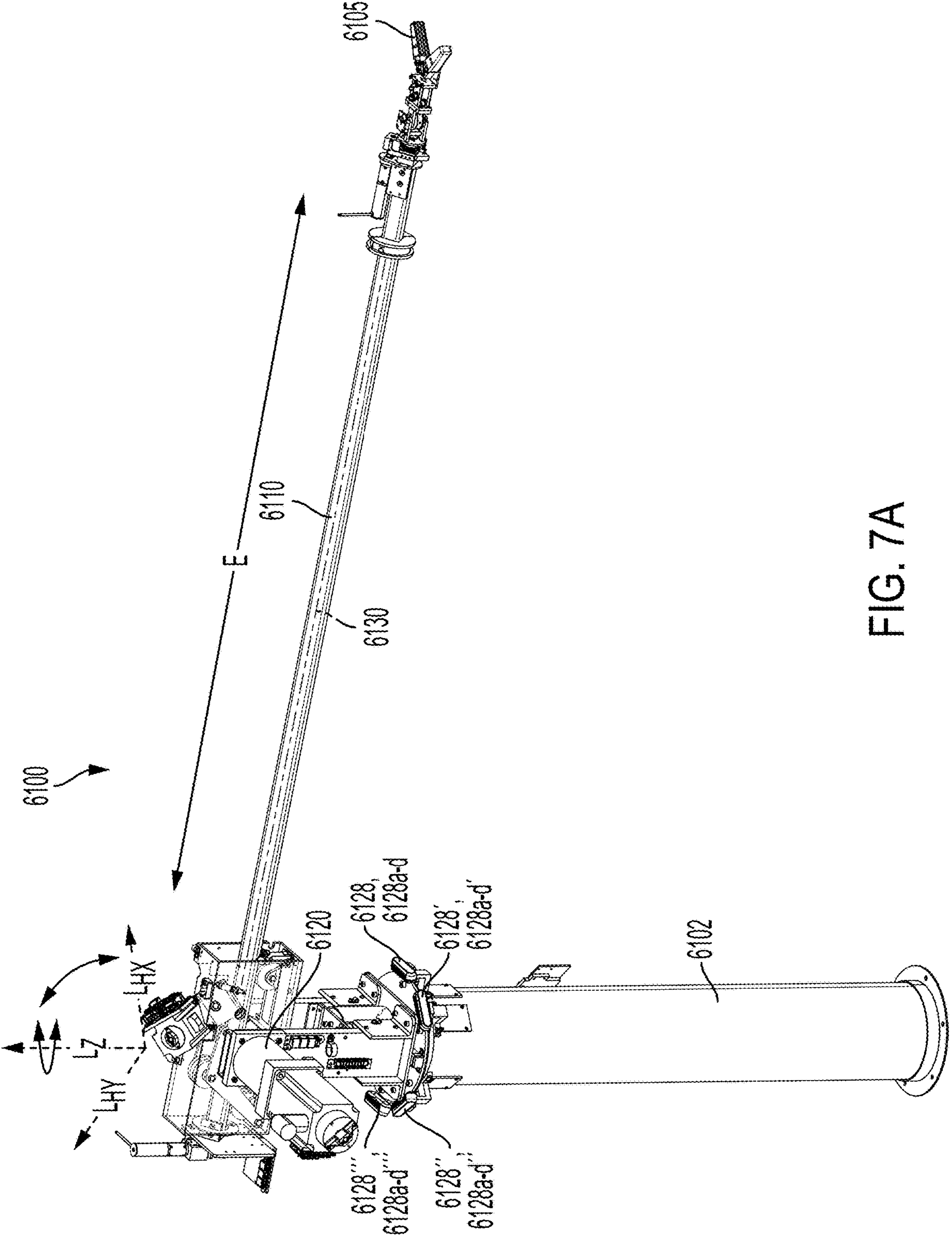
FIG. 7A depicts an example of a lifter of an autonomous repositioning robot of FIGS. 6A-B.
Figure 7B:
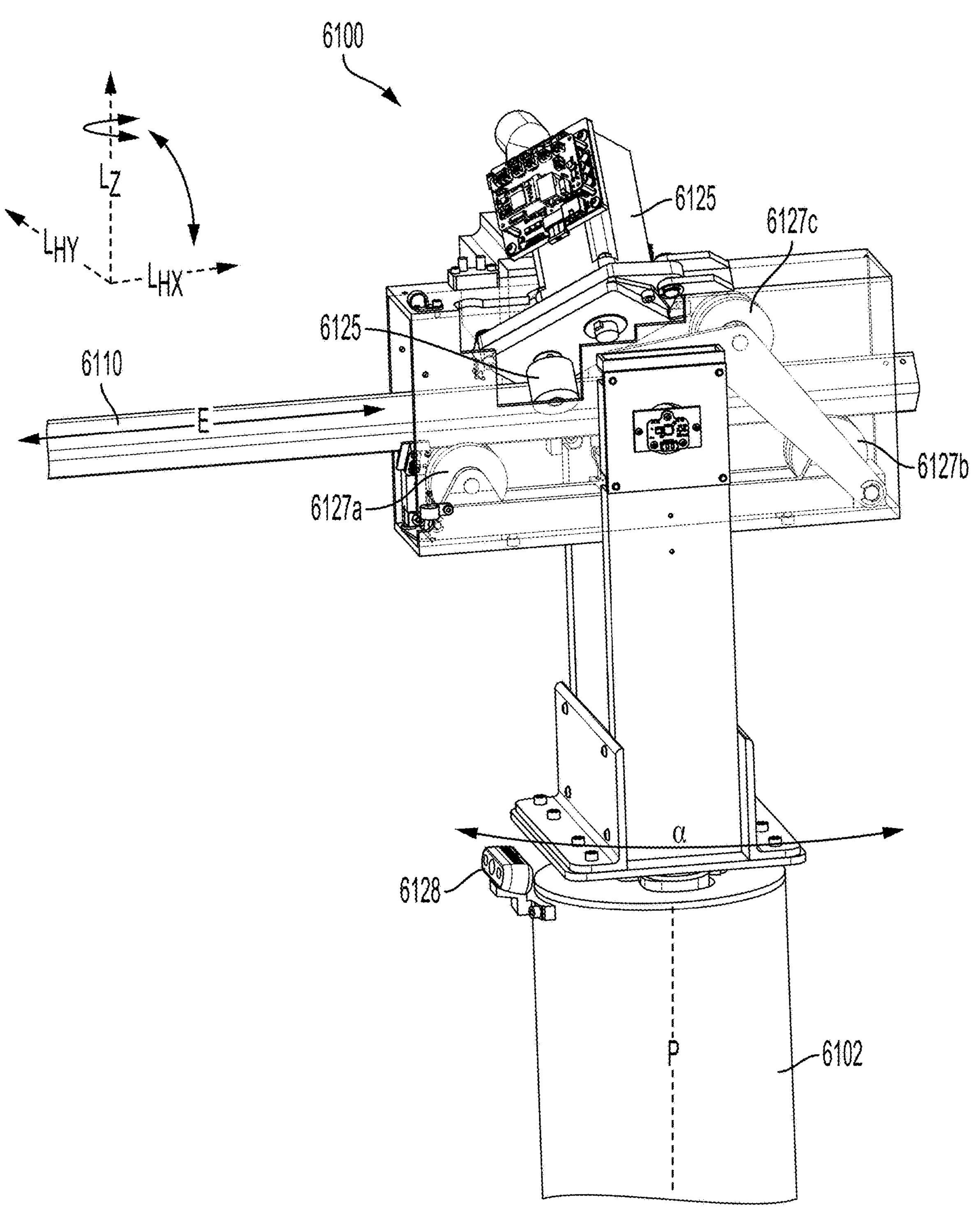
FIG. 7B depicts a portion of a base of the lifter of FIG. 7A with partial transparency.
Figure 7C:
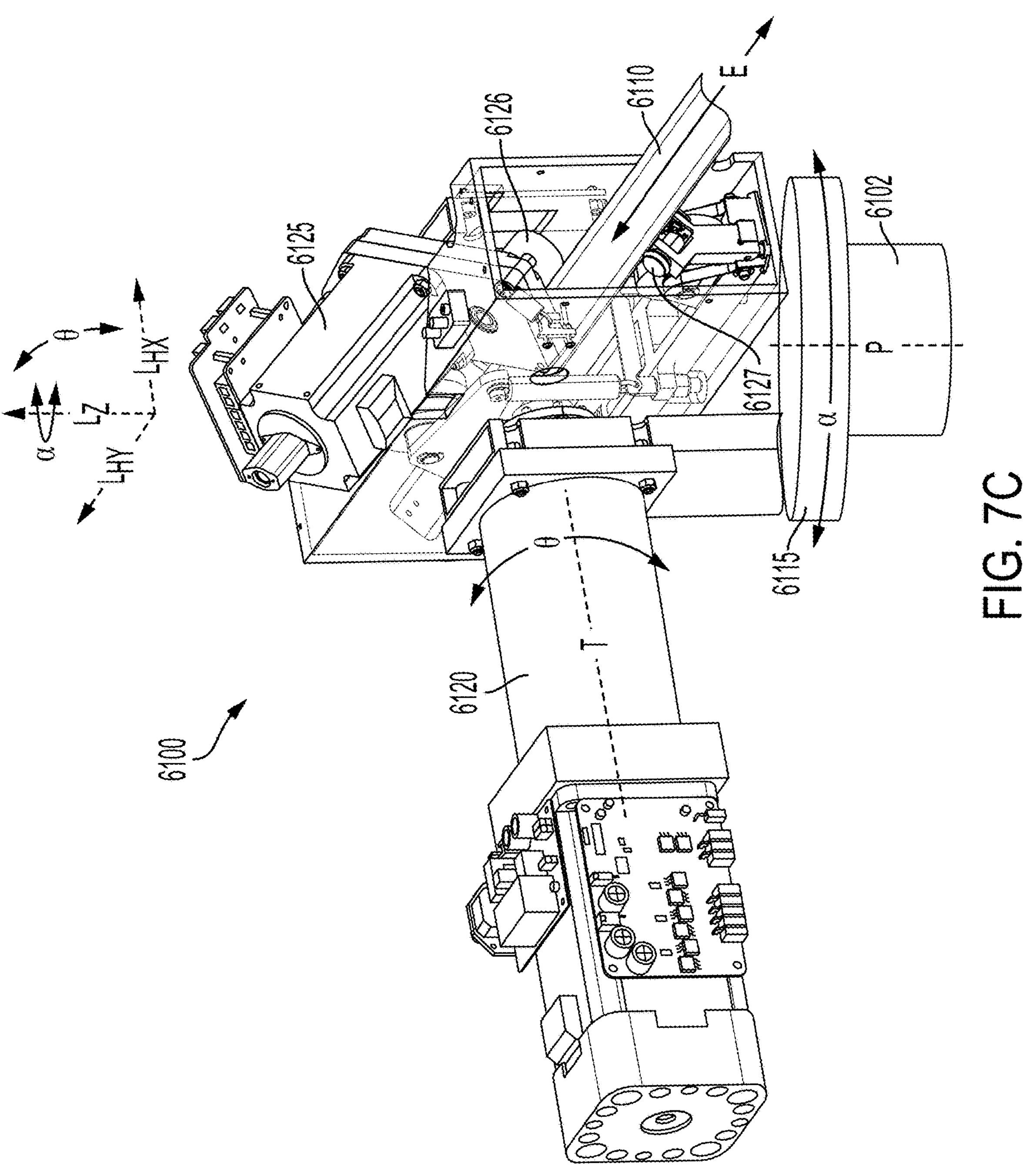
FIG. 7C depicts a view of a portion of a base of the lifter of FIG. 7A with partial transparency.
Figure 7D:
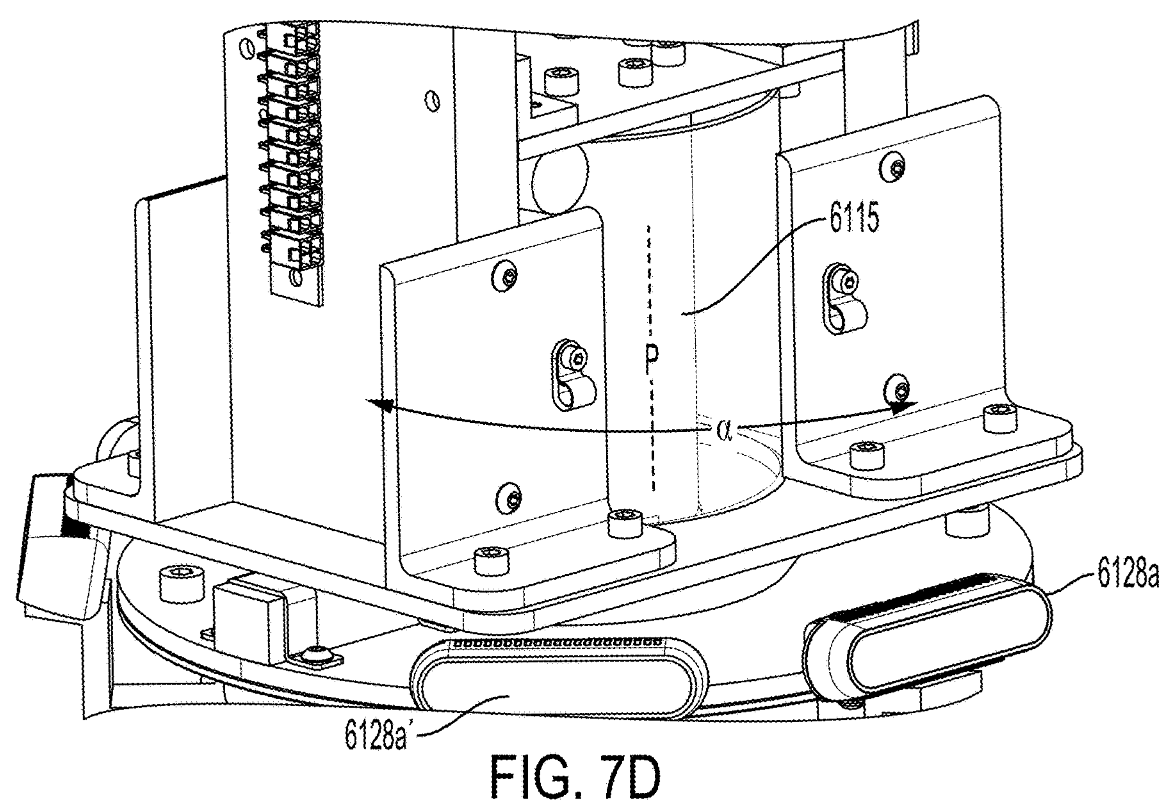
FIGS. 7D-E depicts an example of a pan joint of a lifter of FIG. 7A in a first position and a second, rotated position.
Figure 7E:
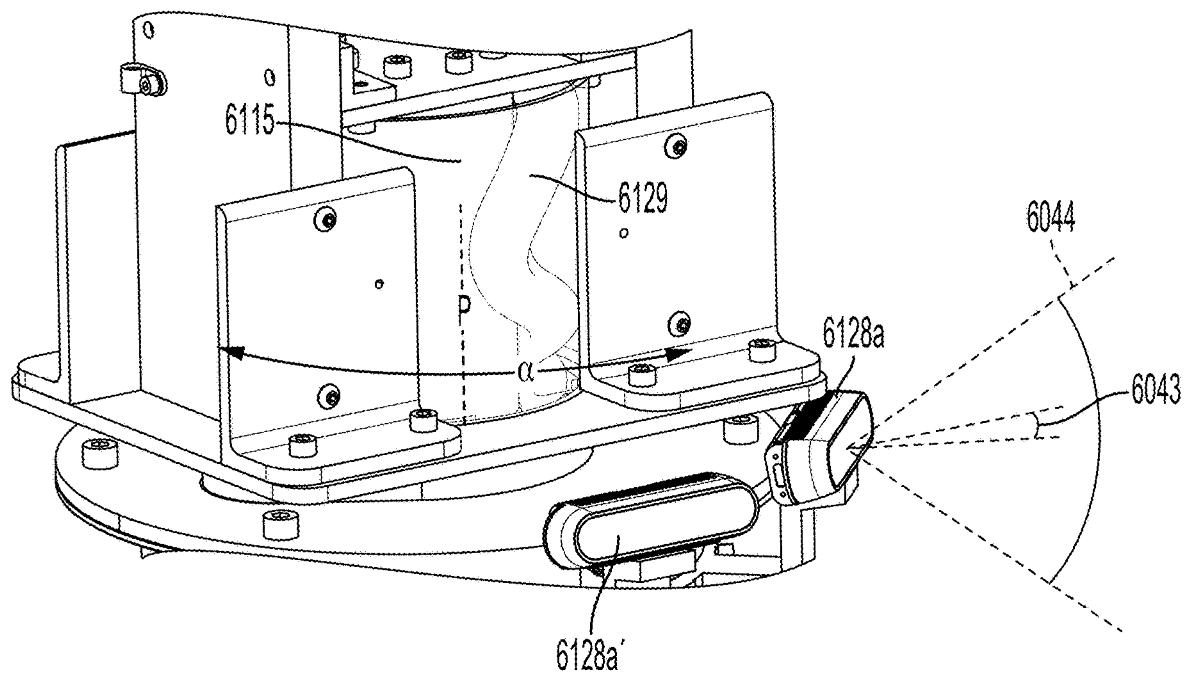
Figure 7F:
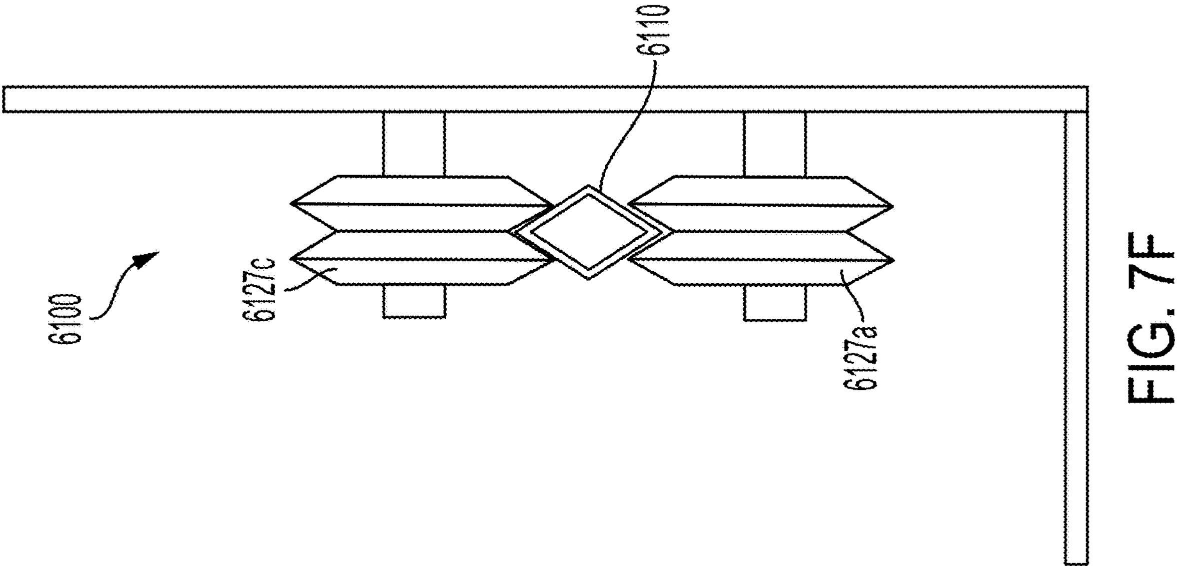
FIG. 7F depicts an example end view of an arm of a lifter disposed on v-groove bearings.

FIGS. 7A-7E show an exemplary lifter 6100 of the two or more lifters 6100*a-d*. In implementations, each lifter 6100 can include a pan motor 6115 for rotating each lifter and its associated arm 6110 about a vertical axis P centered on an associated base 6102, through a rotational angular direction a and parallel to schematically represented vertical axis $L_Z$. In implementations, each arm 6110 is disposed at anchored positions spaced apart by at least about a distance of 3 to 5 inches from the conveyor 6030 so as to not interfere with the conveyor 6030 while maintaining effective working volumes for successfully repositioning an article. Additionally or alternatively, in implementation the arm 6110 intersects the base 6102 at a position disposed above the conveyor floor 6030 (e.g. at least 3 cm above the conveyor floor) to prevent any interference of the arm 6110 with the conveyor 6030 during a panning motion. In implementations, the pan motor 6115 comprises an encoder for detecting a rotational position of the lifter 6100. In implementations, the pan motor 6115 is a controllable servo motor and comprises a speed encoder in operable communication with at least one of the processor 6205 and the controller 6005 can synchronize motion and speed of the belt of the conveyor. FIGS. 7D-E show an implementation of a portion of a lifter in a first rotational position and a second rotational positioning, respectively, with one or more cables 6129 for powering at least one of the pan motor 6115, tilt motor 6120, extend motor 6125 and one or more gripper actuators, as will be described subsequently in detail with regard to implementations.

In implementations, each lifter of the two or more lifters 6100_a-d_ can include a tilt motor 6120_a-d_ for raising and lowering the gripper 6105 with respect to a surface of the conveyor 6030 defined by an x-axis Lux parallel to the direction of travel, or run direction R, of the conveyor 6030 and a y-axis $L_{HX}$ perpendicular to the direction of travel of the conveyor 6030 as shown in FIG. 6A. In implementations, the arm tilt motor 6120_a-d_ is positioned at least a distance of 0-600 cm over the conveyor 6030. In implementations, the arm tilt motor 6120_a-d_ is positioned at least a distance of 300 mm over the conveyor 6030. This ensures significant overlap of the sweep volumes of the arms 6110_a-d_ directly over (e.g., above) the conveyor 6030. In implementations, a tilt motor 6120 comprises an encoder for detecting a position of the lifter 6100. As shown in FIGS. 7C, the tilt motor 6120 of a lifter 6100 is configured to tilt an arm 6110 in a rotational tilt direction θ about a tilt axis T approximately aligned with a longitudinal axis of the tilt motor 6210, thus moving a gripper 6105 upward along a the vertical $L_Z$ (e.g., z-axis).

In implementations, each lifter of the two or more lifters 6100_a-d_ can include an extend motor 6125_a-d_ for pushing and pulling an associated arm 6110_a-d_ forward and back in a linear direction E along an axis 6130_a-d_ of each arm 6110_a-d_ and thereby driving each gripper 6105_a-d_ toward and away from its associated base 6102_a-d_. For example, as shown in FIGS. 7B-F, the extend motor 6125 drives a friction wheel 6126 configured to engage a surface of the arm 6110. The arm 6110 is seated in two or more rotatable support wheels 6127_a-c_ configured to hold the arm in steady alignment as the friction wheel 6126 retracts and extends the arm 6110 therealong into and out of the work volume 6035. In implementations, as depicted in the end view of FIG. 7F, the rotatable support wheels 6127_a-c_ comprise v-groove ball bearings and one or more corners of an arm 6110 is disposed on and movably supported by the v-groove of each bearing. Additionally or alternatively, in implementations, the rotatable support wheels 6127_a-c_ comprise one or more crowned rollers having rounded edges to guarantee no wear on an engaged arm 6110_a-d_. In implementations, the rotatable support wheels 6127_a-c_ are configured to withstand maximum radial and axial loads during high-acceleration motions of a heavy article (e.g., an article comprising a weight in a range of between about 3 kg to 5 kg) supported by each arm 6110_a-d._

In implementations, the extend motor 6125 comprises an encoder for detecting an absolute extend position of the arm 6110. The one or more drive motors 6115_a-d_, 6120_a-d_, 6125_a-d_ can operate simultaneously, in some sub-combination, or alternate operation to move each gripper 6105_a-d_ to a location within the work volume 6035 for engaging a deformable laundry article disposed therein. Each gripper 6105_a-d_ is configured to releasably engage the deformable laundry article and operate at least one of independently of and in tandem with another of the two or more lifters 6100_a-d_ to at least one of raise and suspend the deformable laundry article above the conveyor 6030 (e.g., the floor of the work volume 6035).

In implementations, each arm 6110_a-d_ can comprise an extruded beam configured to extend from an associated base 6102_a-d_ at one of the individually anchored positions A-D. In implementations, an arm 6110_a-d_ can have no joints along its length, and a length from end to end that measures between about 0.25 m and 4 m (e.g., 0.25 m, 0.5 m, 1.0 m, 1.25 m, 1.5 m, 1.75 m, 2.0 m, 2.25 m, 2.5 m, 2.75 m, 3.0 m, 3.25 m, 3.5 m, 3.75 m, 4.0 m). In implementations, each one of the arms 6110_a-d_ is an extendable arm comprising a fully extended length of between about 0.25 m and 4 m (e.g., 0.25 m, 0.5 m, 1.0 m, 1.25 m, 1.5 m, 1.75 m, 2.0 m, 2.25 m, 2.5 m, 2.75 m, 3.0 m, 3.25 m, 3.5 m, 3.75 m, 4.0 m). In examples, the extendable arm can include at least one of one or more flexible joints (e.g., a shoulder, an elbow, a wrist) and two or more telescoping sections (not shown). In implementations, the one or more flexible joints comprises a compliant wrist disposed between the extendable rod of the arm 6110 and the terminal gripper 6105. In implementations, the one or more flexible joints comprises a hinged and/or rotatable wrist disposed between the extendable rod of the arm 6110 and the terminal gripper 6105, as described in more detail in FIGS. 10, 11, 13, and 15A.

In implementations, the pan motor 6115 comprises a power output in a range of between about 30-1800 W. In implementations, the tilt motor comprises a power output in a range of between about 120-3550 W motor. In implementations, the extend motor comprises a power output in a range of between about 60-1690 W motor. The bottom end of the ranges comprise power ratings for pan, tilt, and extend motors controlling an arm 6110 repositioning an article 10 having a weight between about 0.1-1.25 kg or an article having a weight in the range of about 3-5 kg traversing the space slowly (2-5 seconds). The top end of the ranges comprise requirements for repositioning an article 10 having a weight of between about 3-5 kg traversing the space quickly (1-2 seconds), wherein traversing the space comprises moving through a full range of motion of any in individual joint (e.g., pan, tilt, extend). These ranges and values are intended to address the ranges and values of the plurality of varied laundry article types typically generated by a household.

Joints and telescoping arms can be implemented to accommodate space constraints, but the additional moving sections can create pinch points for potential entangling the deformable laundry article 10. In implementations, the motions of each arm 6110_a-d_ have a resolution of +/−5 mm in all three cardinal directions ($L_{HX}$, $L_{HY}$, $L_Z$). This precision enables alignment of an associated gripper 6105_a-d_ before grabbing a grip point 15_a-d_ on a deformable laundry article 10. In implementations, each arm 6110_a-d_ moves the associated gripper 6105*a-d* within a spherical work volume having a radius defined by the arm 6110*a-d*. The linear error introduced by degrees of pan and/or tilt at a full extension of the arm 6110*a-d* comprises a range of about +/−5 mm.

Figure 8A:
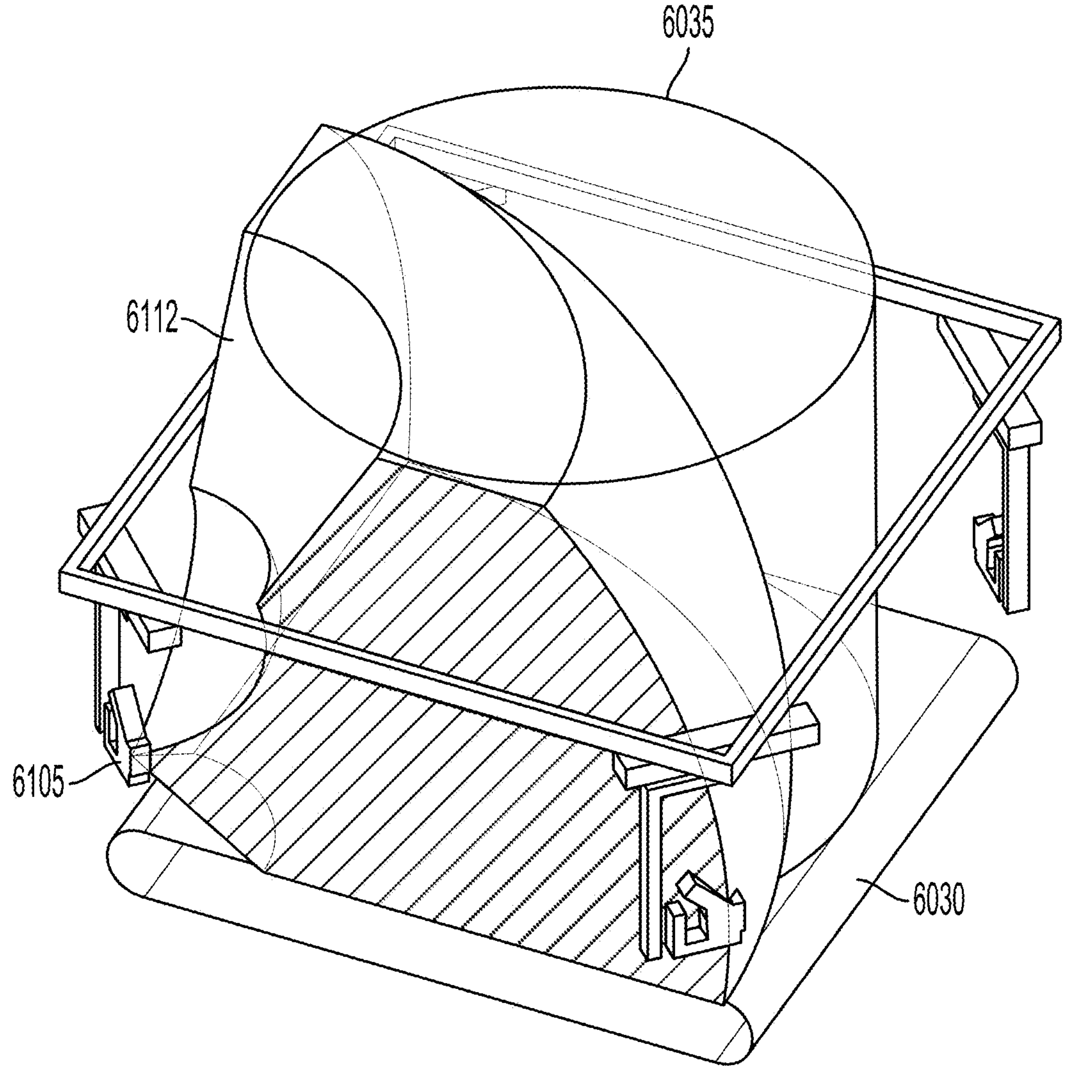
FIG. 8A depicts a schematic example transit volume of one lifter of an autonomous repositioning robot.
Figure 8B:
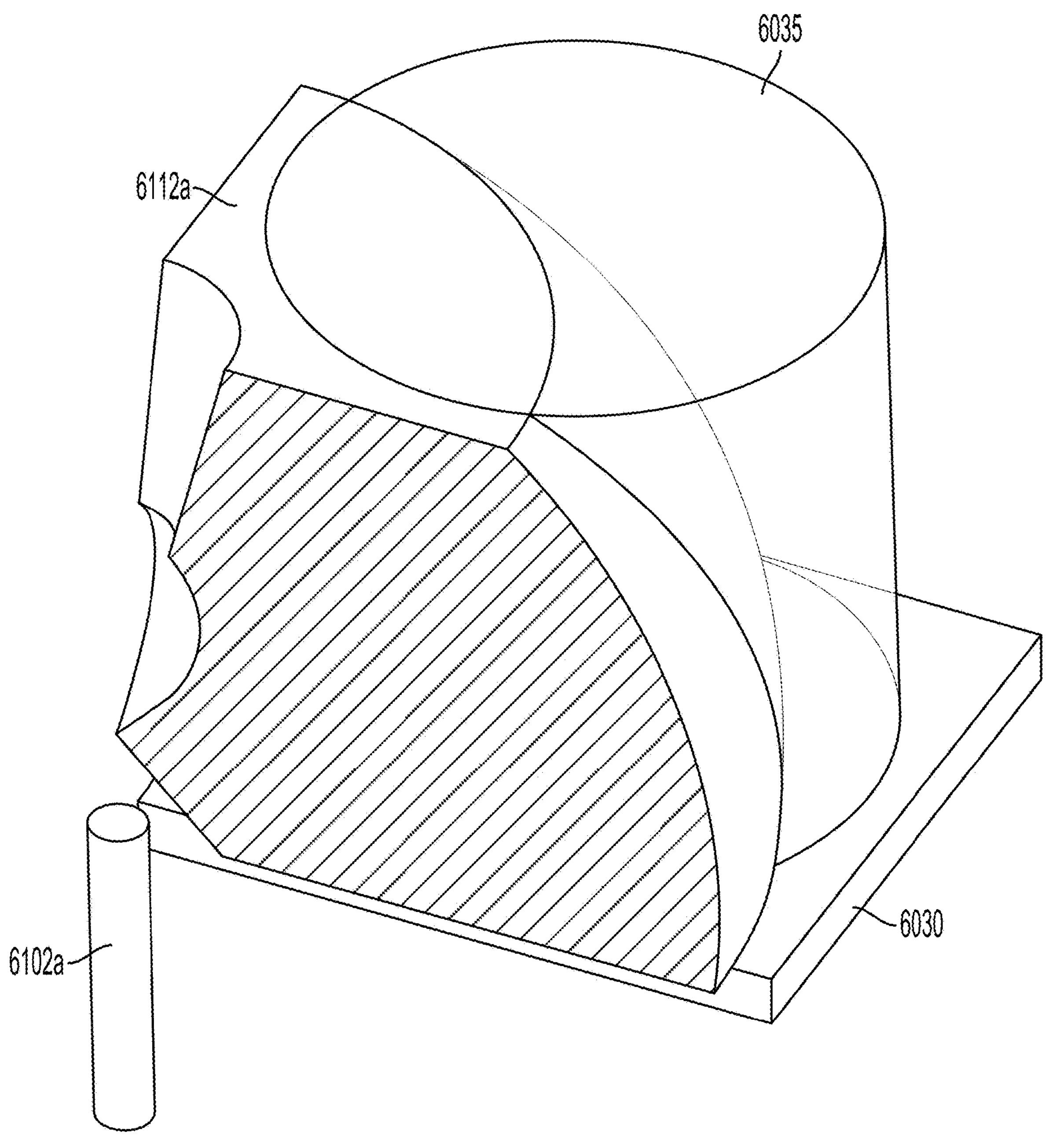
FIG. 8B depicts a schematic example transit volume of one lifter of an autonomous repositioning robot.
Figure 8C:
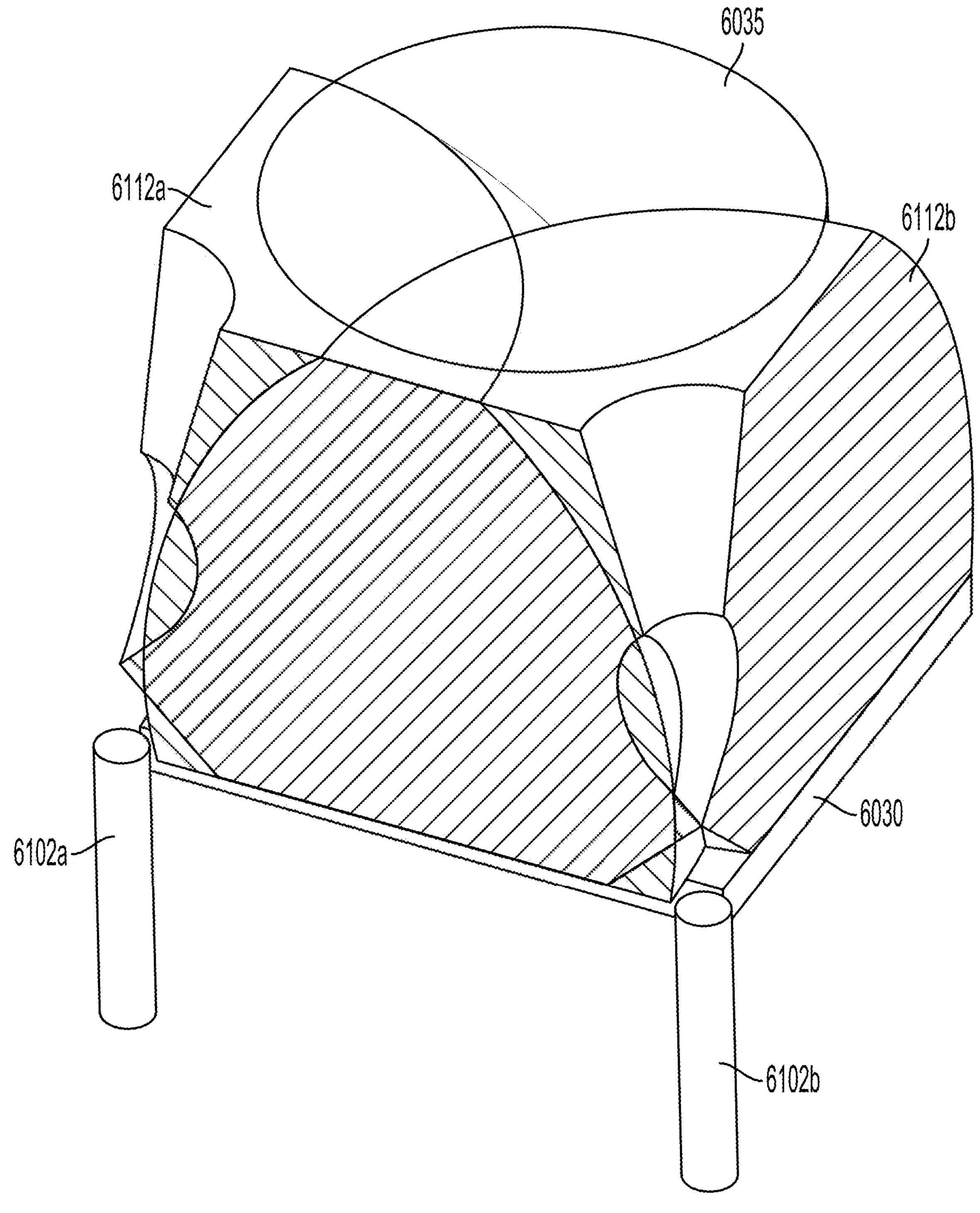
FIG. 8C depicts a schematic example of overlapping transit volumes of two lifters of an autonomous repositioning robot.

As previously described, in implementations, the two or more arms 6110*a-d* comprise four arms anchored about the work volume. In implementations, as shown in FIGS. 8A-C, each arm has a range of motion defining a traversable volume 6112, 6112*a-d* that overlaps with the traversable volumes 6112*a-d* defined by a range of motion of each of the other the two or more arms 6110*a-d*. FIG. 8A depicts a single traversable volume 6112 of an arm mounted above the plane of the conveyor 6030. FIGS. 8B-C depict two traversable volumes of two arms mounted to and panning, tilting, and extending from pedestals on the shared floor beneath the conveyor 6030. (All other arms of the plurality of arms 6100*a-d* are omitted for clarity.)

In implementations adjacent arm traversable volumes 6112*a-d* overlap for at least 0.30 meter (e.g., about 1 ft) for the full vertical height of the work volume 6035, from a surface of the conveyor 6030 to a maximum suspension height SH in the direction of the z-axis $L_Z$ within the work volume 6035. Overlapping the traversable volumes 6112*a-d* within the work volume 6035 ensures that the two or more lifters 6100*a-d* are configured to access a deformable laundry article 10 disposed within the work volume regardless of position and orientation. This enables the repositioning robot 6000 to select a nearest or best positioned associated gripper 6105*a-d* of the two or more lifters 6100*a-d* with which to engage the deformable laundry article successfully and efficiently. In implementations, each arm 6110*a-d* is configured to traverse the work volume 6035 in a range of about 0.5 to 1.25 seconds while an associated gripper 6105*a-d* is engaged with a lightweight article 10 weighing in a range of between about 0.10 kg to 1.25 kg. In implementations, each arm 6110*a-d* is configured to traverse the work volume 6035 in a range of about 0.5 to 2.5 seconds while an associated gripper 6105*a-d* is engaged with an article 10 weighing in a range of between about 2 kg to 3 kg. In implementations, each arm 6110*a-d* is configured to traverse the work volume 6035 in about 2 seconds while an associated gripper 6105*a-d* is engaged with a heavy article 10 weighing about 7.5 kg. In any of the above implementations, traversing the work volume 6035 is defined as any traversal including at least one of a full range of pan, full range of tilt, and full range of extend motions of the arm 6110*a-d* and associated gripper 6105*a-d*.

As previously described, each arm 6110*a-d* of the two or more lifters 6100*a-d* terminates at an associated gripper 6105*a-d* (hereinafter alternatively referred to as "a gripper 6105"). In implementations, a gripper 6105, including the gripper fingers 6107, can be manufactured from a lightweight, impact resistant material, such as aluminum or steel. In implementations, as shown in FIGS. 9A-F, each gripper 6105 comprises at least two actuatable fingers 6107*a-b*. In implementations, the at least two actuatable fingers comprise an overmold 6108*a-b* comprising a durometer of between about 40 A to 90A. For example, the overmold can comprise at least one of a polymer or copolymer including at least one of a rubber, a thermoplastic elastomer, (TPE), thermoplastic polyurethane (TPU), thermoplastic vulcanizates (TPV), and silicone. The overmold provides protection of the encapsulated fingers and any delicate fabrics of the deformable laundry article 10. Additionally, having a soft fingertip enables finer grasping or grabbing of deformable laundry articles 10 from a surface, such as the conveyor 6030. In implementations, a gripping surface of each finger of a gripper 6105*a-d* comprises a textured surface, e.g., ribs, bumps, ridges, and/or other protuberance, for assisting with gripping the fabric of an article with some degree of friction and/or perturbation. Additionally or alternatively, an outside surface (e.g., opposite the gripping surface) of each finger of a gripper 6105*a-d* comprises a smooth surface for preventing the fabric of an article from sticking to an outside surface of the gripper 6105*a-d*.

In implementations, the gripper 6105 is washable and capable of withstanding heavy liquid spray and/or immersion and can have an IP rating of at least one of IP65, IP66, and IP56. In implementations, each gripper 6105 is about 300 mm long, about 100 mm high, and weighs about 500 grams. In implementations, as shown in FIGS. 9G-H, the gripper 6105 comprises a glove 6104 or covering to prevent a deformable article from getting caught on at least one of a topography or interface of movable components of the gripper 6105 during the repositioning process. In implementations, the covering can be a flexible, dirt repellant fabric. Additionally or alternatively, in implementations, the covering comprises a liquid-impermeable material configured for enabling washing of the covered gripper. In implementations, the covering can be at least one of polyester, rayon, thermoplastic polyurethane, nitrile, closed-cell foams, rubbers, silicone, and NEOPRENE. The glove 6104 is flexible and/or stretchable such that the fingers 6107*a-b* can move apart and together without any disruptive resistive forces.

The at least two actuatable fingers 6107*a-b* can rotate about parallel pivot points 6106*a-b*. In implementations, the at least two actuatable fingers 6107*a-b* are configured to be actuated by a drive assembly 6109 to rotate simultaneously while gripping a deformable laundry article 10. In implementations, the drive assembly 6109 can be cable driven or pneumatic. The drive assembly 6109, as shown in FIG. 9F, can be mounted to the arm 6110 and can be 100 mm long and weigh 500 grams. In implementations, the drive assembly 6109 comprises a cross section radius 6111 of less than 100 mm from the axis 6130 of the arm 6110 in any direction.

As previously described with regard to implementations, the gripping surface of the at least two actuatable fingers 6107*a-b* can comprise a textured surface for improved gripping. Additionally or alternatively, in implementations, the gripping surface of each one of the at least two actuatable fingers 6107*a-b* comprises one or more mechanical interlocks (not shown) disposed in the fingers configured to trap the gripped article 10. For example, the one or more mechanical interlocks can comprise at least one of rubber strips that mesh around the article 10 (e.g., like a zipper), a ball and socket, ridged teeth, and mating cones.

In implementations, a gripper 6105 can comprise the following design factors shown in table 1:

TABLE 1

| | |
|---|---|
| Grip strength | 50N |
| Finger strength-to-force ratio | 2.0 |
| Grip force | 25N |
| Contact distance | 80 mm |
| Grip torque | 2 N-m |
| Gripper transmission factor | 22 mm |
| Cable tension | 90N (20 lbs) |
| Cable | 2045 SN [220 lb breaking strength, 7 × 19 construction, 1.12 mm diameter] |
| Motor pulley radius | 14 mm |
| Motor torque | 1.26 N-m |

In implementations, the following definitions apply to the design factors of table 1. Grip strength is the maximum force that can be applied to moving the deformable laundry article

10. It can also be thought of as the force required to pull a deformable laundry article 10 out of a gripper 6105. The at least two actuatable fingers 6107*a-b* are configured to make contact with the deformable laundry article 10 and directly impart the force that moves the deformable laundry article 10 (grip strength). This force is due to a combination of friction (when the force is generally parallel to the gripping surface) and normal tension (e.g., when the deformable laundry article 10 is wrapped over one of the two or more fingers 6107*a-b*). In implementations, such as that depicted in FIGS. 9C and 9D, the gripper 6105 comprises a sweet spot SS which comprises the volume between the two fingers 6107*a-b* in which an article must be (e.g., the contact area CA) when the gripper actuates in order for the grasp to be successful.

Grip force is the force the two or more fingers 6107*a-b* push against each other (when empty) or the deformable laundry article 10 (when engaged). The grip force is determined by the grip torque and the contact distance CD (e.g., distance between finger pivot 6106 and contact point with the deformable laundry article 10 as shown in 9C). If the deformable laundry article 10 is engaged at a single point, the grip force equals the grip torque divided by the contact distance. In embodiments, calculations are based on the center of the contact area defining the contact point. Strength-to-force ratio is the ratio between grip strength and grip force. In implementations, grip strength and grip force are directly proportional so that the ratio is fixed for a given combination of finger 6107, deformable laundry article 10 type and shape. In other implementations, grip strength and grip force have a sigmoidal relationship. For example, this applies to grippers 6105 that create a normal force or otherwise 'lock' the deformable laundry article 10 into place between the fingers 6107*a-b*. Grip torque is the torque on the joints of the fingers 6107*a-b*. This is dependent on the cable tension and gripper geometry and can be increased by increasing the lever arm in the gripper 6105, but this increases the gripper size. Cable tension is dependent on the motor torque and lever arm at the motor. This sets the minimum diameter of the cable. Cable tension can be increased by decreasing the motor lever arm, but in implementations using a pulley wheel, a minimum diameter is required to ensure the cable does not break. Motor torque is minimized to reduce cost and weight of the motor.

Figure 9A:
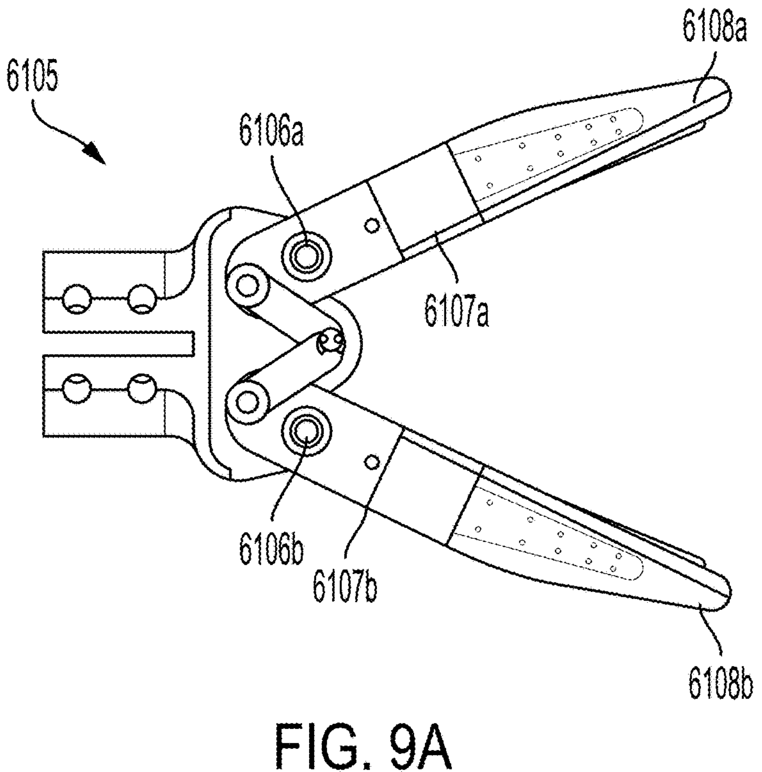
FIG. 9A depicts an example gripper of an autonomous repositioning robot including a driven linkage.
Figure 9B:
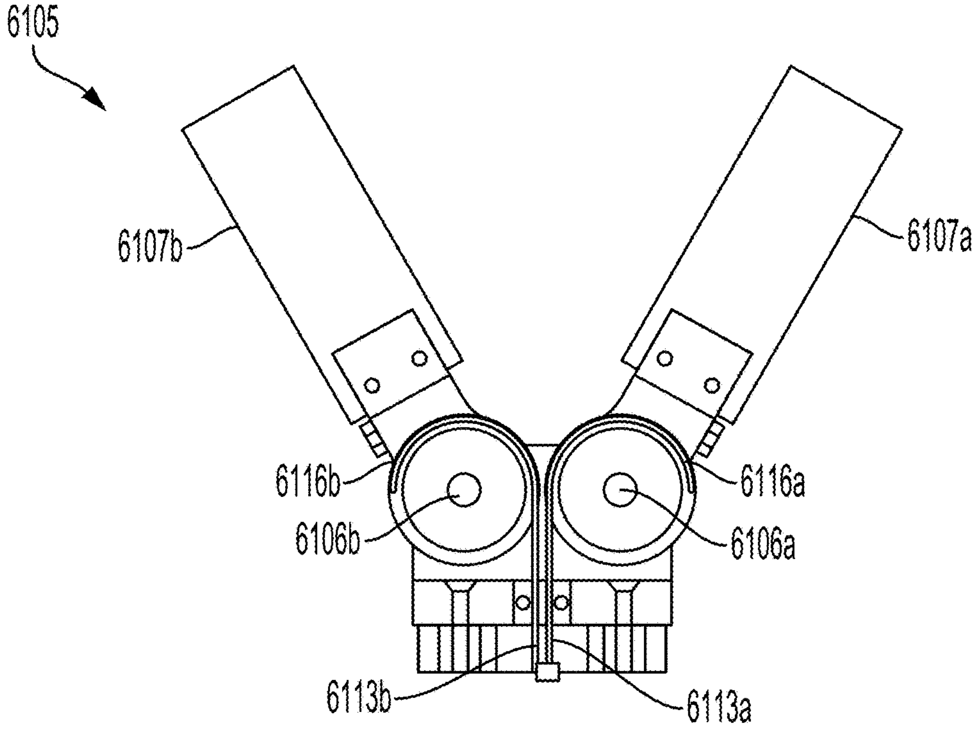
FIG. 9B depicts an example pulley driven gripper of an autonomous repositioning robot.
Figure 9C:
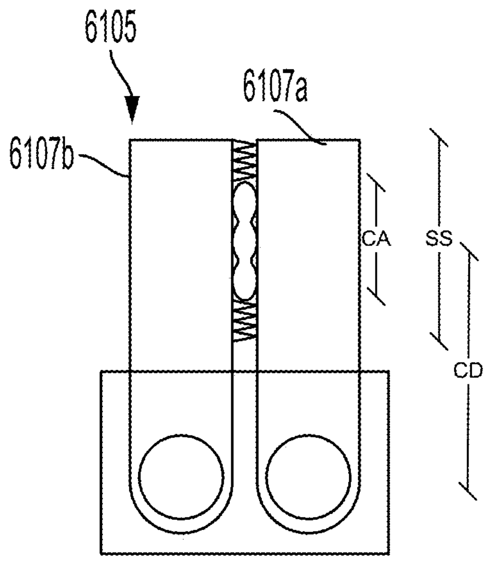
FIG. 9C depicts an example schematic of a gripping region of a closed gripper of an autonomous repositioning robot.
Figure 9D:
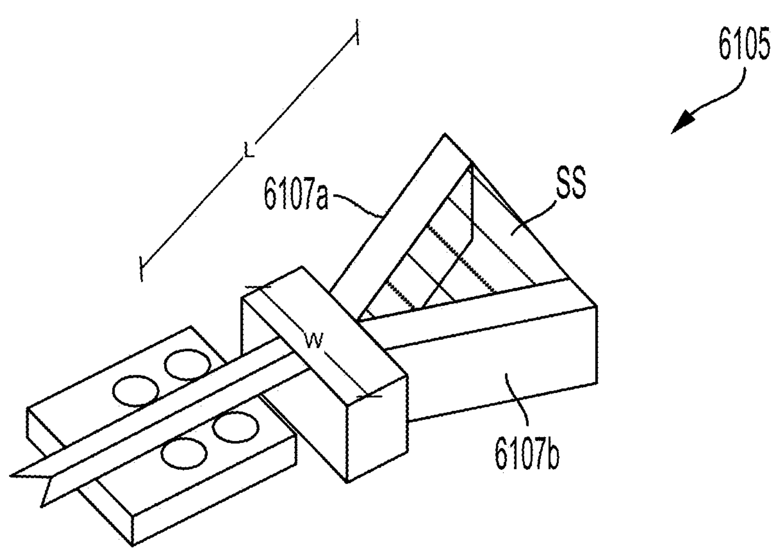
FIG. 9D depicts a perspective view an example gripping region of an open gripper of an autonomous repositioning robot.
Figure 9E:
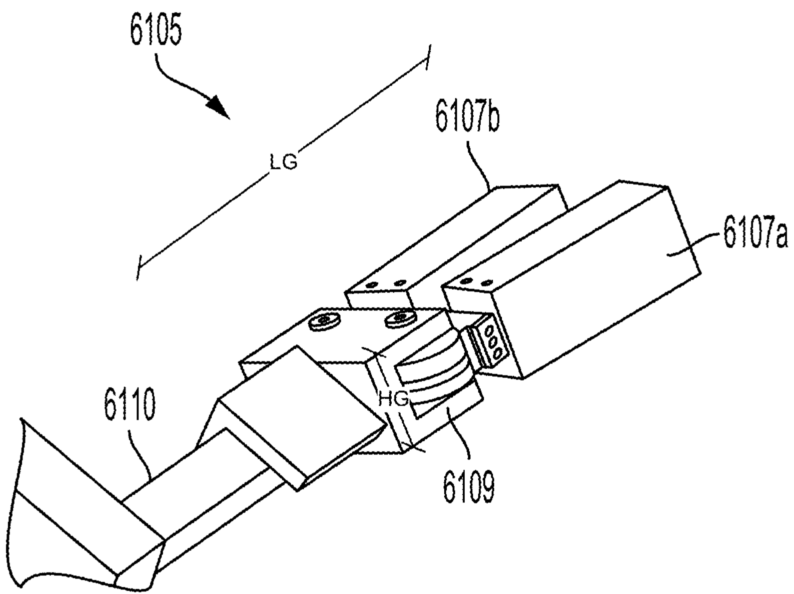
FIG. 9E depicts a perspective view of an example pulley driven gripper of an autonomous repositioning robot.
Figure 9F:
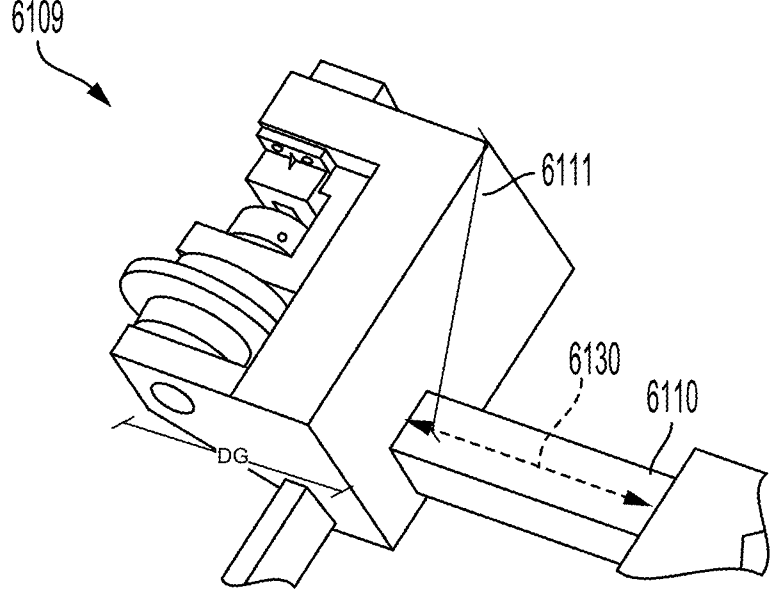
FIG. 9F depicts an example gripper drive on the back end of a lifter arm of an autonomous repositioning robot.
Figure 9G:
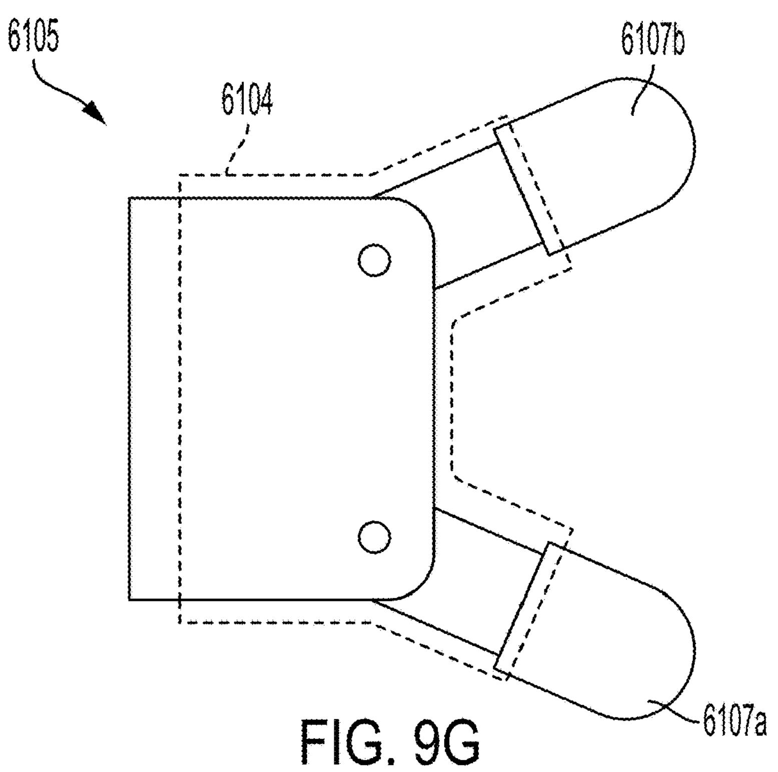
FIG. 9G depicts an example gloved gripper in an open position.
Figure 9H:
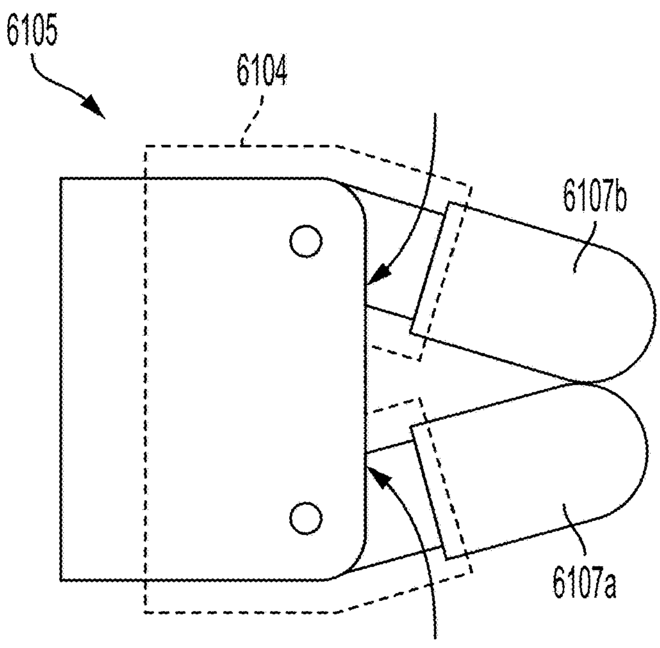
FIG. 9H depicts an example gloved gripper in a closed position.
Figure 10:
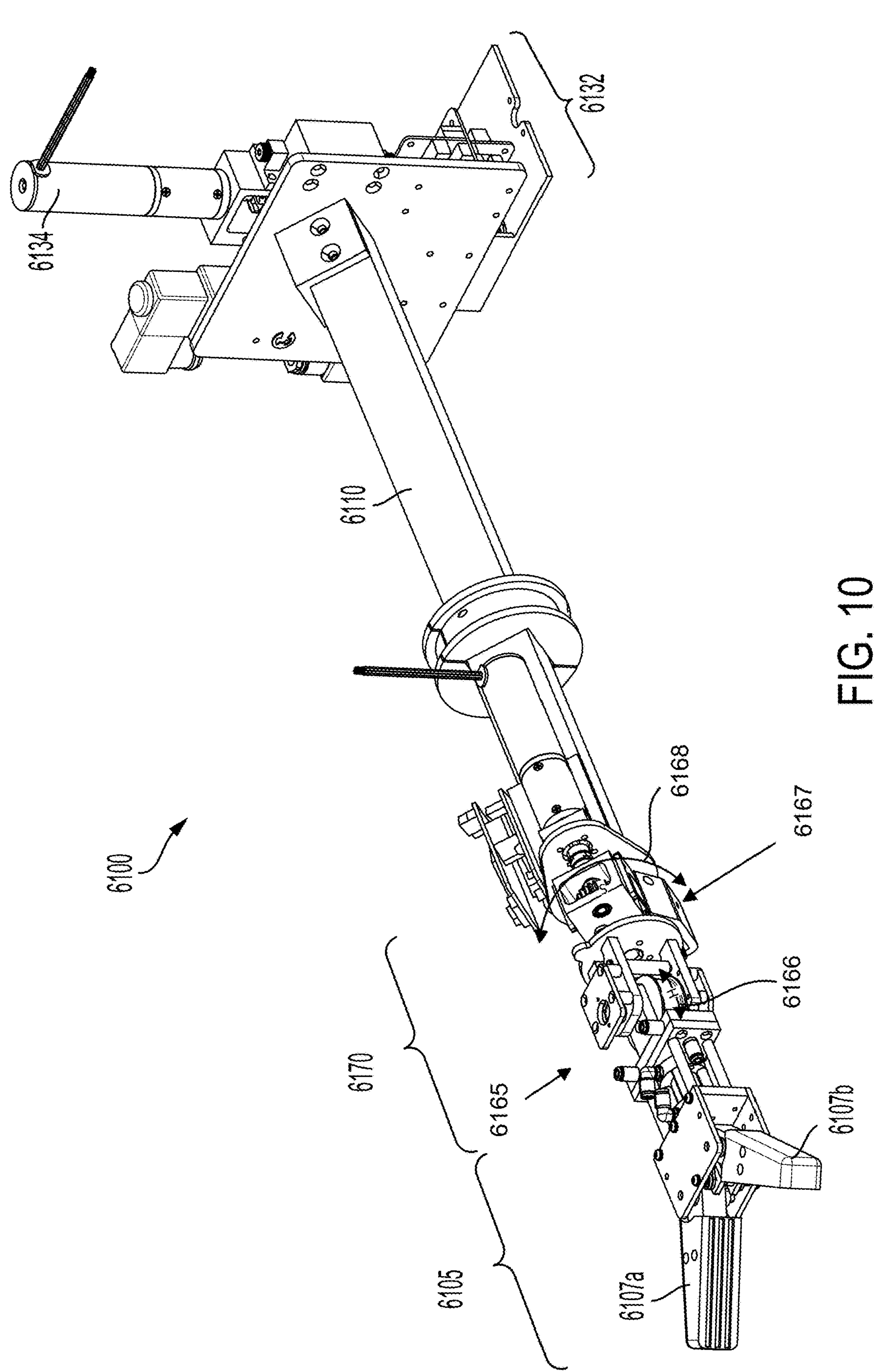
FIG. 10 depicts an end perspective schematic of an example of an arm and gripper of a lifter of an autonomous repositioning robot.
Figure 11:
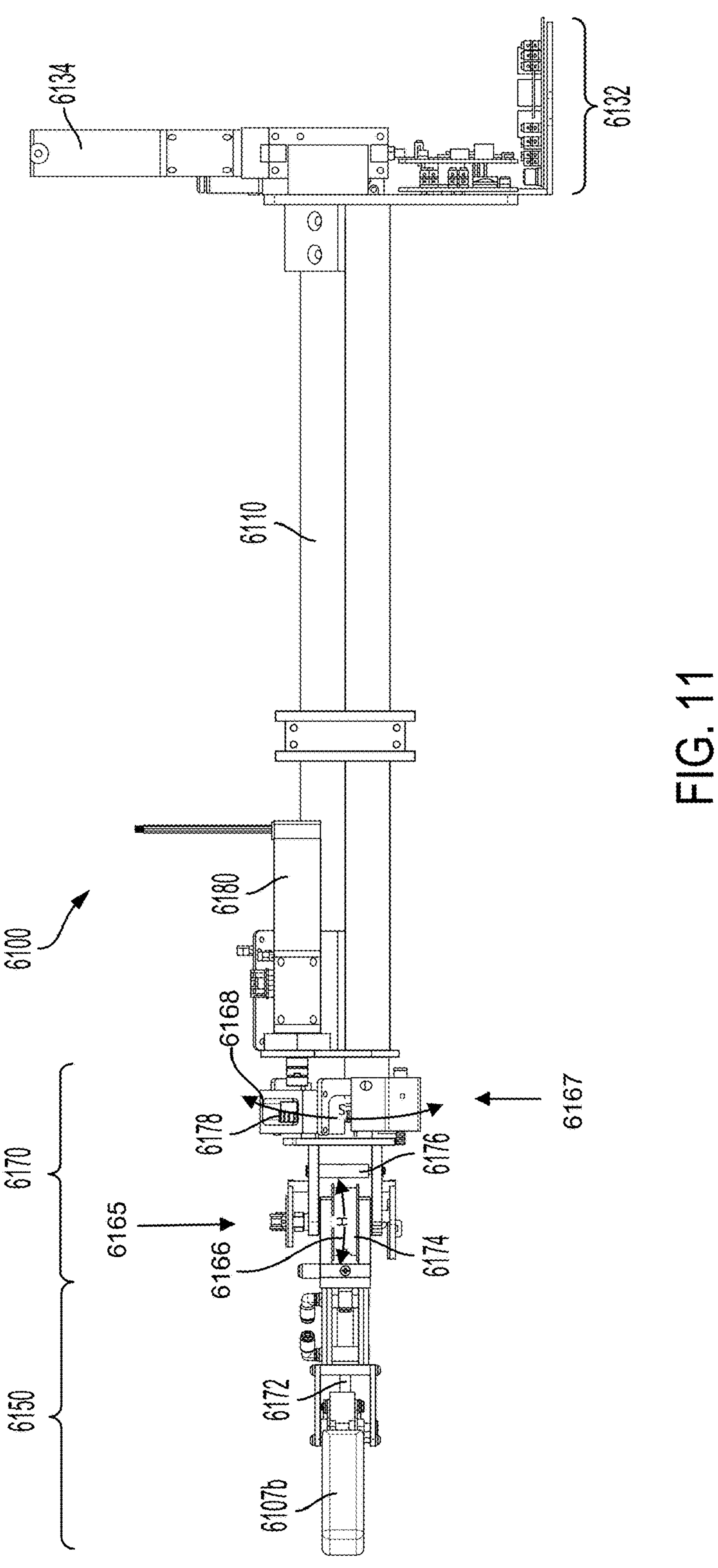
FIG. 11 depicts a side view of the example arm and gripper of FIG. 10.
Figure 12:
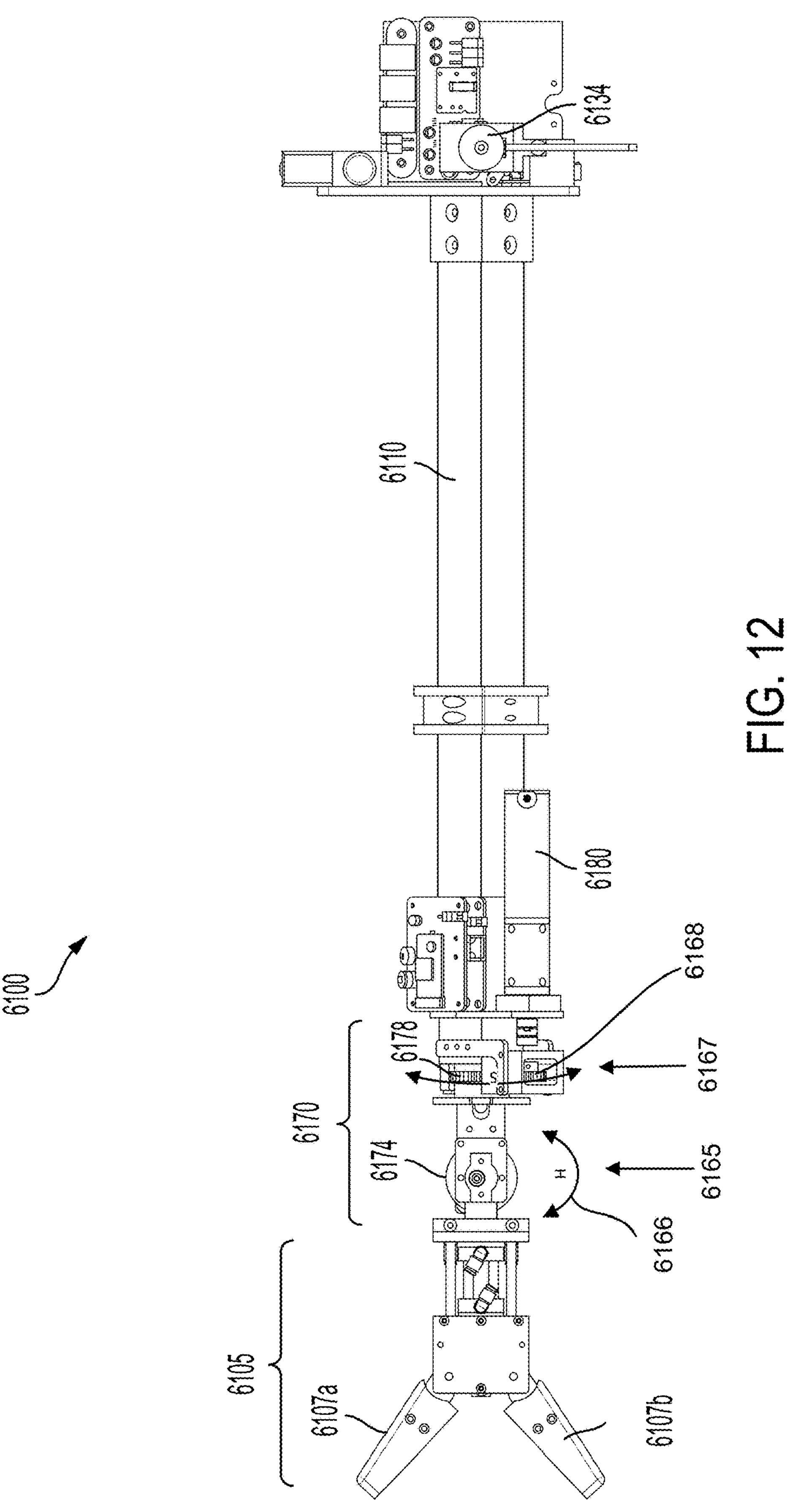
FIG. 12 depicts a side view of the example arm and gripper of FIG. 10 rotated out of the page 90 degrees.
Figure 13:
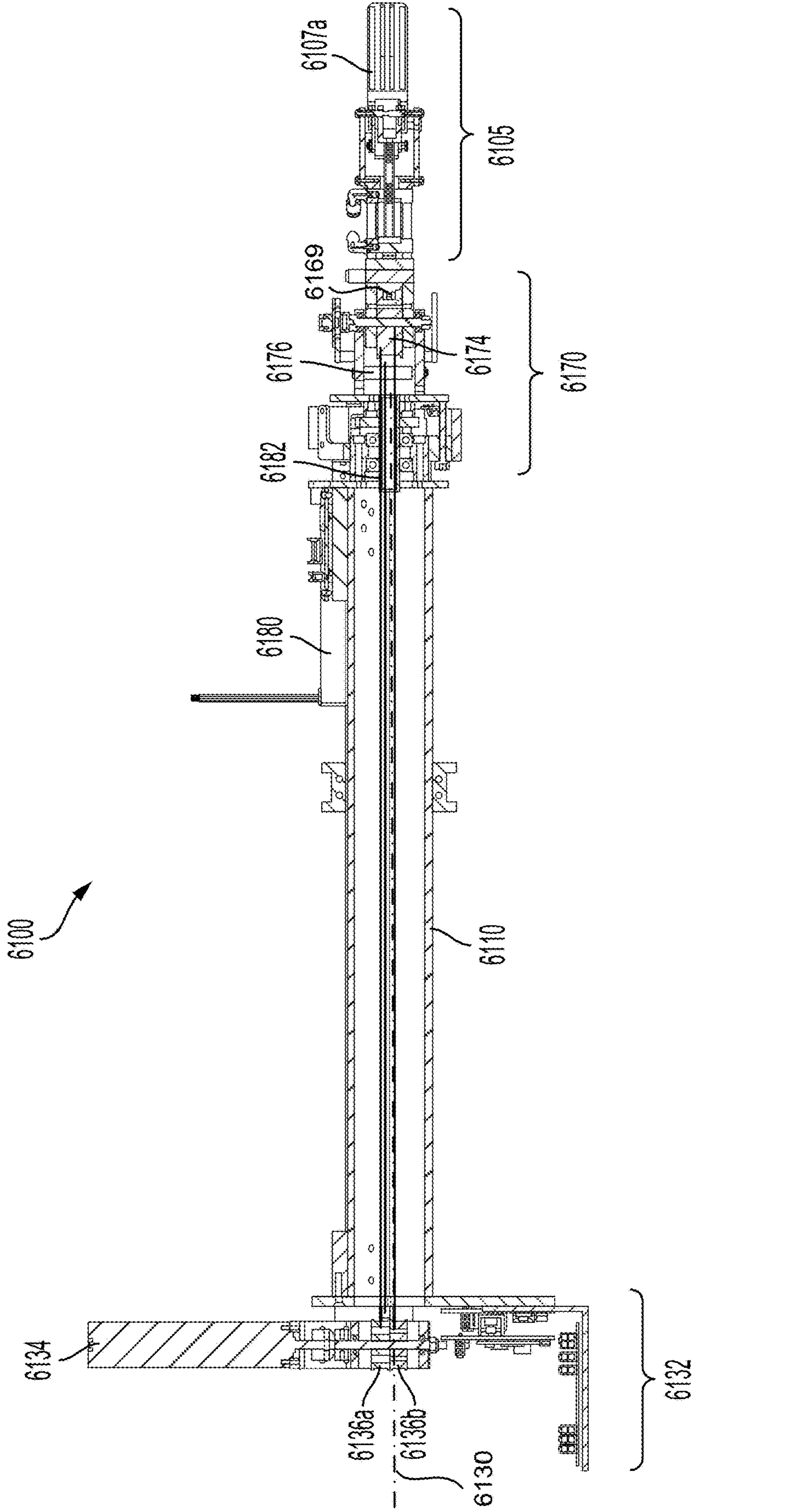
FIG. 13 depicts a cross sectioned side view of the example arm and gripper of FIG. 10.
Figure 14:
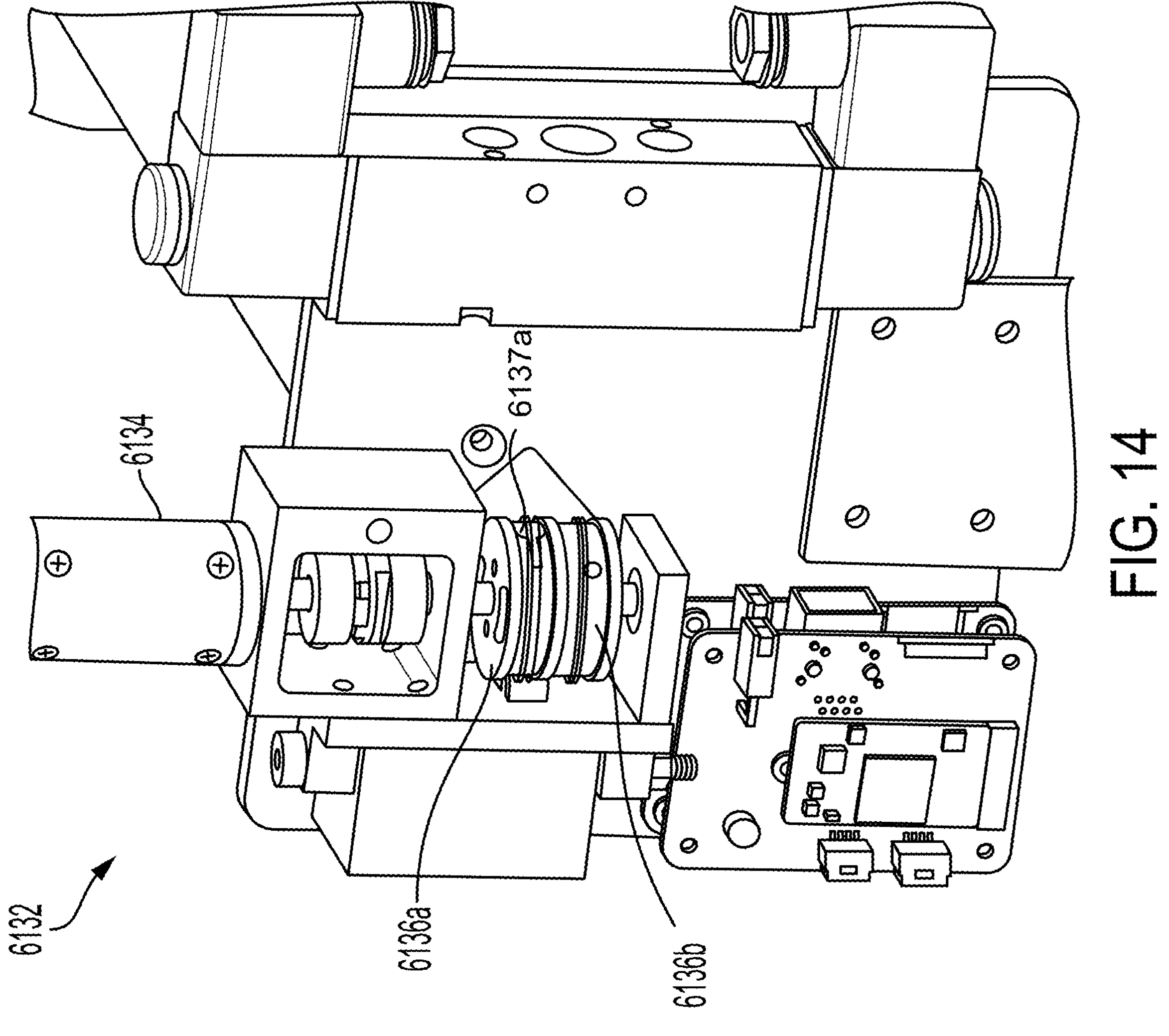
FIG. 14 depicts a schematic view of an example end portion of the arm of FIG. 10.

FIGS. 9A-B depict exemplary grippers comprising linkages and pulleys, respectively, for moving the fingers 6107*a-b* by turning translational cable displacement into angular motion. In one implementation employing a pulley (FIG. 9B), two cables 6113 are threaded through the finger joints 6116. In another implementation employing linkages (FIG. 9A), a single cable is looped around a pin. The linkage system is configured to amplify torque as the fingers 6107*a-b* close.

Figure 15A:
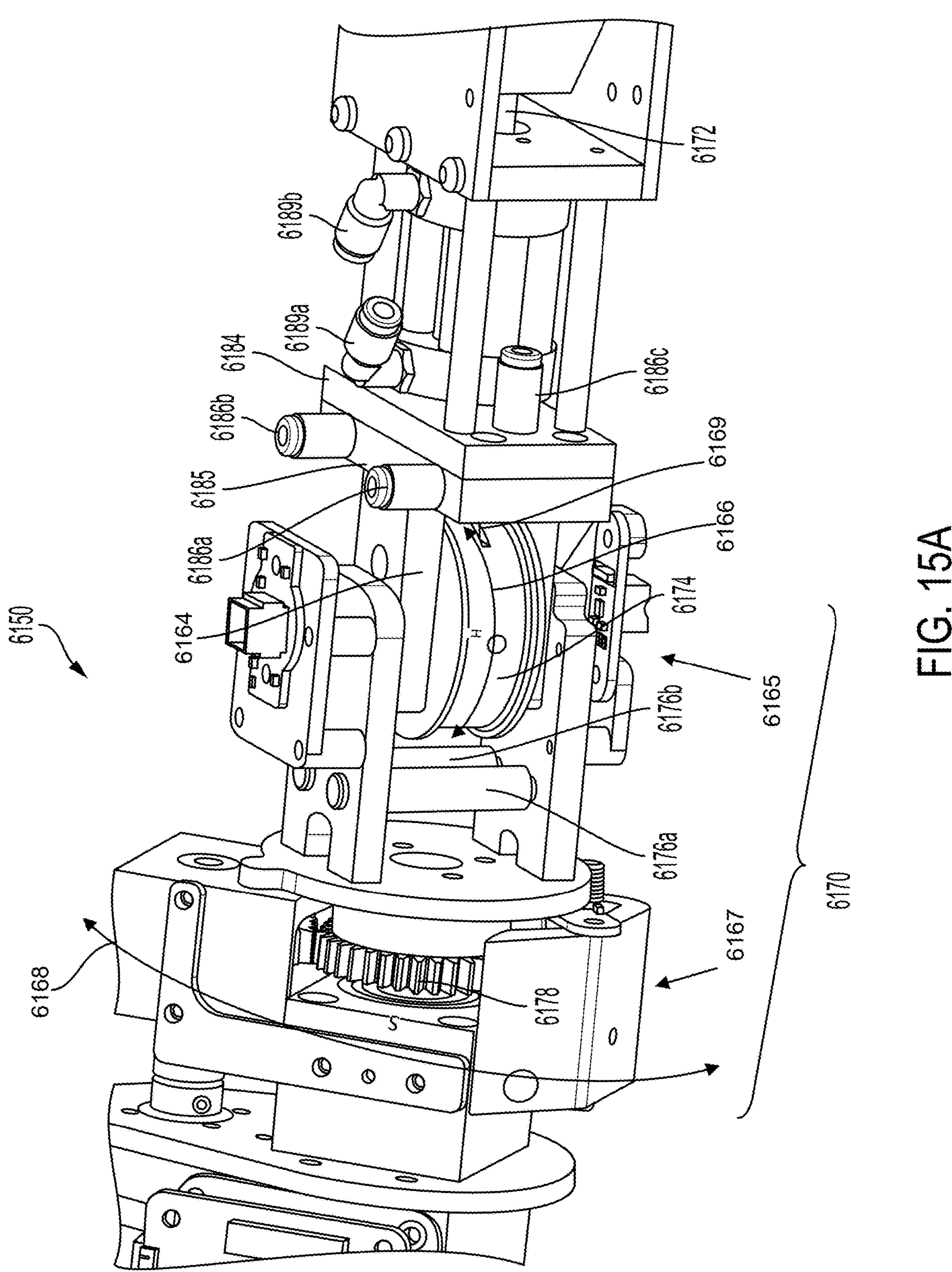
FIG. 15A depicts a schematic view of an example wrist portion of the arm of FIG. 10.
Figure 16A:
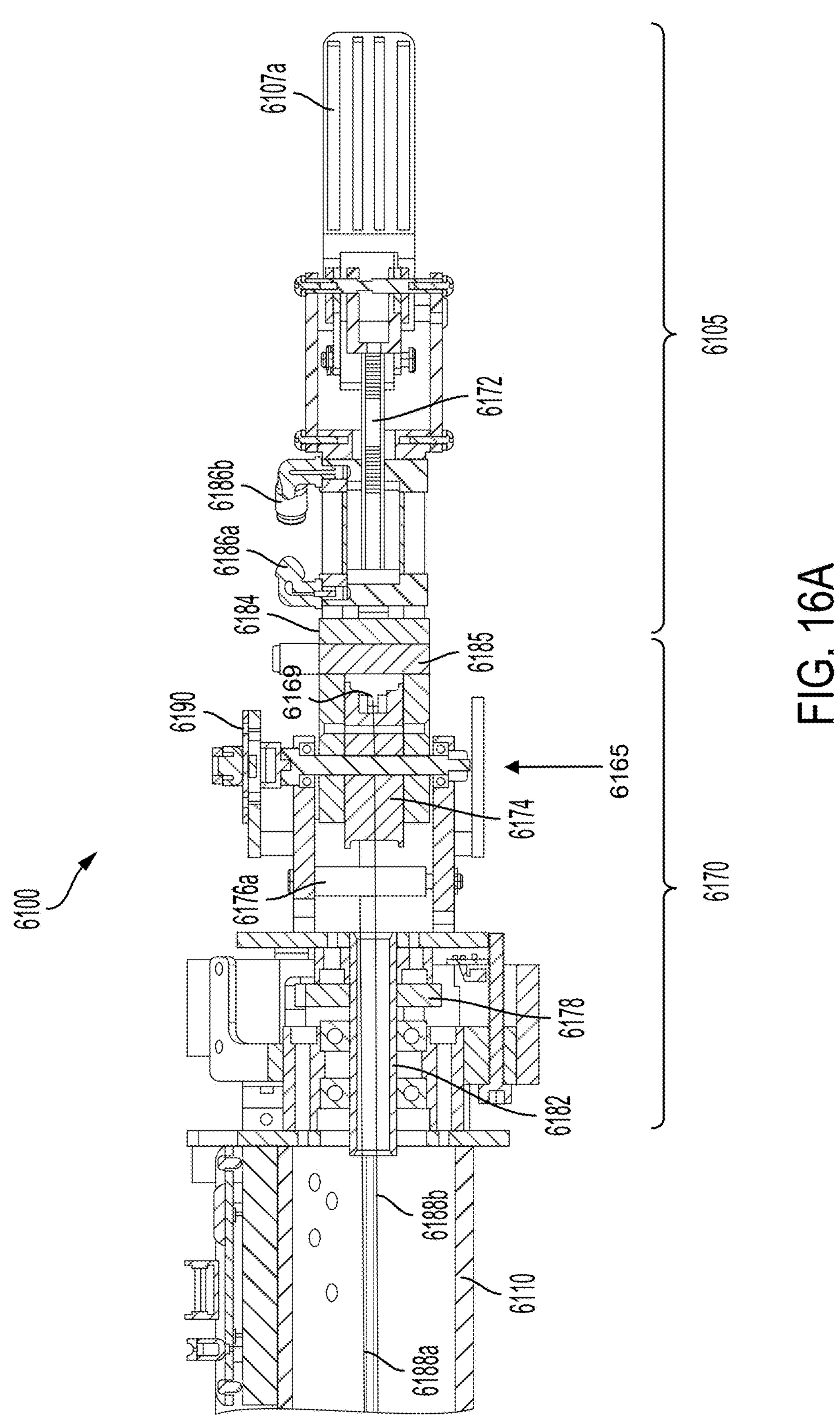
FIG. 16A depicts a cross section schematic view of an example wrist portion of the arm of FIG. 10.
Figure 16B:
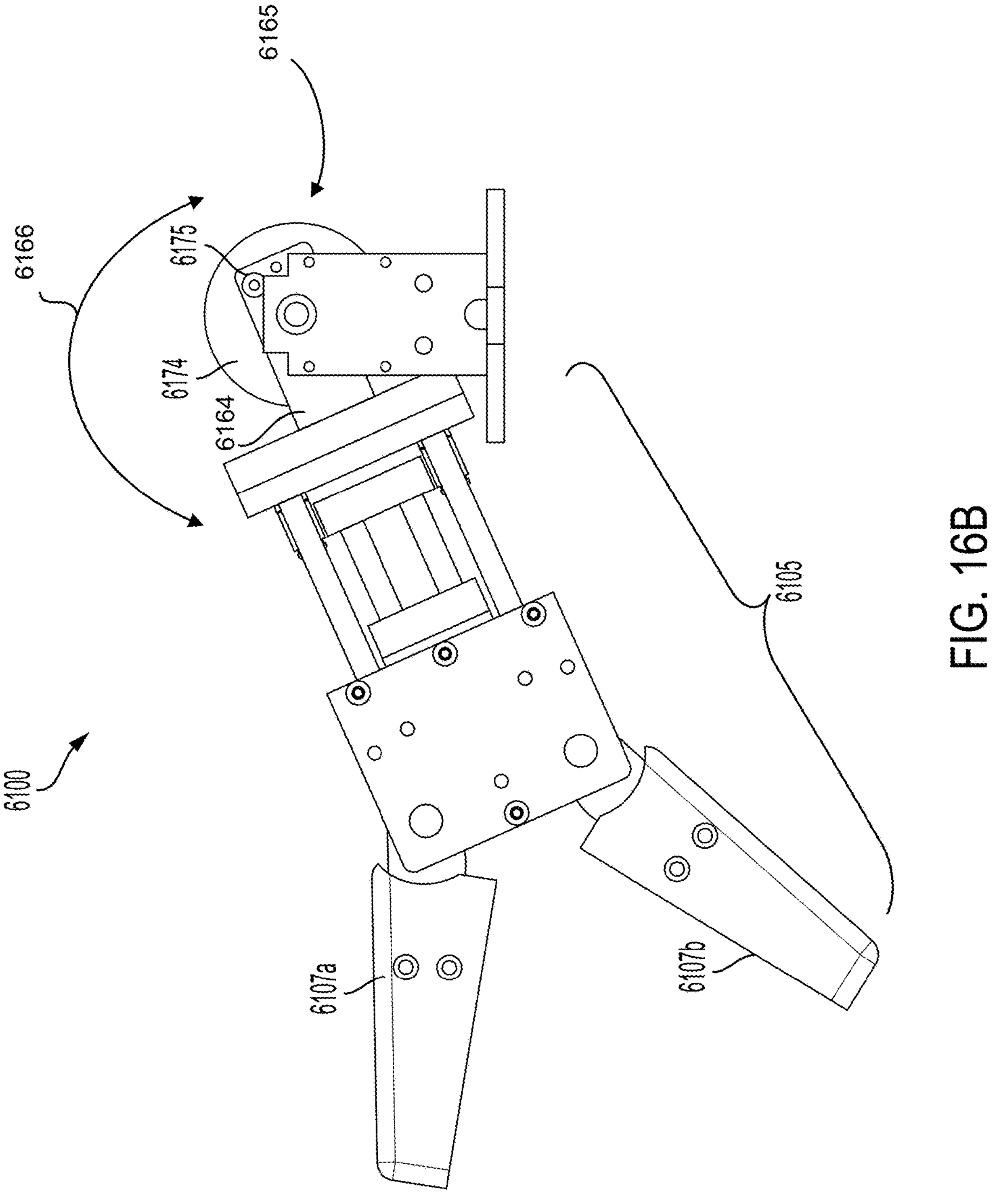
FIG. 16B is an example schematic of a hinged gripper of FIG. 10 in a fully flexed state.
Figure 16C:
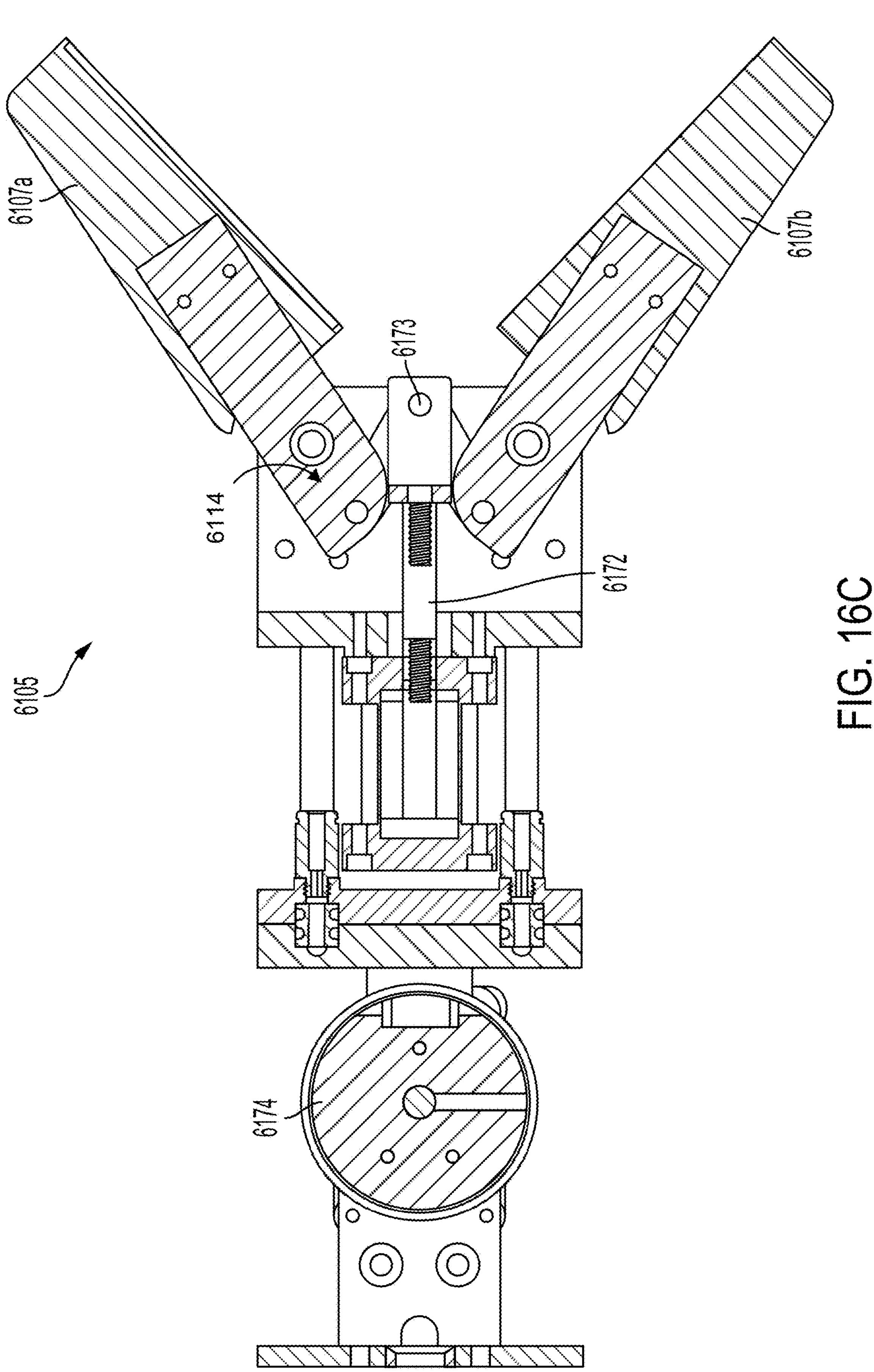
FIG. 16C depicts a cross section view of an example schematic of a hinged gripper of FIG. 10 in an open gripper state with the hinge cover plate removed.
Figure 16D:
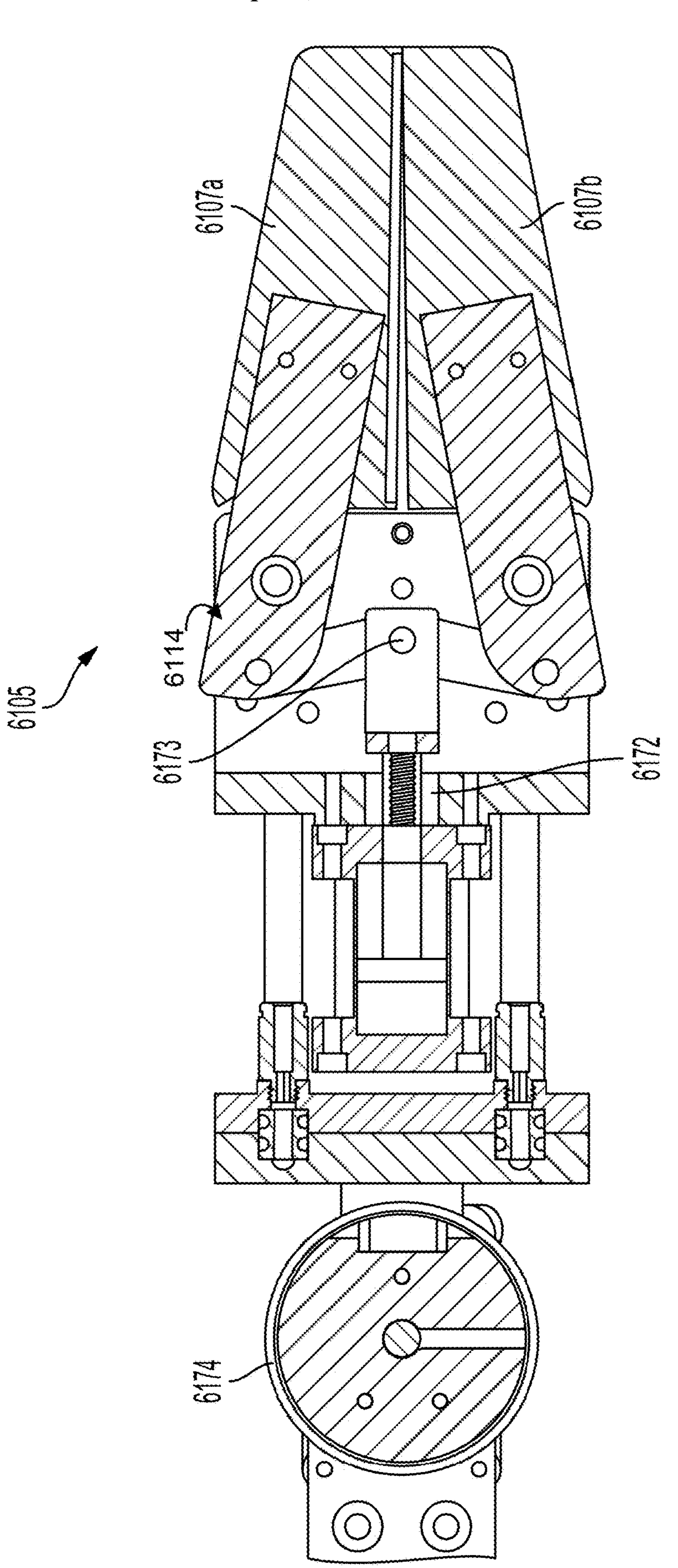
FIG. 16D depicts the hinged gripper of FIG. 16C in a closed gripper state.

In other implementations, as shown in FIGS. 10-16D, a gripper 6105 can comprise a pneumatic actuator. In implementations, as depicted in FIGS. 16C-D, the fingers 6107*a-b* are joined by linkages 6114 to one another and an actuatable cylinder 6172. The gripper 6105 is lightweight, quickly actuated, and built to withstand cycles on order of magnitude in the millions or higher. In implementations, at least one pneumatic tube runs through a hollow conduit extending the length of the arm 6110. In implementations, two pneumatic tubes run through the hollow conduit, each one of the pneumatic tubes configured to be in fluid connection with one of two sides of a pneumatic actuator. The gripper mechanism is driven by a linear motion, which is translated into finger rotation by the linkages 6114 symmetrically disposed about the actuatable cylinder 6172. In implementations, the controller 6005 actuates the gripper 6105 to close (e.g., clamp shut) the fingers 6107*a-b* by pressurizing one side of a pneumatic actuator. In implementations, the controller 6005 actuates the gripper 6105 to open (e.g., spread apart) the fingers 6107*a-b* by pressurizing the other side of the pneumatic actuator. Additionally or alternatively, in implementations, the fingers can be held open by a cylinder and return spring assembly, which can be weak enough to allow any tangled deformable laundry article 10 to slip off the fingers. Pneumatic actuators have the advantage of being easy to seal against ingress of dirt and germs.

As described herein with regard to implementations, the arm 6110 comprises a hollow tube. In implementations, two or more cables running through the arm comprise at least one of one or more pneumatic tubes, one or more power cables for the swivel joint 6167, and one or more Ethernet cables for the swivel joint 6167. Additionally, or alternatively, in implementations, two or more cables are configured to connect to a break out box on the non-gripper end of the arm 6110. Alternatively, the arm 6110 can comprise a switch (not shown) on the non-gripper end of the arm and minimize the amount of cables running therethrough.

In implementations, the cables 6129 going through a pan joint of a lifter 6100 can comprise, for example, a plurality of Ethernet cables. The plurality of Ethernet cables comprise at least two of the following: one for communicating with the tilt drive, one for communicating with the extend drive, one for communicating with a wrist assembly 6170 swivel drive, and one for communicating with a wrist assembly 6170 hinge drive, one of which hinge and swive drive cables also communicates with a drive of the gripper 6105 for opening and closing the fingers 6107*a-b*. Additionally or alternatively, in implementations, the cables 6129 going through a pan joint of a lifter 6100 comprise a plurality of power cables comprising two 8-conductor power cables configured to transmit power for the tilt and extend motors, and two 2-conductor power cables, one of which powers all logic (e.g., logic for extend and tilt) and the other of which provides power to a wrist assembly 6170, gripper 6105 control, logic for the wrist and gripper 6105. Additionally or alternatively, in implementations, the cables 6129 going through the pan joint of a lifter 6100 comprise at least one pneumatic tube configured to open and close the gripper 6105.

In implementations, the cables extending from through the hollow of the arm 6110 to the wrist assembly 6170 and gripper 6105 comprise at least one of the following cables: a cable for transmitting swivel motor power for the wrist assembly 6170, at least one cable for transmitting logic power, at least one cable for transmitting wrist assembly 6170 swivel motor data (e.g., Ethernet cable), one pneumatic tube for opening the gripper 6105, one pneumatic tube for closing the gripper 6105, at least one hinge actuation cable 6118, 6118*a,b* (e.g., steel cable), at least one hinge encoder cable, and at least one hinge limit switch cable.

Alternatively, in implementations, the cables 6129 going through a pan joint of a lifter 6100 comprise, for example, one Ethernet cable connected to a switch and communicating with the tilt drive, extend drive, wrist assembly 6170 swivel drive, wrist assembly 6170 hinge drive, gripper 6105, and any additional sensors (e.g., absolute position sensors). Additionally or alternatively, in implementations, the cables 6129 going through a pan joint of a lifter 6100 comprise a plurality of power cables comprising one 8 or more conductor power cable configured to transmit power for the tilt, extend, wrist assembly 6170 swivel drive, and wrist assembly 6170 hinge drive and a 2-conductor power cable configured to transmit power for the logic. In implementations, one 8 or more conductor power cable is configured to transmit power for all motor drives and that power is also regulated to provide power for all logic. Additionally or alternately, in implementations, the power cable can be any number of conductors, configured to be flexible enough to allow pan rotation and with sufficient current-carrying capacity to power all motor drives and logic. In implementations, the cables further comprise at least one pneumatic tube to power opening and closing a pneumatic gripper.

In implementations, as shown in FIGS. 10-13, and 15A the lifter 6100 comprises an arm 6110 terminating at a wrist assembly 6170 and a gripper 6105 releasably fixed thereto. The a wrist assembly 6170 terminating at the gripper 6105 configured to extend into the work volume. Disposed on the opposite end of the arm 6110 is a backend assembly 6132 which will be described subsequent in detail with regard to the implementation of FIG. 14.

As previously described with regard to FIG. 5, in implementations, each lifter 6100*a-d* comprises an actuatable wrist assembly 6170 comprising a wrist drive 6355 in operable communication with the controller 6005 for rotating and/or tilting the wrist assembly 6170 to which a gripper 6105 is attached. Additionally or alternatively, in implementations, each lifter comprises one or more gripper sensors 6360 such as one or more sensors for detecting an angular position of a gripper 6105 comprising a rotatable and/or hinged wrist and fingertip pressure sensors disposed in the fingers of the gripper for detecting contact forces with an article of clothing and/or the workspace floor 6030.

As shown for example in the cross section view of the wrist assembly 6170 of FIGS. 16A, C-D, an actuatable cylinder 6172 is configured to move in and out so that a center pin 6173 between the linked fingers 6107*a-b* of the gripper 6105 moves down during actuation of the cylinder 6172 and the fingers 6107*a-b* of the gripper 6105 close like a vice grip. The actuated cylinder 6172 is configured to pull at 10 lbs force so that fingers 6107*a-b* of the gripper 6105 close with at least 10 lbs force thereby enabling a very strong grip with single pneumatic actuator. In implementations, the fingers 6107*a-b* of the gripper 6105 close with a force therebetween in a range of between about 5 and 30 lbs of force. In implementations, the fingers 6107*a-b* of the gripper 6105 close with a force therebetween in a range of between about 10 to 15 lbs of force. The pneumatic actuatable cylinder 6172 is lightweight compared to gripper actuated with a motor, and the gripper 6105 is compact because the actuatable cylinder 6172 disposed thereon does not require power and data cables extending through a rotation joint. In implementations, the actuatable cylinder 6172 is configured to be back driven. In implementations, the wrist assembly is easy to remove and service. As shown in FIGS. 15A-B, air is routed to a back block 6185 at, for example, a pressure of 20 psi. The front block 6184 comprises a plurality of pass throughs sealed with O-rings to prevent leakage. FIG. 15B shows a pass through and O-ring 6187 with the front block 6184 removed. All actuation passes through the front and rear blocks where wrist assembly 6070 is mounted to the remainder of the wrist disposed on the arm 6110. Pneumatic tubes extend from back fittings 6189*a-b* disposed on the back block 6185 and pass down the hollow center of the arm. The passthroughs are routed through front fittings configured to connect to pneumatic cylinder actuator fittings 6189*a-b*.

In implementations comprising a pneumatic cylinder at 100 psi, a gripper 6105 can comprise the following design factors shown in table 2:

TABLE 2

| | |
|---|---|
| Grip strength | 50N |
| Finger strength-to-force ratio | 2.0 |
| Grip force | 25N |
| Contact distance | 80 mm |
| Grip torque | 2 N-m |
| Gripper transmission factor | 22 mm |
| Piston force | 111N (25 lbs) |
| Piston bore size (assuming 100 psi) | 9/16" |

In implementations, as shown in FIGS. 10-13, 15A, and 16A, the wrist assembly 6170 comprises a hinge joint 6165 and a swivel joint 6167. This hinge joint 6165 enables the wrist assembly 6170 to tilt the gripper 6105 from side to side in the direction of arrow 6166 for an improved grasping angle and the swivel joint 6167 enables the wrist assembly 6170 to rotate bidirectionally around a longitudinal axis 6130 of the arm 6110 in the direction of double arrow 6168. This enables the wrist assembly 6170, for example to, twist and disentangle the gripper 6105 attached thereto from an entangled article stuck thereon and/or twisted on or both fingers 6107*a-b* of the gripper 6105. In implementations, during a twist maneuver, the lifter is configured to drop the gripper 6105 down and move it away from the article out at or faster than the speed of gravity such that the article thereon falls freely onto the conveyor 6030.

In implementations, as shown in FIGS. 15A and 16A, the hinge joint 6165 comprises a pulley 6174 comprising a slot 6169 in one side comprising a central "divot" (e.g., rectangular opening wider than the remainder of the slot). The divot (not shown) is configured to receive there in an end stop (e.g., a swage or ferrule) (not shown) of each of two cables 6188*a-b*. The inner wall between the slot 6169 and the divot prevents the at least two cables 6188*a-b* from sliding. As the pulley 6174 turns, it pulls the at least two cables 6188*a-b* and relies on the strength of the swage to retain the ends of the cables in the slot 6169. In implementations, the at least two cables 6188*a-b* are configured to thread through the slot 6169 on the outside surface of the pulley 6174 with the swage secured therein, wrap around pulley 6174, and extend down the hollow interior of the arm 6110. Friction forces imparted by wrapping the two cables 6188*a-b* around the pulley 6174 alleviates some of the force imparted on the swage.

In implementations, as the gripper 6105 swivels around the swivel joint 6167, the at least two cables 6188*a-b* will cross and touch. In implementations, the at least two cables 6188*a-b* therefore are coated to prevent wear from crossing and touching.

Because the extend arm 6110 is straight, the at least two cables 6188*a-b* are protected from wear cycles that would otherwise be associated with routing over one or more additional pulleys. The at least two cables 6188*a-b* extend from the pulley 6174 to respective idler wheels 6176*a-b* and a pass through a tube 6182 configured to direct the at least two cables 6188*a-b* into the hollow interior of the arm 6110. The at least two cables 6188*a-b* extend through the hollow interior down the length of the arm 6110 and out the back end of the arm 6110 to two motor end pulleys 6136*a-b* as shown in FIGS. 13-15A and 16A. The two motor end pulleys 6136*a-b* are rotated by motor 6134. Because the hinge motor 6134 is mounted on the back end (e.g., the end opposite the gripper 6105) of the arm 6110, the gripper end of the arm

6110 remains lightweight for improved agility in gripping and raising the mass of an article. The hinge motor 6134 being mounted on the back end of the arm 6110 relieves tilt motor from having to lift that weight and makes the lifter 6100 more capable of moving heavier articles.

In implementations, the motor end pulleys 6136*a-b* are “split” for improved tensioning, each one of the pulleys receiving an end of a respective one of the at least two cables 6188*a-b*. The at least two cables 6188*a-b* extending out the back end of the arm 6110 are respectively for laterally tilting the wrist 6150 in opposite directions as indicated by bidirectional arrow 6166. One of the cables 6188*a-b* emanates from a left side of the pulley slot 6169 of the pulley 6174 and the other from the right side of the gripper side pully slot 6169. In implementations, the right side cable 6168*b* is constructed by dropping a terminating swage into the central divot of the slot 6169. With a terminating swage of the cable secured inside the hinge pulley 6174 the cable extends out of slot 6169, wraps clockwise 3 times (omitted for clarity) around the pulley 6174, and extends down the arm 6110 to the back end assembly 6132. The right side cable 6168*b* extends out the back of the arm 6110 and wraps three times around the bottom motor end pulley 6136*b*. Coming from the right, the right side cable wraps 3 times clockwise around the bottom motor end pulley 6136*b*. After the cable is wrapped around, the swage drops into a divot the bottom motor end pulley 6136*b* with the cable passing through a slot 6137*b* (not shown) of the bottom motor end pulley 6136*b*. A second of the cables 6188*a-b* emanates from a left side of the hinge pulley 7174 and extends in the same way from the pulley 6174 to the back end assembly 6132 but wraps counter clockwise around the top pulley 6136*a* before the terminating end is secured in the slot 6137*a*. The top pulley and bottom pulley thus wrap and unwrap lengths of the at least two cables 6188*a-b* as they are rotated by the motor 6134 to tilt the gripper 6105 at the hinge joint 6165 along the bi-directional arrow 6166 at the hinge joint 6165.

In implementations, for tensioning the left and right cables 6188*a-b*, the entire assembly for the motor 6134 is disposed on a swivel arm having therein an adjustable bolt that pulls the entire motor assembly back in tension. If the distances of the left and right cables 6188*a-b* are different, this could result in uneven tension. So in implementations, an initial tension is applied before a final tensions of the motor assembly swivel arm. Because the two motor end pulleys 6136*a-b* are split with one dedicated to each of the left and right cables 6188*a-b*, they can be tensioned against one another before being bolted down. In implementations, one or more bolts are disposed between the two motor end pulleys 6136*a-b*, and the two pulleys 6136*a-b* can be twisted in opposite directions with, for example, a spanner wrench before bolting down. This tensioning ensures the lengths of the left and right cables 6188*a-b* are effectively even.

Turning now to FIG. 16B, the wrist assembly 6170 is shown tilted at the hinge joint 6165 in one direction of the bi-directional arrow 6166. In implementations, the tilt angle is past 90 degrees (e.g., horizontal). In implementations, the tilt angle comprises a range of between about 5 to 35 degrees past a 90 degree tilt angle in either direction. In implementations, the tilt angle comprises a range of about 25 to 30 degrees past a 90 degree angle in either direction.

In implementations, the wrist assembly 6170 comprises an absolute position sensor for detecting and measuring the motion of the hinge joint 6165, such as a hinge encoder 6190 (e.g., a magnetic quadrature encoder) disposed behind a wrist plate and a magnet disposed on an outer corner 6175 (e.g., the corner that sees the extreme tilt angle) of a hinge flange 6164 of the hinge joint 6165. In implementations, an encoder encodes motion of the hinge (e.g. an encoder over the hinge bolt).

Turning now to the swivel joint 6167 that enables the wrist assembly 6170 to rotate up to 180 degrees in either direction along bidirectional arrow 6168, around a longitudinal central axis 6130 of the arm 6110, in implementations, the swivel joint 6167 does not comprise an absolute encoder is not absolutely encoded. In implementations, the swivel joint 6167 comprises an incremental encoder and/or speed encoder disposed on a back shaft of a swivel motor 6180 directly connected to the swivel joint 6167. Additionally or alternatively, in implementations, the swivel joint comprises an absolute position sensor (e.g. encoder) in addition to a speed encoder being disposed on a back shaft of a swivel motor 6180.

The swivel joint 6167 comprises the swivel motor 6180 configured to drive a drive gear 6178 enmeshed with an idler gear that is enmeshed with a swivel output gear. This configuration allows the wrist assembly 6170 to rotate without any slip and without requiring tensions otherwise required by a belt driven swivel joint 6167. The amount of stress imparted to the at least two cables 6188*a-b* over their length (e.g., in implementations, approximately 6 foot lengths down the hollow of the arm 6110) are relatively low as the swivel joint 6167 swivels such that the swivel joint 6167 is able to rotate bidirectionally, up to 180 degrees.

Figure 17A:
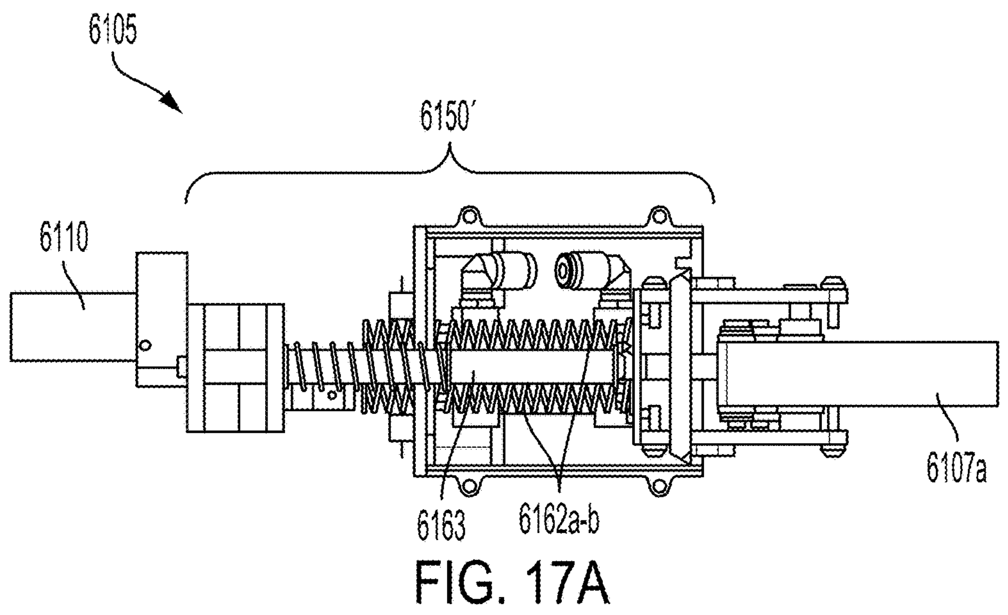
FIG. 17A depicts a side cut away view of an example compression wrist of a lifter of an autonomous repositioning robot.
Figure 17B:
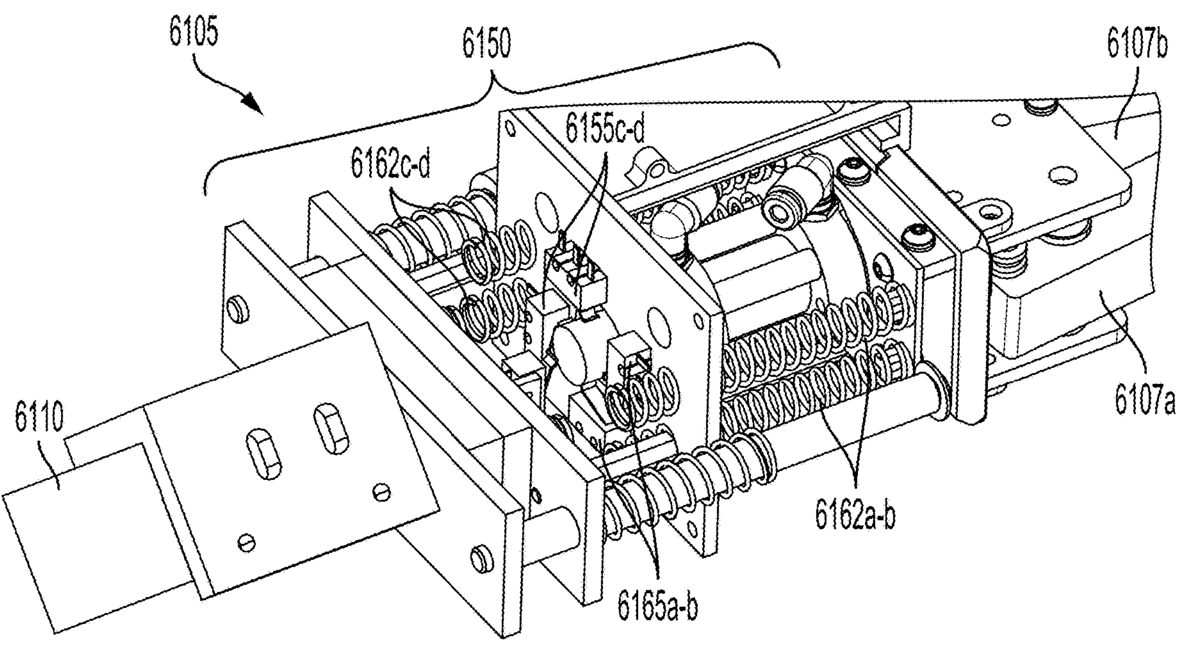
FIG. 17B depicts a back perspective cut away view of the wrist of FIG. 17A.
Figure 17C:
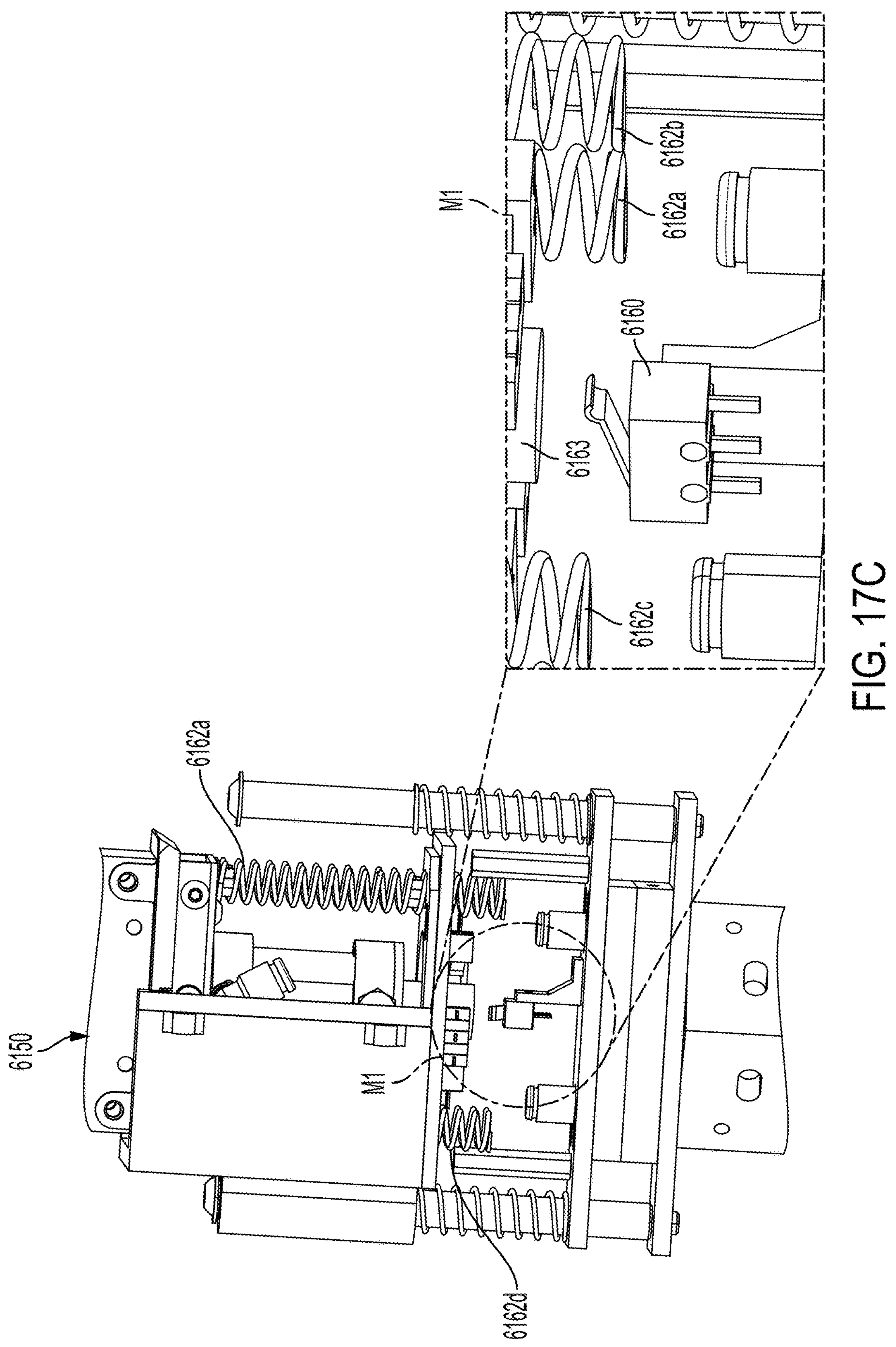
FIG. 17C depicts a side perspective cut away view and close up of a portion of the wrist of FIGS. 17A-B.

Turning to FIGS. 17A-C, in implementations, the gripper 6105 additionally or alternatively comprises a wrist 6150' comprising a plurality of sensors 6155*a-d*, 6160 configured to sense an application of force on the gripper 6105 as applied in various directions including at least one of up and down, sided to side, and axially. In implementations, the gripper 6105 comprises a pneumatic gripper as previously described with regard to implementations, but without an actuated wrist comprising a swivel joint and hinge joint. The plurality of sensors 6155*a-d*, 6160 are configured to output a signal to the controller 6005. The wrist 6150' is disposed between the fingers 6107*a-b* and the arm 6110. In implementations, the wrist 6150' comprises a plurality of compression springs 6162*a-d* configured to flex and compress under an application of force and a rod 6163 configured to trip one or more limit switch sensors 6155*a-d*, 6160 under an application of a threshold force. For example, the rod 5765 can comprise and trip one of the one or more limit switch sensors 6155*a-d*, 6160 under an application of 5 pounds of force. Although the sensors are described as limit switches, in implementations, the plurality of sensors 6155*a-d*, 6160 can be one or more analog sensors configured to detect how much the terminal gripper has moved. In implementations, the sensor 6160 behind the rod 6163 is configured to detect if the gripper 6105 has impacted the conveyor 6030 (e.g., floor) the work volume 6035 head on, thereby applying an axial force.

In implementations, the controller 6005 receives one or more signals from the plurality of sensors 6155*a-d*, 6160 and determines the application of a side-to-side force indicative of a deformable article being snagged on a first arm or terminal gripper while the terminal gripper of a subsequent arm of the plurality of arms grasps the article. In implementations, the controller 6005 receives one or more signals from the plurality of sensors 6155*a-d*, 6160 and determines the application of a threshold amount of axial force applied as the terminal gripper 6105 pushes against the conveyor 6030 (e.g., floor) the work volume 6035 to grasp an article 10 resting on the floor. For example, an article such as a thin silk scarf, may be smooth and comprises a low profile. The terminal gripper 6105 can comprise flexible fingers 6107*a-b* and be configured to accommodate being driven into the floor with a threshold amount of force (e.g., 1 lbf, 2 lbf, 3 lbf) while enabling the flexible fingers 6107*a-b* to be actuated in a grasping motion. In implementations, the controller 6005 receives one or more signals from the plurality of sensors 6155*a-d*, 6160 and determines the application of a threshold amount of axial force applied as the terminal gripper 6105 pushes against a deformable article 10 to ensure the terminal gripper 6105 is positioned in contact with the deformable article 10 for successfully grasping the article.

In addition to the two or more lifters 6100*a-d* and associated grippers 6105*a-d*, implementations of the repositioning robot 6000 include at least one sensor 6128, 6128*a-d*, 6040, 6040*a*, 6040*b* disposed at a fixed location relative to the work volume 6035. In implementations, as shown in FIG. 6B, two or more sensors 6040*a*, 6040*b* are disposed at two or more fixed locations about the work volume 6035 and spaced apart by a distance Ds ranging between about 30 cm to 400 cm. In implementations, the two or more sensors 6040*a*, 6040*b* are positioned apart from the two or more lifters 6100*a-d*. In implementations, the two or more sensors 6040*a*, 6040*b* are stationary and anchored apart from the associated bases 6102*a-d* of each of the two or more lifters 6100*a-d*. In implementations, the two or more sensors 6040*a*, 6040*b* are not collocated with the two or more lifters 6100*a-d*. Additionally or alternatively, in implementations, at least one of, two or more sensors 6128*a-b* are co-located at one or more of the individually anchored positions A-D and are anchored to be stationary. In implementations, the two or more sensors 6128, 6040 are anchored to a floor beneath the conveyor 6030 and at locations astride the conveyor. In implementations, as shown in FIGS. 7A-E, at least one of the two or more sensors 6128*a-b* is mounted to a base 6102, 6102*a-d* of one or more of the lifters 6100*a-d* beneath the arm 6110 and aimed upward at an angle 6043 from horizontal above a surface of the conveyor with a wide field of view 6044. In implementations, the field of view 6044 comprises the entire height of the work volume such that a sensor is configured to detect whether a hoisted gripper 6105 is engaged with a suspended article 10 or missed a grab. Additionally or alternatively, in implementations, one or more of the two or more sensors 6040*a*, 6040*b* can be at least one of anchored above the conveyor and attached to one or more of a ceiling and a support structure disposed about the work volume 6035 without interfering with the motion of the two or more lifters 6100*a-d*.

In implementations, the two or more sensors 6128, 6128*a-d*, 6040, 6040*a*, 6040*b* are configured to at least one of detect one or more features and capture one or more images of the deformable laundry article disposed within the work volume 6035. The two or more sensors 6128, 6128*a-d*, 6040, 6040*a*, 6040*b* are configured to output a signal comprising the at least one of the detected one of one or more features and captured one or more images. In implementations the output signal can be communicated to the processor 6015 by the network interface 6020 as described previously with regard to the implementations of FIGS. 4 and 5. Also with reference to FIGS. 4 and 5, the repositioning robot 6000 includes a memory 6010 configured to store data indicative of one or more repositioned deformable laundry articles. The memory can receive and store information about one or more deformable articles provided by a controller 5005 the separating robot 5000 in wired or wireless communication with the controller 6005 of the repositioning robot 6000. In implementations, the repositioning robot 6000 comprises a controller 6005 in operable communication with the memory 6010, the two or more sensors 6128, 6128*a-d*, 6040, 6040*a*, 6040*b*, and the at least one drive motor 6115*a-d*, 6120*a-d*, 6125*a-d* and gripper 6105*a-d* of each of the two or more lifters 6100*a-d*. The controller is in operable communication with the at least one arm drive motor, the at least one repositioning drive motor, the at least one separation sensor, and the two or more repositioning sensors. In implementations, the controller 6005 includes the processor 6015 as described with regard to FIGS. 4 and 5. In other implementations, one or more of the controller and memory can be implemented by another network entity in communication with the processor 6015 of the repositioning robot 6000 via the network 230. For example, a computing terminal 205 can be configured to execute some or all of the controller functions and an external database 235 can store the data indicative of one or more repositioned deformable laundry articles. The data can be stored in look up tables and accessible by one or more robots of the process line 100 and one or more network entities, such as the computing terminal 205.

Figure 18A:
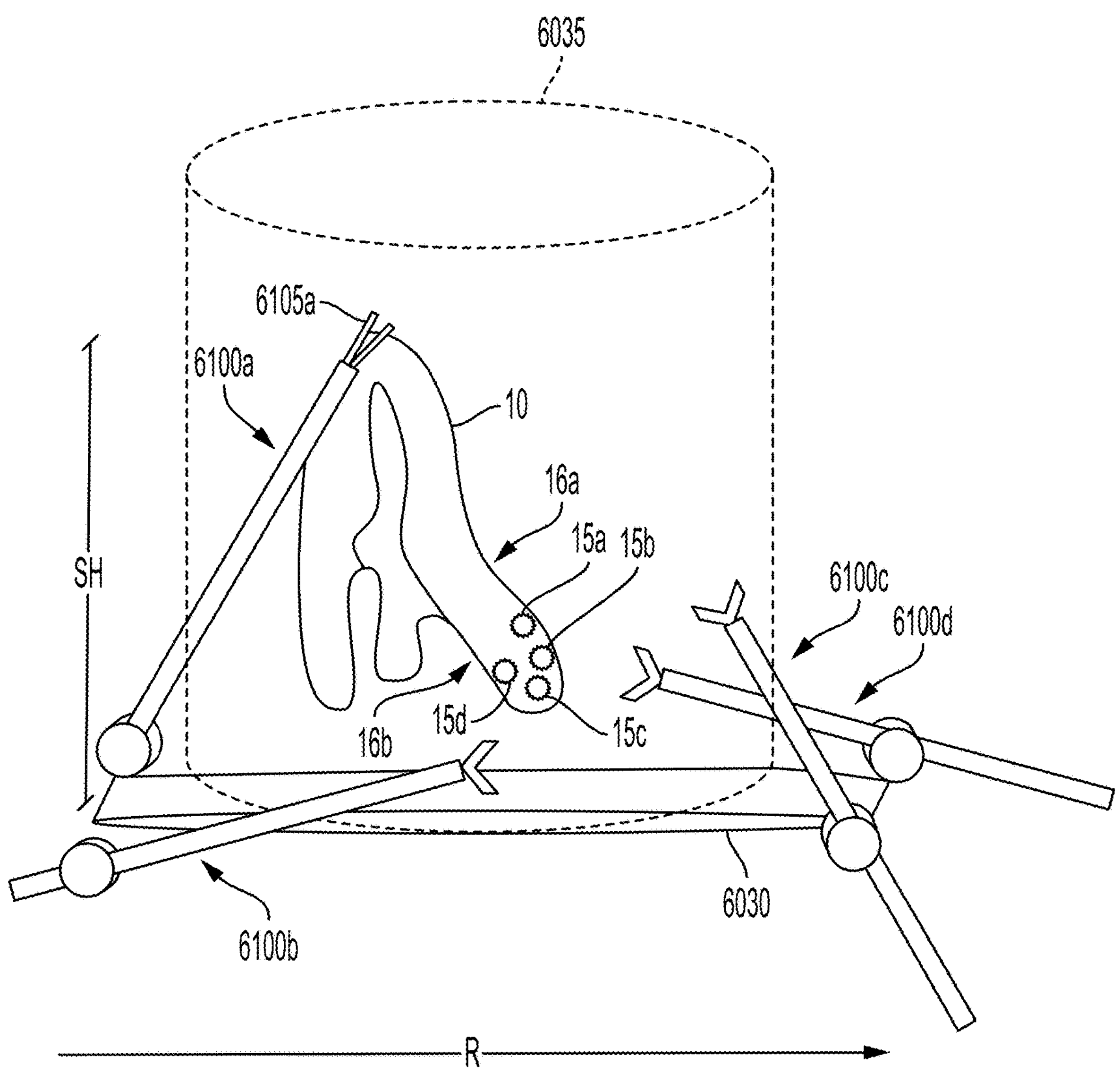
FIG. 18A depicts a schematic of an example of an autonomous repositioning robot initiating a repositioning process for a laundry article within a working volume.

In implementations, the controller 6005 is configured to receive the output signal from one or more of the two or more sensors 6128, 6128*a-d*, 6040, 6040*a*, 6040*b*. Referencing FIG. 18A, the controller 6005 is configured to identify, based on the output signal, one or more grip points 15*a-d* adjacent one or more free-hanging edges 16*a-b* of the deformable laundry article 10 suspended above the conveyor 6030 by one 6100*a* of the two or more lifters 6100*a-d*. In implementations, the one or more grip points 15*a-d* are within 6 mm to 130 mm of the one or more free-hanging edges. In some implementations, the one or more grip points include one or more free-hanging edges. In other implementations, the one or more grip points need not be collocated or even tangential to one or more free-hanging edges. In implementations, the repositioning robot 6000 is configured to grip anywhere on the deformable laundry article 10 and does not need to grip an edge of the article 10.

Figure 18B:
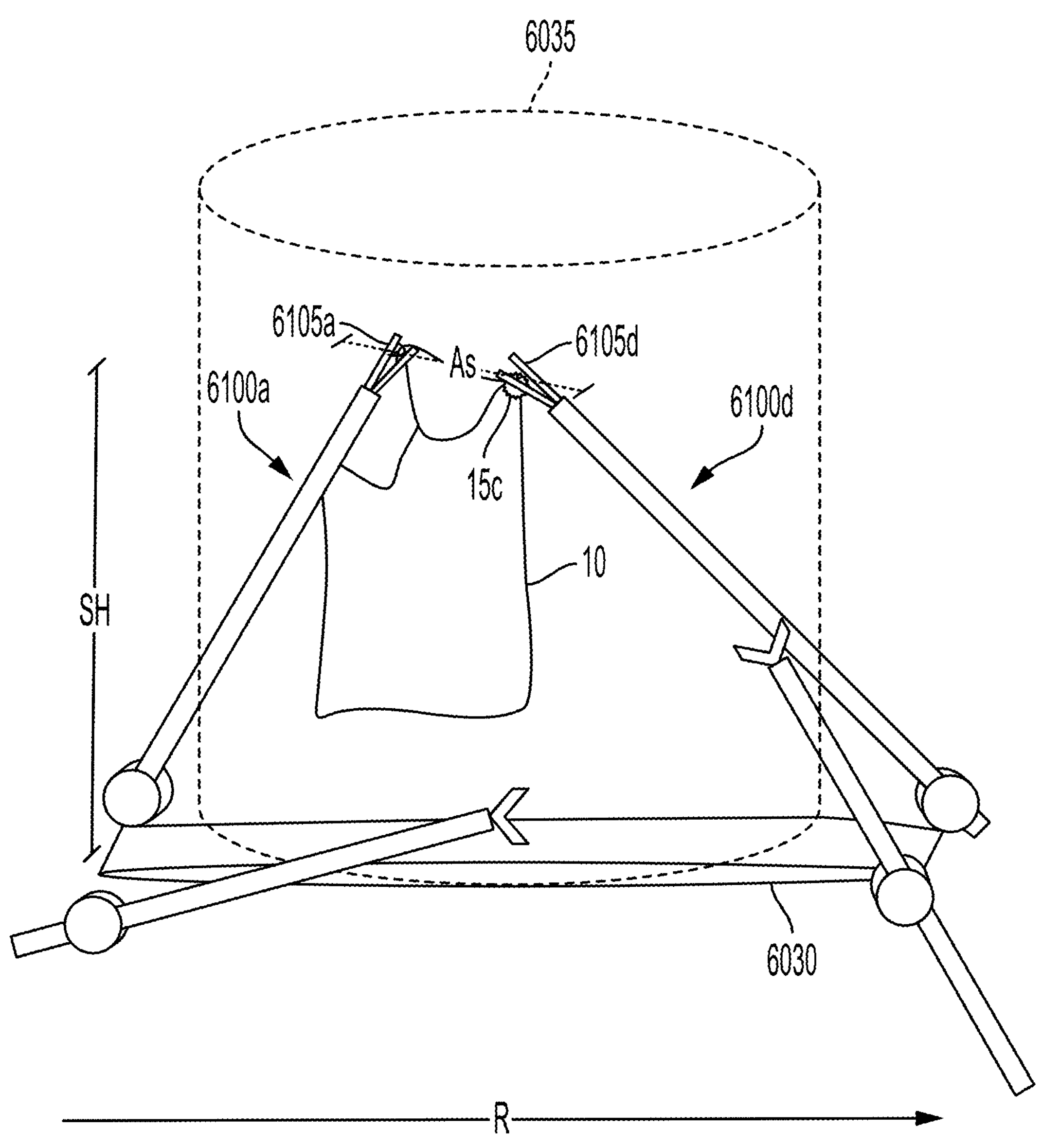
FIG. 18B depicts a schematic of an example of an autonomous repositioning robot repositioning a laundry article within a working volume.

While the article 10 is suspended above the conveyor 6030, a gripper 6105*a* associated with the one lifter 6100*a* of the two or more lifters is engaged with the deformable laundry article 10 and positioned at (e.g. raised to) a suspension height SH. The controller 6005 is configured to instruct another of the two or more lifters 6100*b-d* to grip, with an associated gripper 6105*b-d*, one grip point 15*c* of the one or more grip points 15*a-d* on the deformable laundry article 10 and lift the gripped one 15*c* of the one or more grip points the suspension height SH, as shown in FIG. 18B.

The controller 6005 is configured to determine whether the deformable laundry article 10 suspended by the one lifter 6100*a* and the another lifter 6100*d* of the two or more lifters 6100*a-d* is repositioned based on a comparison of the output signal to the data indicative of one or more repositioned deformable laundry articles. If the controller 6005 determines based on the comparison that the deformable laundry article 10, the controller 6005 is configured to instruct the one lifter 6100*a* and the another lifter 6100*d* of the two or more lifters to lower the repositioned deformable laundry article 10 onto the conveyor 6030, and release the repositioned deformable laundry article 10 disposed on the conveyor 6030. As will be described subsequently in more detail with regard to implementations of methods of repositioning the deformable laundry article 10, if the controller determines based on the comparison that the deformable laundry article 10 is not repositioned, the controller 6005 is configured to instruct another of the one or more lifters 6100*a-d* to engage and lift to the suspension height another grip point of the deformable laundry article 10 and instruct the one lifter 6100*a* to disengage from the deformable laundry article 10. As will be described in detail with regard to implementations, the controller 6005 is configured to iteratively instruct the two or more lifters 6100*a-d* to sequentially grip, lift, and optionally release the deformable laundry article 10 until the comparison indicates that the deformable laundry article 10 is repositioned.

In implementations, the deformable laundry article 10 is one of a plurality of deformable laundry articles comprising two or more article types of at least one of different sizes and different shapes. For example, the deformable laundry article 10 can be one of a plurality of laundry articles comprising a single load of household laundry. Household laundry can comprise many types of bodily worn garments and cloth articles requiring washing (e.g., sheets, tablecloths, curtains, bath rugs). These garments and articles are deformable meaning they do not hold their shape when lifted by a single grip. Because garments and other cloth articles are supple, they deform when raised by a single grip. Different items of the plurality of laundry articles may have different thickness and stiffness values depending on the material and style of the item. For example, a woven bathmat will be stiffer than a silk blouse. The plurality of laundry articles in a single load of household laundry also can comprise many different laundry articles each having a different weight. Additionally, the size of each deformable laundry article 10 of the plurality of laundry articles can vary greatly within a single load of laundry, such that repositioning each deformable laundry article 10 requires maneuvers particular to each article. The repositioning robot 6000 is configured to reposition articles of varying size and weight. In one implementation, each of the two or more article types comprises a longest dimension in a range of between about 4 cm to 500 cm, and the data indicative of one or more repositioned deformable laundry articles comprises data associated with each of the two or more article types.

In implementations, the controller 6005 of the repositioning robot 6000 receives one or more characteristics of the deformable article 10 from the controller 5005 of the separating robot. Additionally or alternatively, in implementations, the repositioning robot 6000 can determine information about a deformable laundry article from the output signal of the two or more sensors 6128, 6128*a-d*, 6040, 6040*a*, 6040*b*. As previously described, the two or more sensors 6128, 6128*a-d*, 6040, 6040*a*, 6040*b* are configured to at least one of detect one or more features and capture one or more images of the deformable laundry article disposed within the work volume 6035 and output a signal comprising the at least one of the detected one of one or more features and captured one or more images. In implementations, the one or more features are indicative of at least one of position and orientation of the article relative to the two or more sensors. Additionally or alternatively, the one or more features can be indicative of a topology of the deformable article and the controller is further configured to analyze the input signal to determine whether the topology matches at least one datum associated with the one or more repositioned deformable laundry articles. Additionally or alternatively, the one or more detected features are one or more edges and/or corners of the deformable article 10.

In implementations, the two or more sensors 6128, 6128*a-d*, 6040, 6040*a*, 6040*b* can comprise at least one of a 3-D point cloud sensor, a 2-D camera, (Light Detection And Ranging, which can entail optical remote sensing that measures properties of scattered light to find range and/or other information of a distant target), LADAR (Laser Detection and Ranging)), a sonar proximity sensor, an ultrasonic ranging sensor, a radar sensor (e.g., including Doppler radar and/or millimeter-wave radar) and a pair of stereo depth cameras. In implementations, the two or more sensors 6128, 6128*a-d*, 6040, 6040*a*, 6040*b* output to the controller 6005 at least one of a depth map, RGB images, and IR images. In implementations at least one of the two or more sensors 6128, 6128*a-d*, 6040, 6040*a*, 6040*b* comprises a REALSENSE camera configured to output any of a depth map, RGB images, and IR images. In implementations, the two or more sensors 6128, 6128*a-d*, 6040, 6040*a*, 6040*b* can be configured to output 3-D image data to the controller 6005. Additionally or alternatively, in implementations, at least one of the two or more sensors 6128, 6128*a-d*, 6040, 6040*a*, 6040*b* can be configured to output one or more 2-D images to the controller 6005. In implementations, each one of the two or more sensors is a camera, and the camera is calibrated to one or more of the grippers 6105 of the two or more lifters 6100.

In one implementation, one or more of the two or more sensors 6128, 6128*a-d*, 6040, 6040*a*, 6040*b* can be imaging sensors including at least one of an infrared range sensor and a volumetric point cloud sensor configured to generate range value data representative of the deformable laundry article 10 within the work volume 6035. The two or more sensors 6128, 6128*a-d*, 6040, 6040*a*, 6040*b* can be configured to generate presence value data representative of the deformable laundry article within the observed work volume. In implementations, the presence value data can indicate a pose of the deformable laundry article. In implementations, the arms 6110*a-d* of the two or more lifters 6100*a-d* are monolithic extrusions sized to reduce blind spots for an imaging sensor of the two or more sensors 6128, 6128*a-d*, 6040, 6040*a*, 6040*b*. For example, each arm 6110*a-d* can have a cross section of a square tube having sides of a length in a range of between about 0.5 inch to 2 inches and a wall thickness in a range of between about 1/16 inch and 1/2 inch. Such a geometry ensures resistance to moment forces without blocking the two or more sensors 6128, 6128*a-d*, 6040, 6040*a*, 6040*b* from successfully detecting one or more grip points 15*a-d* on the deformable article 10.

In some implementations, one or more of the two or more sensors 6128, 6128*a-d*, 6040, 6040*a*, 6040*b* can be an imaging sensor including a structured-light 3D scanner that measures the three-dimensional shape of the deformable laundry article 10 using projected light patterns. Projecting a narrow band of light onto a three-dimensionally shaped surface produces a line of illumination that appears distorted from other perspectives than that of the projector, and can be used for an exact geometric reconstruction of the surface shape (light section). In some implementations, one or more of the two or more sensors 6128, 6128*a-d*, 6040, 6040*a*, 6040*b* can be an imaging sensor including a time-of-flight camera (TOF camera), which is a range imaging camera system that resolves distance based on the known speed of light, measuring the time-of-flight of a light signal between the camera and the subject for each point of the image. The time-of-flight camera is a class of scannerless LIDAR, in which the entire scene is captured with each laser or light pulse, as opposed to point-by-point with a laser beam, such as in scanning LIDAR systems. Additionally or alternatively, in some implementations, one or more of the two or more sensors 6128, 6128*a-d*, 6040, 6040*a*, 6040*b* can be a scanning LIDAR sensor. In some implementations, one or more of the two or more sensors 6128, 6128*a-d*, 6040, 6040*a*, 6040*b* can be a three-dimensional light detection and ranging sensor (e.g., Flash LIDAR) using ultraviolet, visible, or near infrared light to image objects. In some implementations, the imaging sensor includes one or more triangulation ranging sensors, such as a position sensitive device. A position sensitive device and/or position sensitive detector (PSD) is an optical position sensor (OPS) that can measure a position of a light spot in one or two-dimensions on a sensor surface.

Figure 19A:
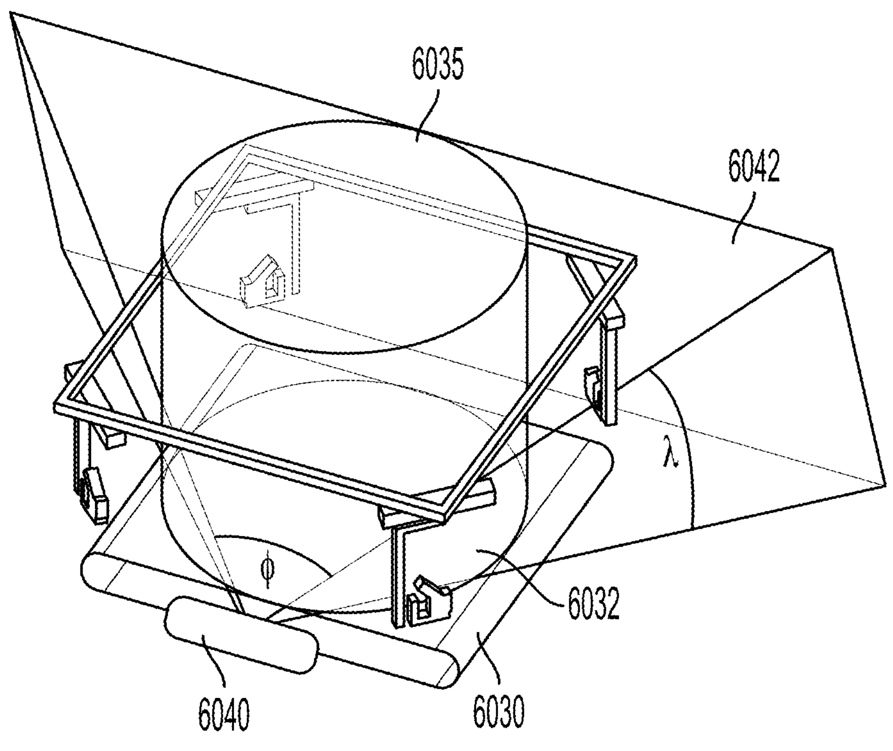
FIG. 19A depicts an isometric view of an example sensor field of view relative to the work volume of an autonomous repositioning robot.
Figure 19B:
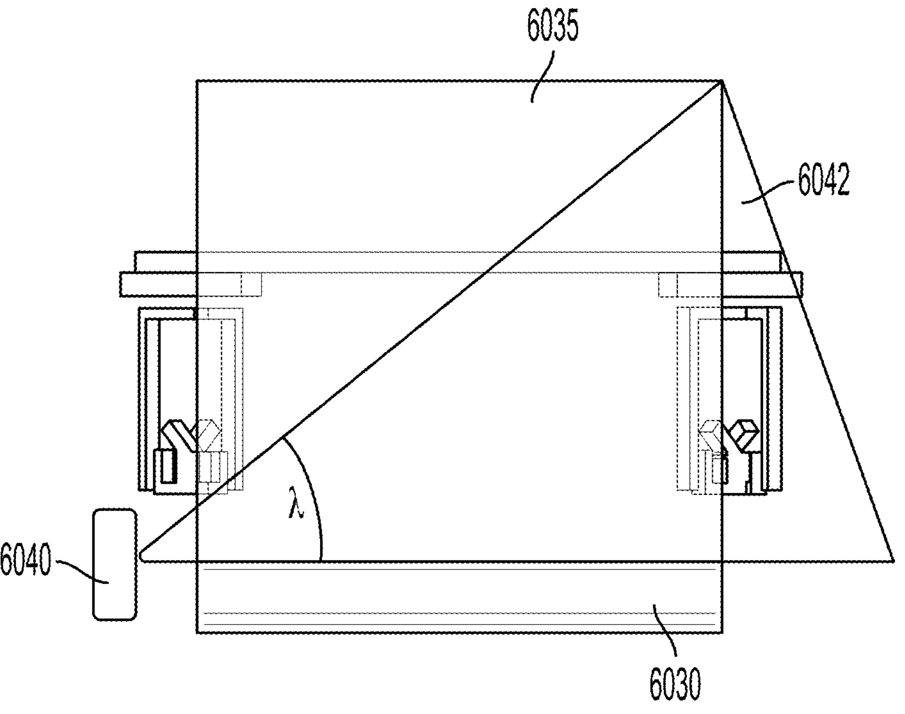
FIG. 19B depicts a side view of the example sensor field of views of FIG. 19A relative to the work volume of the autonomous repositioning robot.

In implementations, such as that of FIGS. 6B, and 19A-B, at least one of the two or more sensors 6128, 6128*a-d*, 6040, 6040*a*, 6040*b* is a 2-D camera configured to output a 2-D image to the controller 6005 and the data associated with repositioned deformable laundry article 10 is size invariant image data. In implementations, such as that of FIGS. 3B, and 7A-B, the two or more sensors 6128, 6128*a-d*, 6040, 6040*a*, 6040*b* are configured to output a 3-D image to the controller 6005 and the controller is further configured to determine a pose of the deformable laundry article 10 based on the 3-D image. The pose of the deformable laundry article 10 can be relative to at least of a coordinate space of the work volume 6035, which has a fixed coordinate space relative to the two or more sensors 6128, 6128*a-d*, 6040, 6040*a*, 6040*b*, and a position and orientation of the conveyor 6030 disposed at the bottom of the work volume 6035. In implementations, the two or more sensors 6040*a*, 6040*b* are configured to provide two or more 2-D images to the controller 6005 and the controller 6005 is further configured to determine a pose of the deformable laundry article 10 within the work volume 6035, which has a fixed coordinate space relative to the two or more sensors 6128, 6128*a-d*, 6040, 6040*a*, 6040*b*. As described previously with regard to FIGS. 7A-E, in implementations at least one of the two or more sensors 6128, 6128*a-d*, 6040*a*, 6040*b* is mounted to a base 6102, 6102*a-d* of one or more of the lifters 6100*a-d* beneath the arm 6110 and aimed upward at an angle 6043 from horizontal above a surface of the conveyor with a wide field of view 6044. Additionally or alternatively, in implementations, one or more of the two or more sensors 6040*a*, 6040*b* can be at least one of anchored above the conveyor and attached to one or more of a ceiling and a support structure disposed about the work volume 6035 without interfering with the motion of the two or more lifters 6100*a-d*. In implementations the two or more sensors 6128, 6128*a-d*, 6040, 6040*a*, 6040*b* are 3-D point cloud sensors, such as the REALSENSE depth camera, positioned at about the height of the conveyor 6030 such that the field of view of each camera is aimed at the work volume 6035.

As shown in FIGS. 19A-B, in implementation, the two or more sensors 6040, 6040*a*, 6040*b* can be positioned such that each camera comprises a field of view 6042 comprising a vertical angle $\lambda$ ranging between about 35 and 90 degrees and a horizontal angle $\varphi$ of between about 50 and 90 degrees. The field of view 6042 is configured to detect the work volume 6035 at the surface of conveyor 6030. In implementations, the field of view 6042 comprises the entire height of the work volume such that a sensor is configured to detect whether a hoisted gripper is engaged with a suspended article 10 or missed a grab. As shown in FIGS. 6B and 19A-B, the field of view 6042, 6042*a*, 6042*b* extends at least to a center of the work volume 6035 and projects across between about 80 to 90 percent of a work area 6032 comprising the portion of the conveyor 6030 that intersects with the work volume 6035. In implementations, as shown in FIG. 6B, the two or more sensors 6040*a*, 6040*b* comprise overlapping fields of view 6042*a*, 6042*b*. The overlapping fields of view 6042*a*, 6042*b* ensure that between about 80 to 100 percent of the work volume 6035 is sensed at any point in time. The controller 6005 of the repositioning robot 6000, therefore, can identify the presence of a deformable laundry article 10 within the work volume 6035 and can detect one or more grip points 15*a-c* on the deformable article 10 suspended above the conveyor. Because the locations of the stationary two or more sensors 6040*a*, 6040*b* are fixed relative to the anchored locations of the two or more lifters 6100*a-d* and calibrated to the location of each of the grippers 6105*a-d* of the two or more lifters 6100*d*, and the controller 6005 can path plan the motion of each of the two or more lifters 6100*a-d* to engage with a gripper 6105*a-d* with the one or more grip points 15*a-c* detected in coordinate space within the work volume 6035.

Additionally or alternatively, as previously described, the two or more sensors 6128*a-d* can be collocated with associated bases 6102*a-d* of each of the two or more lifters 6100*a-d* and each sensor can be angled upward such that each camera comprises a field of view 6044 comprising a vertical angle ranging between about 35 and 90 degrees and a horizontal angle of between about 50 and 90 degrees. The field of view 6044 extends at least to a center of the work volume 6035 and projects across between about 80 to 90 percent of a work area 6032 comprising the portion of the conveyor 6030 intersecting with the work volume. The two or more sensors 6128*a-d* comprise overlapping fields of view 6044*a-d*. The overlapping fields of view 6044*a-d* ensure that between about 80 to 100 percent of the work volume 6035 is sensed at any point in time. The controller 6005 of the repositioning robot 6000, therefore, can identify the presence of a deformable laundry article 10 within the work volume 6035 and can detect one or more grip points 15*a-c* on the deformable article 10 suspended above the conveyor. Because the locations of the stationary two or more sensors 6128*a-d* are collocated with the two or more lifters 6100*a-d* and calibrated to the location of each of the grippers 6105*a-d* of the two or more lifters 6100*d*, and the controller 6005 can path plan the motion of each gripper 6105*a-d* of the two or more lifters 6100*a-d* to engage with the one or more grip points 15*a-c* detected in coordinate space within the work volume 6035.

In implementations, path planning (e.g., motion planning) comprises a calculating the tilt, pan, and extend motions needed to place the gripper 6105*a-d* in a given position and orientation relative to the location of stationary sensor 6128*a-d* such that the gripper 6105*a-d* engages with a selected one of the one or more grip points 15*a-c*. In implementations the motion planning comprises inverse kinematics computations based on the known locations of the one or more stationary sensors 6128*a-d* and the calibrated pan, tilt, and extend motions of each of the arms 6110 relative to their associated sensors 6128*a-d*. In implementations, the controller 6105 receiving output signals from the one or more sensors 6128*a-d* (e.g., cameras) is configured to calculate the location coordinates of an object, such as one or more of the gripper arms 6110 and terminal grippers 6105*a-d* and the deformable laundry article 10, in the work volume 6035. The location coordinates enable the controller 6105 to instruct the one or more motor drives (pan drive, tilt drive, extend drive) to move at least one of the gripper arms 6110*a-d* to a desired pose within the work volume 6035 for gripping the article 10 with the gripper 6105. In implementations, each of the cameras 6128*a-d* affixed to the base 6102 of a lifter 6100 is calibrated to the arm 6110 of that lifter and to the work volume 6035, and the controller 6105 is configured to calculate a position to which the gripper 6105 will move to engage a grip point 15 of the deformable laundry article 10.

In implementations, the controller 6005 is configured to determine, based on a comparison of a received output signal of the at least one sensor to data stored in a memory in communication with the controller, at least one of an article type, an article size, and an article fabric. Additionally or alternatively, in implementations, the controller 6005 is configured to determine, based on a comparison of a received output signal of the at least one sensor to data stored in a memory in communication with the controller, that the deformable laundry article is repositioned and ready for folding, In implementations, at least one sensor is a 2-D camera, and the data associated with the deformable laundry article is size invariant image data comparable with database images of tagged articles and/or classes of articles.

Figure 29:
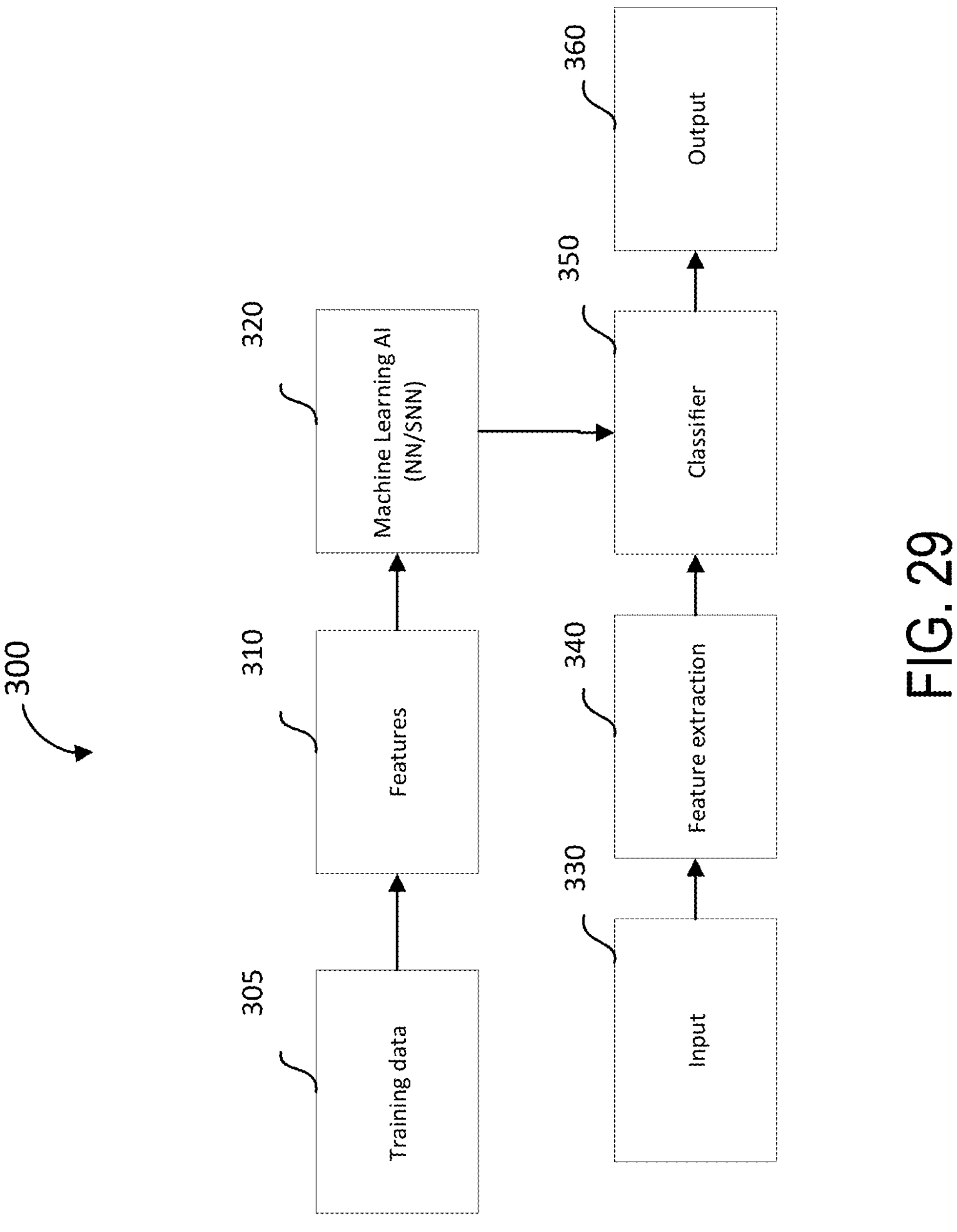
FIG. 29 depicts a schematic diagram of an example neural network for use with an autonomous robotic laundry system.

In implementations, the memory 6010 comprises a neural network 300, and determining the one or more characteristics of each one of the plurality of deformable articles comprises processing the received output signal of the at least one sensor with a neural network classifier. In implementations, as shown in FIG. 29, the neural network 300 comprises a trained neural network, for example a convolutional neural network that operates quickly on 3D and/or 2D data and is configured to classify images from one or more 3D and/or 2D cameras. In an implementation, the classification comprises generating a descriptor based on the output signal of the two or more sensors 6128*a-d*, 6040*a-b* and classifying, using the neural network, the output signal based on the descriptor. The neural network is configured to output a probability that the output signal corresponds to a class of the stored data indicative of one or more deformable article types in a repositioned state acceptable for folding, for example. The classes of trained data in the neural network include data associated with many types of deformable articles. For example, as shown in FIG. 29, a neural network 300 can be trained with a set of training data 305. After training, the neural network 300 comprises a set of weights that can be used for neural network inference to determine whether an input 330 (e.g., output signal from the one of the two or more sensors 6128*a-d*, 6040*a*) is within one of the trained classes.

For example, size is a particularly important characteristic of a deformable article because a large item (e.g., a bed sheet, comforter, tablecloth, large bathrobe, etc.) can require particular processing steps within the work volume 6035 of the repositioning robot 6000. The neural network, therefore can be used to determine whether a deformable article in the work volume 6035 is of a large garment class (e.g, a deformable laundry article having an area that is greater than a threshold size and/or a longest possible length while suspended from a single lifter in range of between about 190 cm to 300 cm), a medium class (e.g., a deformable laundry article having an area that is within a predetermined range, e.g. a longest possible length while suspended from a single lifter in range of between about 30 cm to 190 cm), or a small class (e.g., a deformable laundry article having an area that is less than a threshold size, e.g., and/or a longest possible length while suspended from a single lifter in range of between about 3 cm to 30 cm). It should be understood that any suitable number of size classes or ranges may be identified.

In implementations, the neural network is configured to output a probability that the output signal of the two or more sensors 6128*a-d*, 6040*a-b* corresponds to a class of the stored data indicative of one or more repositioned deformable laundry articles. The classes of trained data in the neural network include data associated with many types of deformable laundry articles that are repositioned and ready for folding. That is, the neural network informs the controller 6005 of a probability that the deformable laundry article 10 is ready for folding.

The data indicative of being repositioned and ready for folding need not be indicative of deformable laundry articles being perfectly flat. For example, one or more edges of the repositioned article can be folded over or incorrectly positioned, such as a sweatshirt hood draping in front of the torso portion, a corner of a towel draping downward between engaged grippers, or a sleeve being stuck inside the torso portion of a shirt. Nonetheless these articles can be considered sufficiently repositioned so as to be ready for folding. A threshold for being repositioned and ready for folding can require only a substantial portion of the deformable laundry article 10 be planar, for example 50-100 percent of the article 10. One or more configurations of each type of repositioned article can be trained and classified within the neural network so that various confidence levels are considered with regard to determining that the deformable laundry article 10 is sufficiently unfolded and spread out, e.g., repositioned and ready for folding. In implementations, the controller 6005 of the repositioning robot 6000 is configured to determine whether the descriptor assigned to the repositioned deformable laundry 10 article meets or exceeds a threshold probability indicative of an unfolded state. The controller can be further configured to decrease the threshold probability for determining a match between the repositioned deformable laundry article and the data after at least one of a period of time and a number of grips by grippers 6105*a-d* associated with the two or more lifters 6100*a-d*. As described in additional detail herein, the number of grips is the number of times that one of the grippers 6105*a-d* grasps and optionally moves a portion of the deformable laundry article in a repositioning operation. For example, one or more of the grippers 6105*a-d* can grip the laundry article at spaced-apart positions and lift the laundry article to a suspension height. Another one of the grippers 6105*a-d* can grip the laundry article at another spaced-apart position to further reposition the laundry article and optionally lift another portion of the laundry article at or below the suspension height, and in some implementations, some of the grippers 6105*a-d* can release the laundry article and grip the laundry article at another location.

In implementations, the period of time for decreasing the confidence threshold is between about 1 minute and 3 minutes. In implementations, the number of grips for decreasing the confidence threshold is between about 5 and 15. In implementations, the probability for determining a match drops below a threshold indicative of a time or termination in the number of grips. In such an instance, the controller can be configured to instruct the one or more grippers 6105*a-d* engaged with the deformable laundry article 10 to release the article and begin the lifting and repositioning process anew. Additionally or alternatively, the controller can be configured to instruct at least one of the engaged one or more lifters 6100*a-d* and the conveyor 6030 to transfer the deformable laundry article: 10 to at least one of the folding robot 7000 and the packing robot 8000 for return to the customer without repositioning.

Figure 20A:
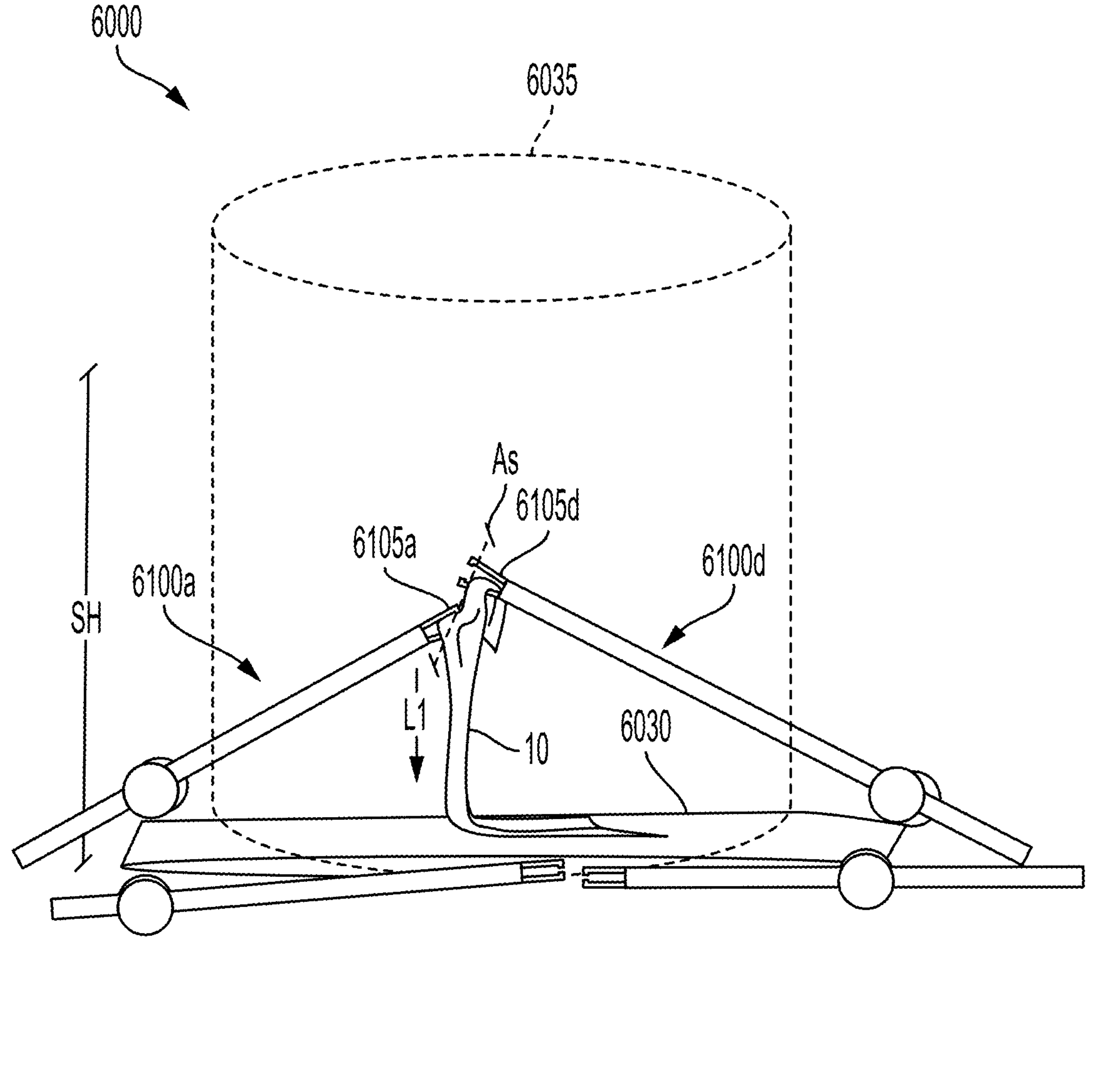
FIG. 20A depicts a schematic example of an autonomous repositioning robot lowering a repositioned laundry article onto a surface.
Figure 20B:
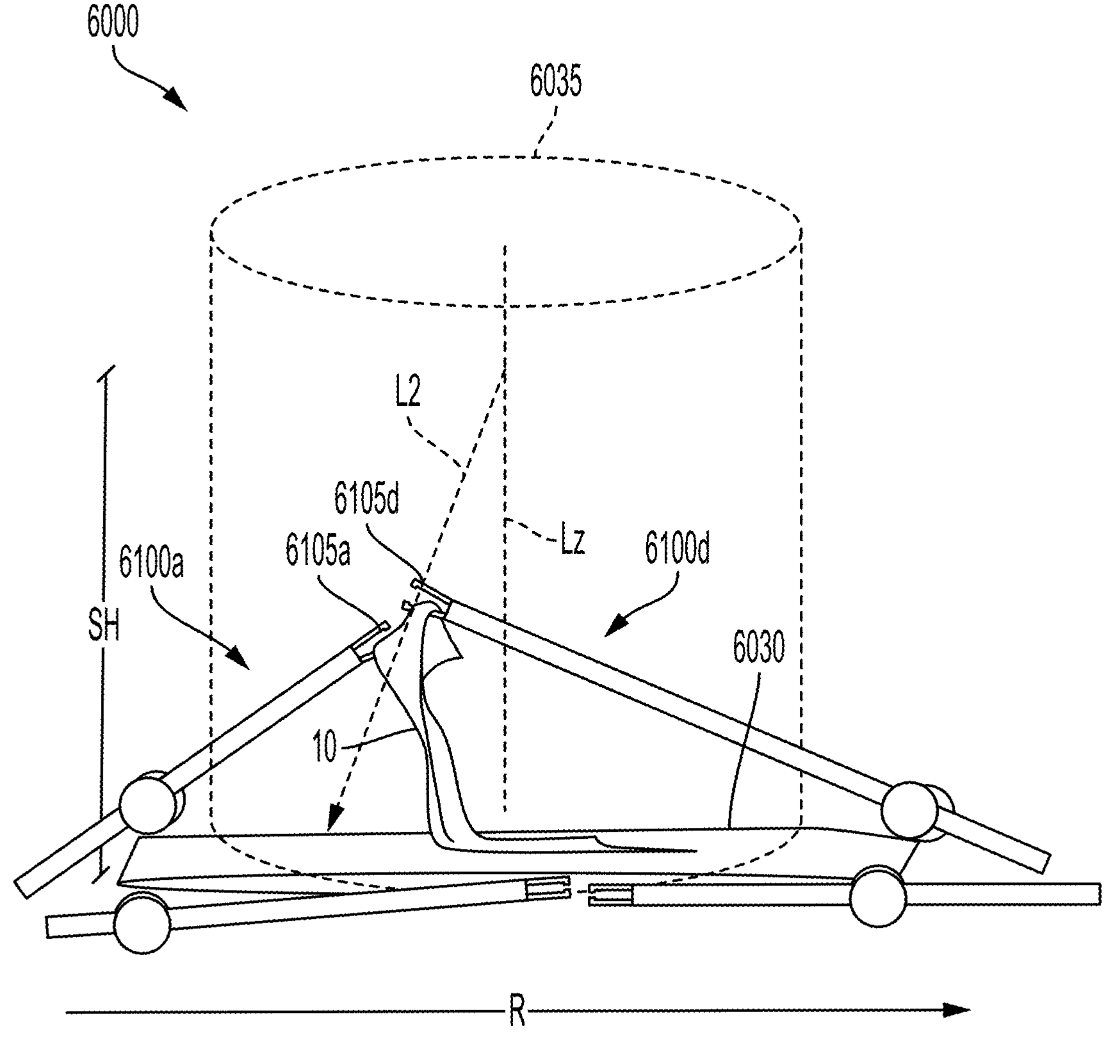
FIG. 20B depicts a schematic example of an autonomous repositioning robot sweeping a repositioned laundry article onto a surface.

Referring now to FIGS. 20A-B, As described previously, once the deformable laundry article 10 is repositioned, the controller instructs the one lifter 6100*a* and the another lifter 6100*d* of the two or more lifters 6100*a-d* to lower the repositioned deformable laundry article 10 onto the conveyor 6030. In one implementation, such as that of FIG. 20A, the controller 6005 is configured to instruct the one lifter 6100*a* and the another lifter 6100*d* to lower (in the direction of the arrow L1) the repositioned deformable laundry article 10 on to the conveyor 6030 at a rate of movement of the conveyor 6030 in a direction of travel, or run direction, R. Additionally or alternatively, as shown in FIG. 20B, the controller 6005 is configured to instruct the one lifter 6100*a* and the another lifter 6100*d* to lower (in the direction of the arrow L2) along a non-vertical slope such that the deformable article 10 is swept down onto the conveyor 6030 in its repositioned state whether or not the conveyor 6030 is in motion. Additionally or alternatively, the controller is configured to instruct the one lifter 6100*a* and the another lifter 6100 to lower the article 10 along a non-vertical slope at a rate equal to or less than the rate of movement of the conveyor 6030. Lowering the article 10 at a rate less than the rate of movement of the conveyor 6030 enables the conveyor 6030 to assist with further spreading or stretching the article 10 to a repositioned state for folding. For example, sweeping an article 10 back along a non-vertical slope at a rate slower than the rate at which conveyor 6030 is rotating can assist with the conveyor 6030 pulling any wrinkles straight as the article 10 is disposed on the conveyor 6030.

As described previously, in implementations, the controller 6005 can be configured to determine, based on the output signal of each of the two or more sensors 6040*a*, 6040*b*, a pose of the deformable laundry article 10 suspended within the work volume 6035 relative to at least the two or more fixed locations of the two or more sensors 6128, 6128*a-d*, 6040, 6040*a*, 6040*b* The controller 6005 can determine, based on the output signal of each of the two or more sensors 6128, 6128*a-d*, 6040, 6040*a*, 6040*b*, a longest dimension of the repositioned deformable laundry article 10 and instruct the engaged one lifter 6100*a* and the another lifter 6100*d* to sweep the article onto the conveyor such that the longest dimension of the repositioned deformable laundry article parallel to a transfer direction of the conveyor. Additionally or alternatively, the conveyor 6030 can comprise at least one drive motor and a rotatable support in communication with the controller 6005 and configured to align the run direction R of the conveyor parallel to the longest dimension of the repositioned deformable laundry article 10. In implementations, such as those of FIGS. 21A and 21B, the conveyor 6030 is supported by one or more legs 6032*a-d*, each of the one or more legs comprising a wheel 6034*a-d*, e.g., a caster wheel, configured to rotate such that the conveyor 6030 spins about a vertical axis $L_Z$. In implementations a wheel of the one or more legs can be engaged with a rail (not shown) configured to constrain and direct the rotational motion of the conveyor 6030.

Returning to FIG. 18B, in implementations, the controller 6005 is configured to determine an orientation of a shared axis "AS" extending between the engaged grippers 6105*a*, 6105*d* of the one lifter 6100*a* and the another lifter 6100*d* of the two or more lifters 6100*a-d* relative to a run direction R of the conveyor 6003. The controller is further configured to instruct at least one of the one lifter 6100*a* and the another lifter 6100*d* of the two or more lifters 6100*a-d* engaged with the deformable laundry article 10 to rotate the shared axis "AS" perpendicular to the run direction R of the conveyor 6030 prior to instructing the one of the one lifter 6100*a* and the another lifter 6100*d* of the two or more lifters 6100*a-d* to lower the repositioned deformable laundry article 10 onto the conveyor 6030.

As described previously, the conveyor 6030 operates in a run direction R. In implementations, the run direction is reversible such that the repositioned deformable laundry article 10 can be conveyed out of the work volume 6035 in either of two opposite directions. In all implementations, the conveyor 6030 is configured to transfer the repositioned one of the plurality of deformable laundry articles to a folding robot 7000 in series with the repositioning robot 6000. In any of the above described implementations of rotating and lowering the repositioned deformable laundry article 10, the controller 6005 can be configured to determine, based on a comparison of the received output signal to the data, at least one of a back side and a front side of the repositioned deformable laundry article 10 if the article is of a type having a front side and a back side, such as a bodily worn garment. In one implementation, the controller can instruct at least one of the one lifter 6100*a* and the another lifter 6100*d* of the two or more lifters 6100*a-d* engaged with the deformable laundry article 10 to rotate the shared axis AS perpendicular to a run direction R of the conveyor 6030 prior to lowering the repositioned deformable laundry 10 article onto the conveyor 6030 such that the back side of the repositioned deformable laundry article 10 is configured to contact the conveyor 6030. In other implementations, the controller can instruct at least one of the one lifter 6100*a* and the another lifter 6100*d* to rotate the shared axis As such that the front side of the repositioned deformable laundry article 10 is configured to contact the conveyor 6030. By orienting one of the back side of the deformable laundry article 10 either onto or facing away from a surface of the conveyor 6030, the repositioning robot 6000 can transfer the deformable laundry article 10 to a folding robot 7000 configured to fold the deformable laundry article based on the preset orientation. In some implementations, a deformable laundry article 10 can be easier to fold when introduced to the folding robot 7000 face up, with its back side resting on the conveyor 6030, and in other implementations, a deformable laundry article 10 can be easier to fold when introduced to the folding robot 7000 face down. The controller 6005 can be configured to determine an article type of the deformable laundry article 10 and determine a preferred resting orientation for transfer based on data retrieved from the memory 6010.

As described previously with regard to implementations, a deformable article 10 is delivered to the folding device 7000 by a repositioning robot 6000. In implementations, the repositioning robot 6000 directly deposits the deformable article onto the rotatable platform 7100 of the folding device. In other implementations, as shown in FIGS. 22-26, a transfer conveyor 6070 transits between the repositioning robot 6000 and the folding device 7000 to transfer a repositioned article 10 onto the rotatable platform 7100 for folding.

Figure 26:
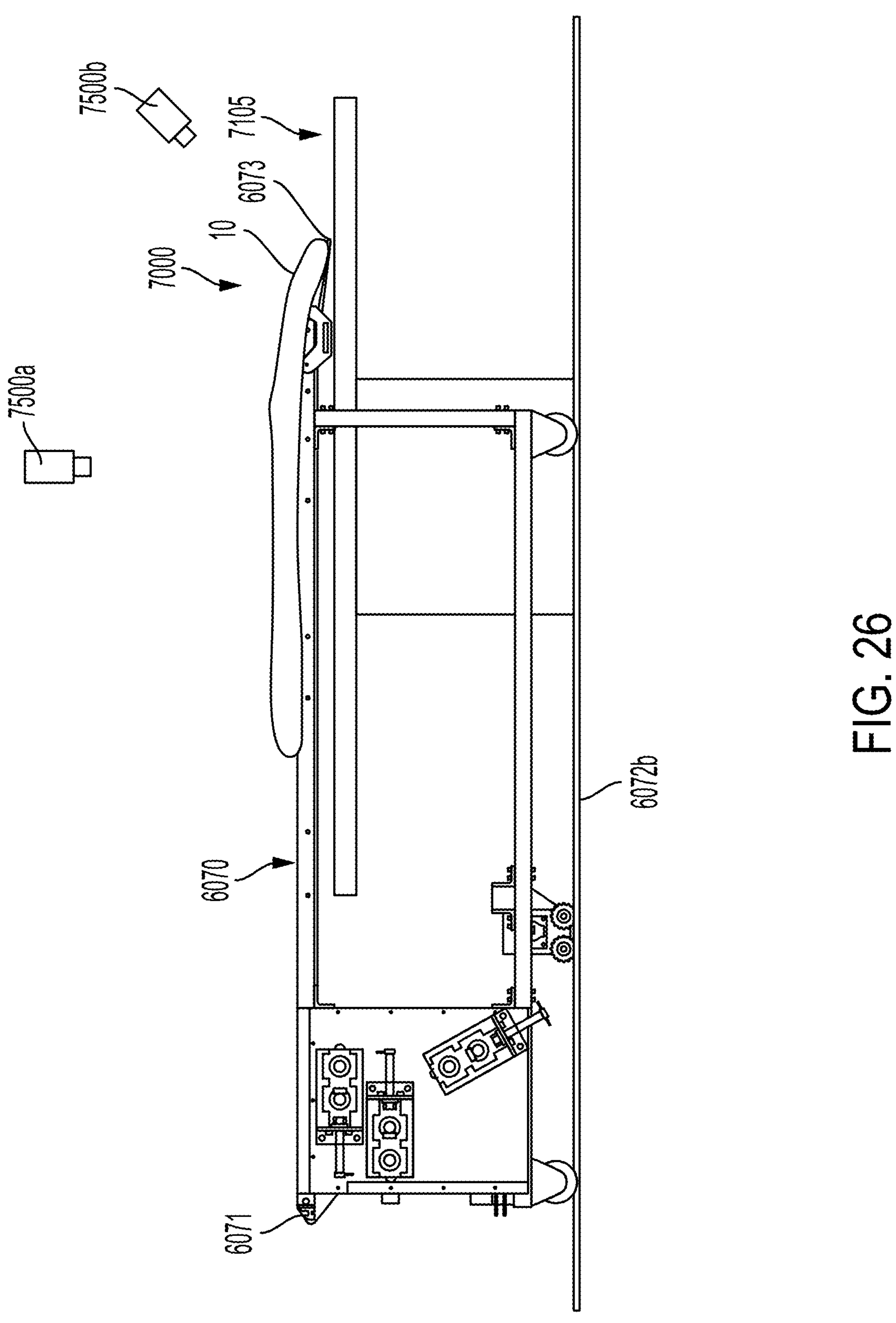
FIG. 26 depicts a side view of the transit conveyor delivering the repositioned article to the folding device of FIG. 25.
Figure 27:
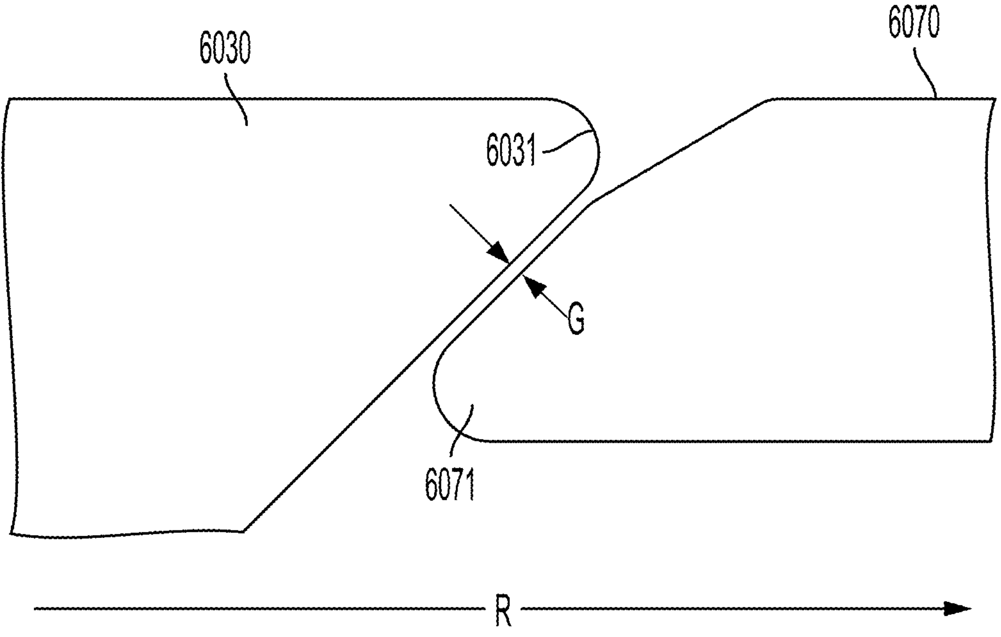
FIG. 27 depicts a schematic of abutted portions of an example repositioning robot floor conveyor and transit conveyor of an autonomous robotic laundry process line.

Referring to FIG. 27, a leading edge 6031 portion of a conveyor 6030 is shown in conjunction with a transfer conveyor 6070 configured to be disposed outside the work volume 6035. In implementations, the conveyor 6030 can have an angled leading edge 6031 configured to nest with an angled receiving end 6071 of the transfer conveyor 6070 configured to move back and forth on rails, as shown in FIGS. 23-27, between the repositioning robot 6000 and the folding robot 7000. In implementations, the angled receiving end 6071 of the transfer conveyor is flatter (e.g., shallowly sloped) than the more angled leading edge 6031 of the floor conveyor 6030. The transfer conveyor is configured to deposit the repositioned deformable laundry article 10 received by the conveyor 6030 onto a receiving surface of the folding robot 7000. The angled leading edge 6031 of the conveyor 6030 at the bottom of the work volume 6035 and the angled receiving end 6071 of the transfer conveyor 6070 are configured to nest, thereby preventing transferred repositioned laundry articles from crumpling or getting stuck between the two overlapped moving conveyors 6030, 6070. The matching angles of the leading edge 6031 and the receiving end 6071 and the matching driving directions (e.g. run direction R) ensures that no part of a transferring article falls between the floor conveyor 6030 and the transfer conveyor 6070. Additionally, a flatter angle of the receiving end 6071 of the transfer conveyor 6070 prevents the transferring article from crumpling during transfer. In implementations, a gap G between the conveyor 6030 and the transfer conveyor 6070 is no greater than 10 mm. In implementations, the gap G is between about 5 mm to 10 mm.

As previously described with regard to FIG. 5, in implementations, the conveyor drive 6210 is configured to operate a motor, such as for example, a lightweight, high power controllable motor (e.g., a brushless DC motor (BLDC), and the motor encoder comprises a speed encoder so that at least one of the processor 6205 and the controller 6005 can synchronize speed of the belt of the floor conveyor 6030 with a circulating belt of the placer conveyor 6070. By timing the transfer conveyor 6070 rotational speed with that of the conveyor 6030, during a hand off of a repositioned article from one surface to the other, the article remains repositioned and does not crumple or get pinched between the overlapped angled leading edge 6031 and angled receiving end 6071. In this way the conveyor 6030 and transfer conveyor 6070 effectively form a continuous surface moving at matched speeds such that the repositioned article can be delivered to the folding robot 7000 in the repositioned configuration for folding. In implementations, the floor conveyor 6030 and transfer conveyor 6070 rotate at a matched speed for a predetermined period of time to ensure the article is fully transferred onto the transfer conveyor 6070. In implementations, the predetermined period of time can be one of a plurality of predetermined periods of time identified by the controller 6205 as being associated with a detected size of the article being transferred. Additionally or alternatively, in implementations, at least one of the processor 6205 and the controller 6005 receives an output signal from one or more sensors (e.g., cameras 6040*a-b*, 6128*a-d*) indicative of the article being transferred out of the workspace volume 6035.

As shown in FIGS. 22-27, the transfer conveyor is configured to move back and forth between the repositioning robot 6000 and the folding robot 7000. The transfer conveyor 6070 is configured to deposit the repositioned deformable laundry article 10 received by the transfer conveyor 6030 onto a receiving surface 7100 of the folding robot 7000. In implementations, the depositing end 6073 of the transfer conveyor 6070 comprises a shallowly angled downward slope and a “knife edge” for delivering the repositioned article 10 onto the receiving surface 7100. In implementations, the “knife edge” depositing end 6073 comprises a roller having a diameter in a range of between about 5 mm to 20 mm in diameter. implementation, the “knife edge” depositing end 6073 comprises a roller having a diameter of approximately 15 mm in diameter. The depositing end 6072 slides over the surface 7105 of the receiving surface 7100 and comprises a clearance in a range of between about 0.25 mm to 5 mm. In implementations, the depositing end 6072 of the conveyor 6070 can extend past the middle of the receiving surface 7100 and ensure that larger repositioned items are fully deposited on the receiving surface 7100 and not hanging off an edge.

Figure 23:
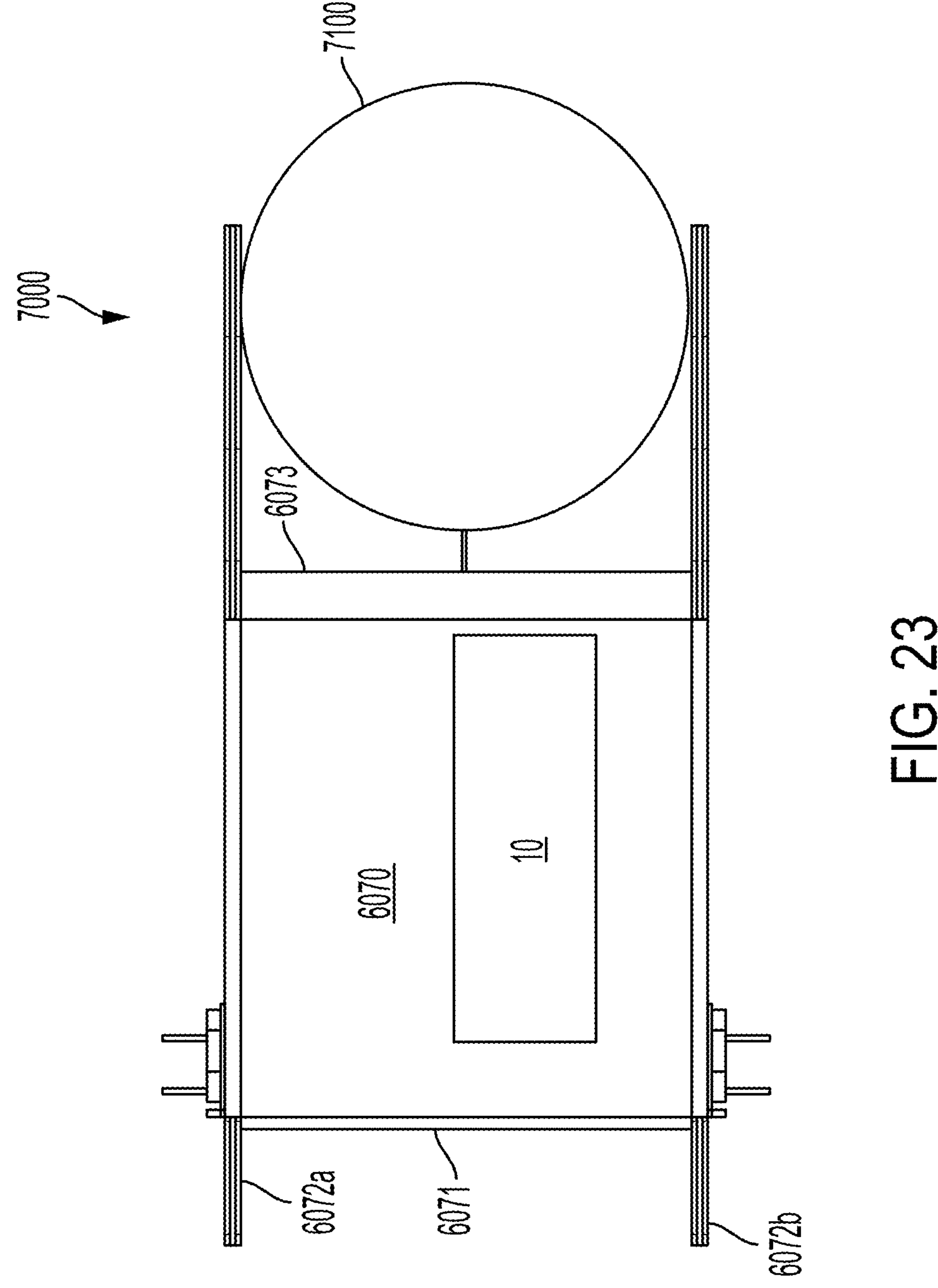
FIG. 23 depicts a top down view schematic example of a transit conveyor for delivering a repositioned article to a folding device.
Figure 25:
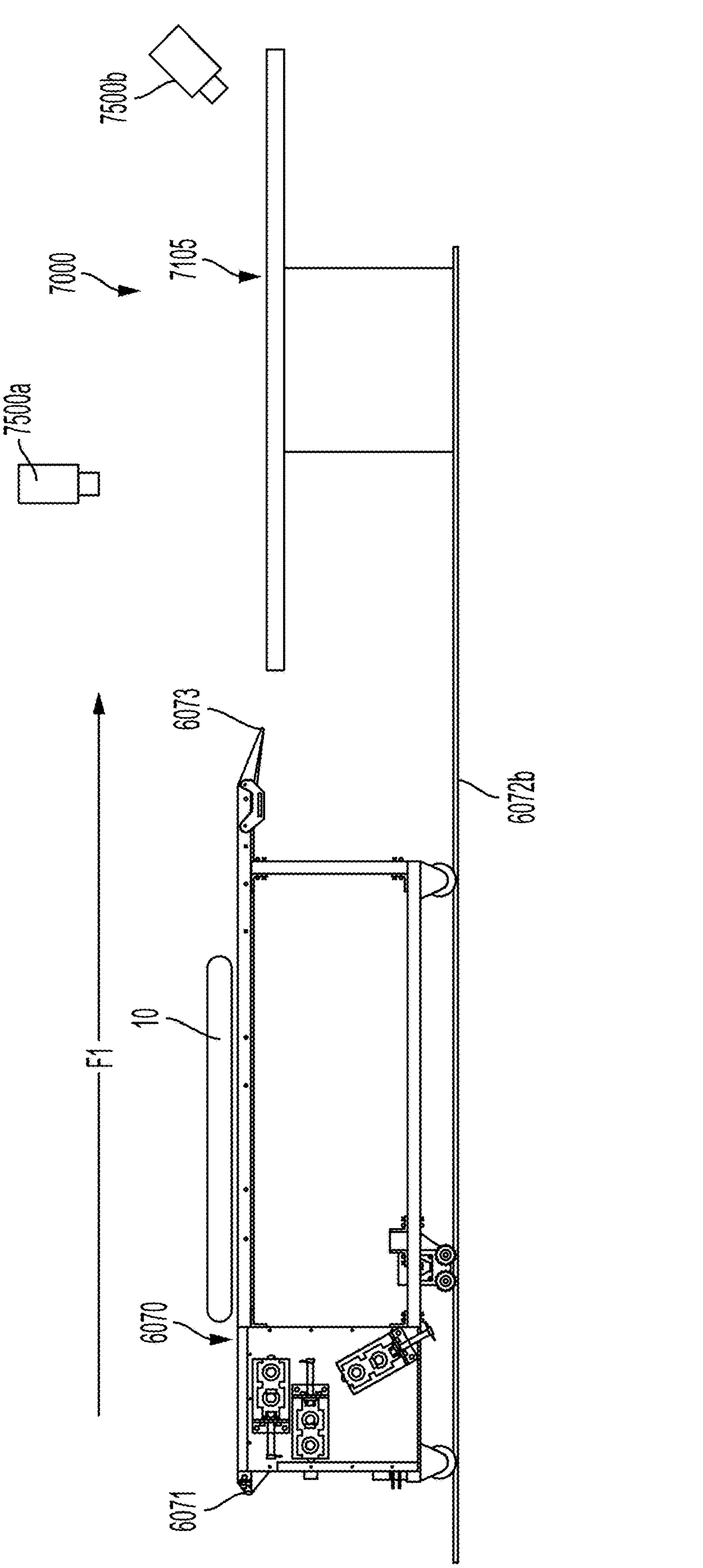
FIG. 25 depicts a side view of a transit conveyor approaching the folding device with a repositioned article.

In implementations, such as those depicted in FIGS. 23, 25, and 26, the transfer conveyor 6070 is configured to move back and forth on wheels disposed on tracks 6072*a-b*. The tracks 6072*a-b* receive thereon wheels of the transfer conveyor 6070 and the tracks 6072*a-b* extend beyond a center axis (diameter) of the receiving surface 7100. In implementations, the rails follow a straight path. Additionally or alternatively, the rails curve away from the repositioning robot 6000 to accommodate a layout of the process line 100. In implementations, the wheels of the transfer conveyor 6070 are rotated by a drive motor in operable communication with one or both of the repositioning robot controller 6005 and the folding device controller 7005. Additionally or alternatively, the wheels are free-rotating, and the transfer conveyor 6070 comprises a drive chain therebeneath for transiting the conveyor 6070 between the repositioning robot 6000 and the folding robot 7000.

Figure 22:
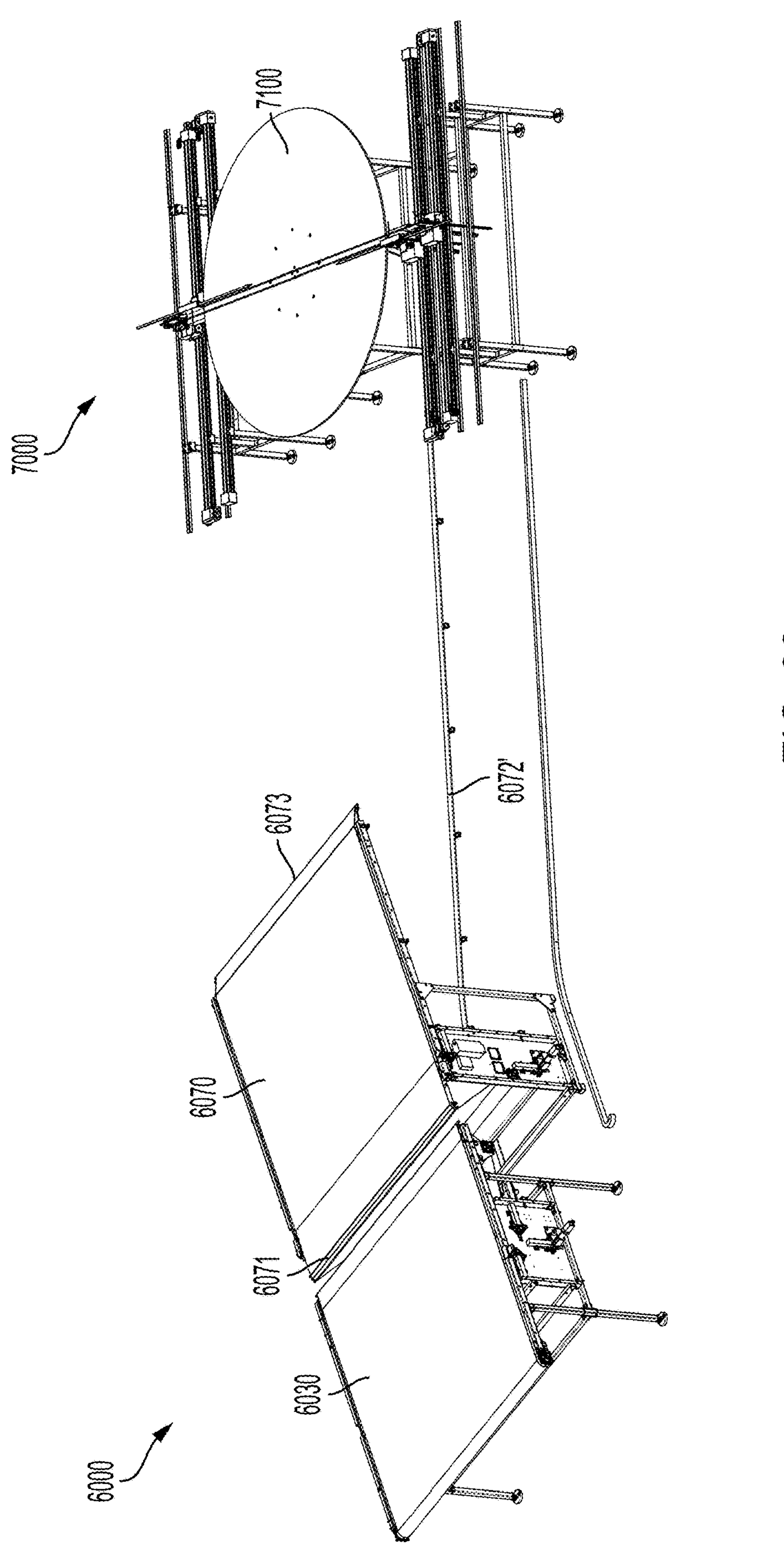
FIG. 22 depicts a perspective schematic perspective view of an example of a transit conveyor disposed between a repositioning robot and a folding device.
Figure 24A:
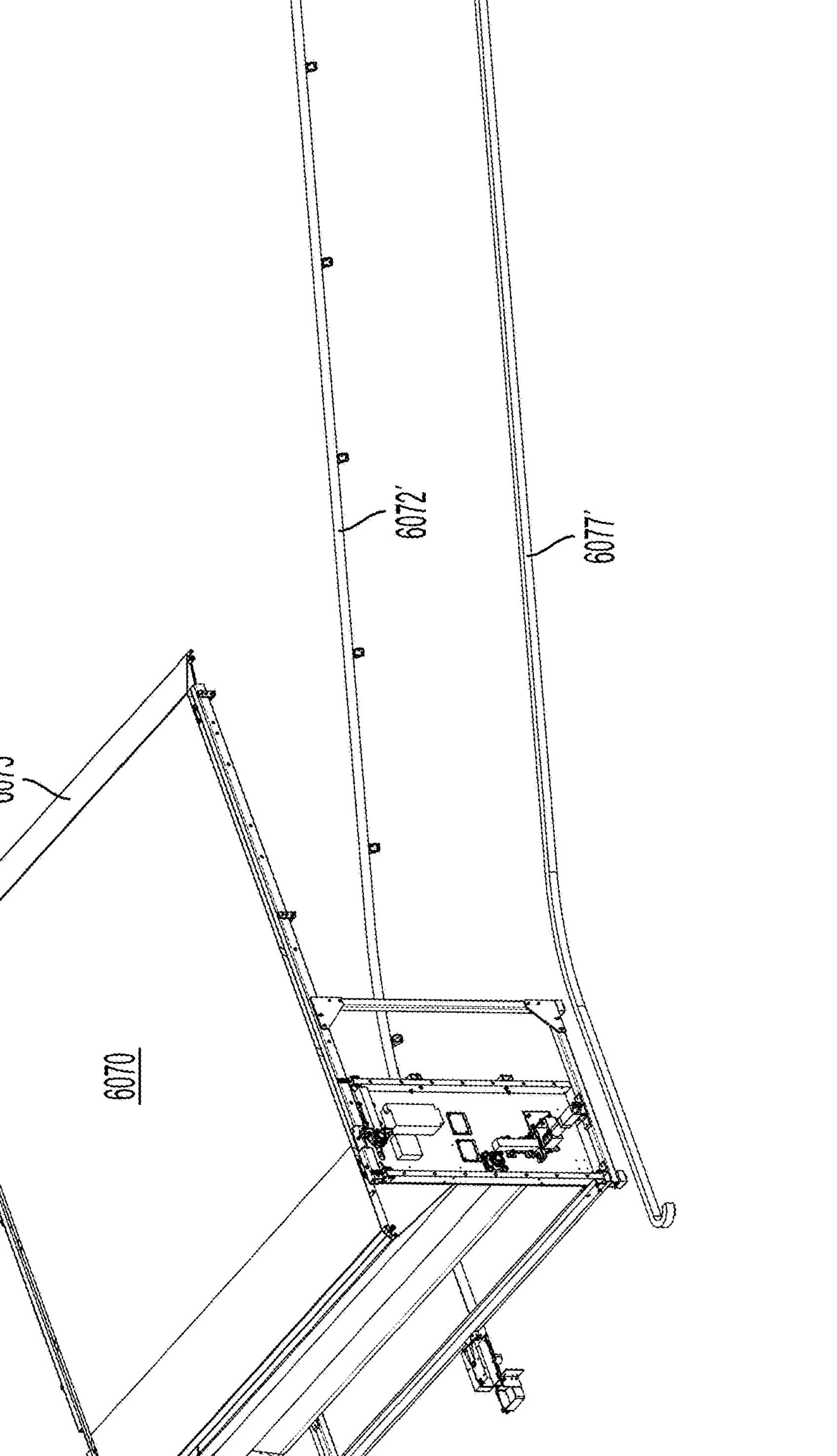
FIG. 24A depicts a rear perspective view of an example transit conveyor.
Figure 24B:
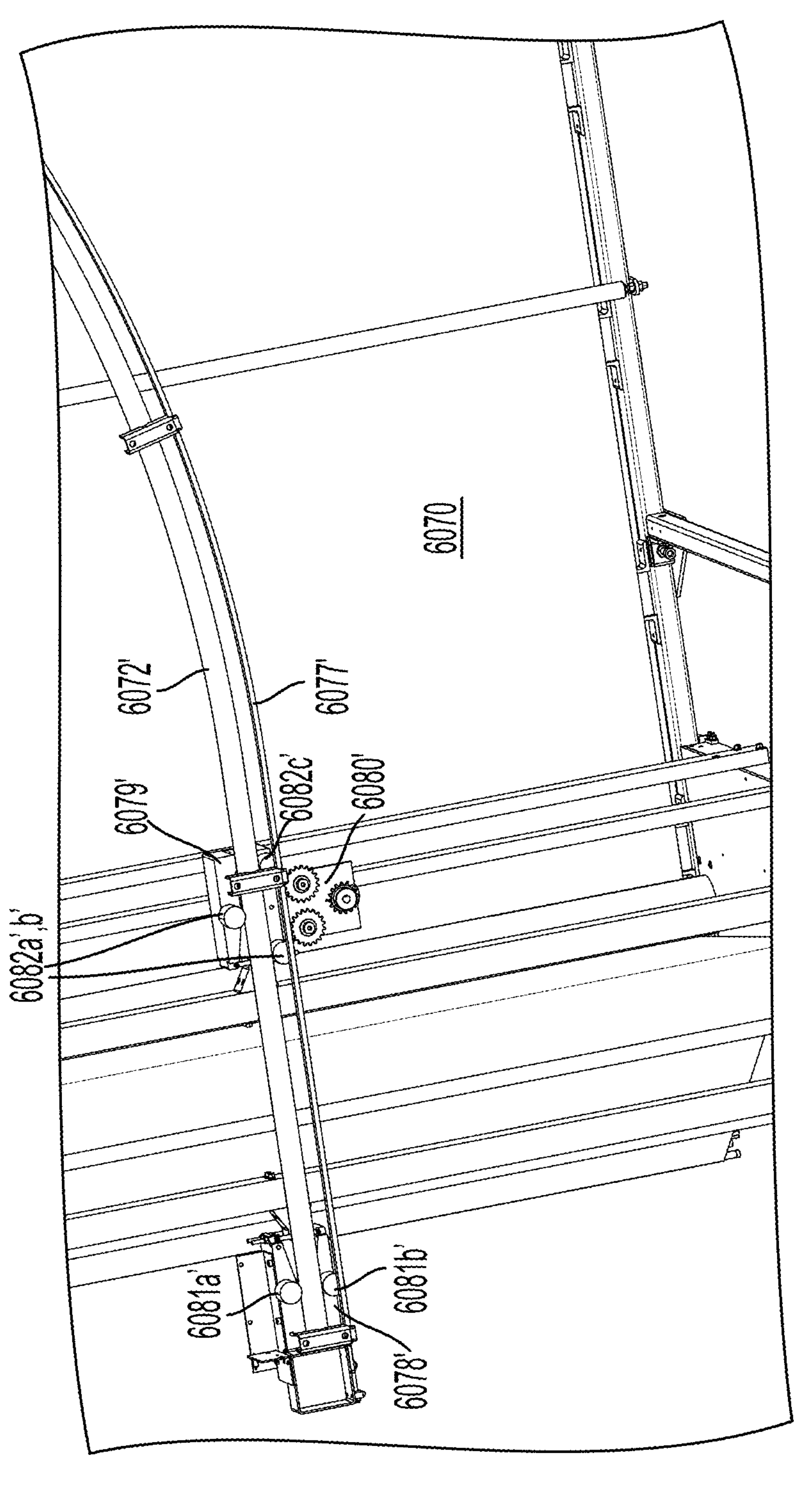
FIG. 24B depicts an underside view of the transit conveyor of FIG. 24A.

In implementations, such as those depicted in FIGS. 22, 24A-B, the transfer conveyor 6070 is configured to ride on caster wheels (not shown) resting on a floor beneath the conveyor 6070, and the conveyor 6070 transits between the repositioning robot 6000 and folding robot 7000 by a drive chain 6077' and sprockets 6080'. As depicted in the underside view of FIG. 24B, in implementations, the transfer conveyor 6070 comprises one or more spring loaded guide blocks 6078', 6079' configured to engage with a guide rail 6072'. The one or more spring loaded guide blocks 6078', 6079' each comprise at least two cam followers 6081*a*',b', 6082*a*'-c' for riding along the guide rail. The drive block 6079' further comprises one or more idler sprockets tangent to the at least two cam followers 6082*a*'-b' and a drive sprocket configured to engage the drive chain 6077'. In implementations, as depicted in FIG. 22, a flexible and/or retractable cable 6077' is configured to engage a control panel of the conveyor 6070 for transferring power to the conveyor 6070.

In other implementations, the controller 6005 can be configured to instruct the one lifter 6105*a* and the another lifter 6105*d* of the two or more lifters having associated engaged grippers 6105*a,d* to sweep the repositioned one of the plurality of deformable laundry articles 10 onto a surface outside the work volume. The surface can be, for example, a transfer conveyor 6070 or a surface of the folding robot 7000. In other implementations, the conveyor 6030 can be replaced by a tilting surface configured to receive thereon a repositioned deformable laundry article and tilt to release the article 10 under the force of gravity onto another surface such as the transfer conveyor 6070 or a surface of the folding robot 7000. In other implementations, the conveyor 6030 can be positioned higher than a stationary transfer conveyor partially stacked therebeneath in a waterfall configuration.

In the preceding implementations, the transfer conveyor 6070 transits between the stationary conveyor floor 6030 and the folding robot 7000, and is configured to occupy a neutral position, away from moving components of the repositioning robot 6000 and folding robot 7000 so as not to interfere with any motion of moving parts, for example, the movable arms 6110 of the lifter which pan, tilt, and extend into space outside of the workspace. Having the transfer conveyor 6070 be separate from the conveyor floor 6030 of the repositioning robot 6000 enables the transfer conveyor 6070 to deliver a repositioned article to the folding robot 7000 while the repositioning robot 6000 is repositioning a next article in a load of laundry. Alternatively, in implementations, the conveyor floor 6030 can be the transfer conveyor such that the repositioning robot 6000 repositions an article on the transfer conveyor 6070 at the bottom of the work volume 6035, and the transfer conveyor then exits the work volume and transits to the folding table to deliver a repositioned article.

Regardless of the devices and method of transferring the repositioned laundry article 10 from the work volume 6035, raising, repositioning, and lowering the deformable laundry article 10 relies on an output signal from each of the one or more sensors. As previously described, the one or more sensors of the two or more sensors 6128, 6128*a-d*, 6040, 6040*a*, 6040*b* can include imaging in sensors. Additionally or alternatively, the one or more sensors can include sensors 6350 disposed on or in one or more portions of the grippers 6105, 6105*a-d*. In implementations, the one or more sensors 6350 can include a finger torque and position sensor disposed on the gripper 6105 to sense when the fingers 6107*a-b* have closed. This allows the repositioning robot 6000 to operate quickly because the closed sensor can signal moving onto the next step. Additionally or alternatively, a force/torque sensor can be disposed on a wrist of a gripper 6105 to determine if the gripper has collided with anything, is pulling too hard on a deformable laundry article 10, or is tangled in the deformable laundry article 10. This sensor 6350 assists with pinching the fingers 6107*a-b* to grasp clothes off of a surface (e.g., the conveyor) by determining when contact is made with the surface. Additionally, a force/torque sensor can output a signal to the processor 6015 for estimating a weight of a deformable laundry article 10. Additionally or alternatively, one or more force/torque sensors can be disposed at a tilt axis driven by the arm tilt motor 6120*a-d*. In implementations, a torque sensor can be disposed on or in a motor for the gripper 6105. Additionally or alternatively, in implementations, strain gauges can be disposed in the bases of the fingers 6107*a-b* (not fingertips). Additionally or alternatively, in implementations, a tension sensor can be disposed in-line with the cable. In all implementations, a torque sensor could provide an output signal for determining whether or not the fingers 6107*a-b* are engaged with a deformable laundry article 10. In other implementations, engagement can be detected by force/pressure sensors (not shown) disposed on the fingertips of the two or more fingers 6107*a-b*. The force/pressure sensor(s) can be one of the gripper sensor(s) 6360 configured to communicate a sensor signal to the controller 6005, as shown in FIG. 5.

Implementations of the fingers 6107*a-b* can include finger displacement sensors to partially close to make a selective grasp in a pile or carefully slide against the ground. Finger displacement sensors, such as capacitive sensors, could be used to estimate the thickness of a deformable laundry article 10. Implementations of the fingers 6107*a-b* can include tactile sensors configured to measure clothing roughness and/or hardness.

In implementations, having one or more sensors 6350 disposed in the grippers 6105*a-b* can assist with raising and repositioning the deformable laundry article 10. In implementations, the suspension height to which a deformable laundry article 10 is raised is predetermined regardless of size or type of article. In other implementations, one or more of the sensors described with regard to the grippers 6105*a-b* can be incorporated for informing the controller 6005 that a deformable laundry article 10 is suspended. For example, one or more weight sensors can be disposed on at least one of the two or more lifters 6100*a-d* and/or associated grippers 6105*a-d*. The one or more weight sensors can be in operative communication with the controller for outputting a signal indicative of a detected force impacted by the weight of a deformable laundry article 10 engaged by one or more grippers 6105*a-b*. The one or more weight sensors can be configured to continuously detect a rate of change as the deformable laundry article 10 is raised by at least one of the two or more lifters 6100*d*. Additionally or alternatively the one or more weight sensors can be a pressure sensor disposed on or in the conveyor 6030 for detecting the presence, absence, or removal and reception of a deformable laundry article 10 thereon. In implementations, the controller 6005 can determine whether a deformable laundry article 10 is raised to a suspension height SH (e.g., a height at which the entire deformable laundry article is suspended above a surface such as the conveyor 6030) when the one or more weight sensors output an unchanging measured weight (e.g., a measured weight not varying within a tolerance of the one or more weight sensors) and/or force of the suspended deformable laundry article. Additionally or alternatively, the controller 6005 can determine that a deformable laundry article 10 is suspended above the conveyor 6030 by analyzing the received output signal of a volumetric point cloud sensor of the two or more sensors 6040*a-b* to determine a lowest edge of the deformable laundry article 10 is no longer in contact with the conveyor 6030. Additionally or alternatively, the controller 6005 can raise the suspended deformable laundry article to a pre-set, maximum suspension height (e.g., approximately 3 m) configured to suspend most household laundry articles in a range of 4 cm to 500 mm in a longest dimension (e.g., peripheral dimension, diagonal dimension (corner to corner), longest length portion, etc.).

In implementations, as previously described with regard to FIGS. 1-5, one or more controllers or processors of the repositioning robot 6000 and folding table 7000 are in wired or wireless communication via a communication network 210. The repositioning robot 6000 can provide data output but one or more sensors to the repositioning robot 7000 to enable the repositioning robot 7000 to determine how to fold the article 10. For example, the repositioning robot 6000 can provide data to the folding table associated with at least one article characteristic comprising at least one of article size, weight, thickness, and type (e.g., a pair of pants, an open front shirt, a dress, etc.). The folding table 7000 can then determine where to fold the article 10 to achieve one or more desired final folded sizes and/or aspect ratios. The one or more desired final folded sizes and/or aspect ratios can be concurrently determined or can be one of a plurality of present sizes and aspect ratios for an intelligent packing scheme.

Additionally or alternatively, in implementations the folding robot 7000 can instruct the transfer conveyor 6070 to retrieve an article 10 for transit back to the repositioning robot 6000 if the folding robot determines that the article 10 cannot be folded to one or more desired final folded sizes and/or aspect ratios either because the article is not fully repositioned or because the article is too small for repositioning. The transfer conveyor 6070 can place the depositing end 6073 against the article 10 on the folding table and run the belt in reverse, toward the repositioning robot 6000 while transiting on the rails 6072*a-b* to the conveyor 6030, also running in reverse to receive the article 10 thereon again. Additionally or alternatively, in implementations, once the transfer conveyor 6070 is positioned over the folding robot 7000, the folding robot 7000 can instruct the transfer conveyor 6070, prior to depositing an article, to return the article 10 for transit back to the repositioning robot 6000 if the folding robot determines that the article 10 cannot be folded to one or more desired final folded sizes and/or aspect ratios either because the article is not fully repositioned or because the article is too small for repositioning. Additionally or alternatively, in implementations, the folding robot 7000 can instruct another conveyor of the packing robot 8000 to retrieve an article 10 for depositing onto another conveyor and/or directly transiting back to the separating robot 3000 if the folding robot determines based on at least one of one or more received sensor signals and attempted folding maneuvers that the article 10 cannot be folded to one or more desired final folded sizes and/or aspect ratios, for example because the article is not fully repositioned.

Additionally, in implementations, the repositioning robot 6000 can pass articles 10 that are too small for folding to a transit conveyor for delivery to a packing robot 8000 without folding. The repositioning robot 6000 can try to reposition the article 10 for passing back to the folding robot 7000 again. In implementations, the repositioning robot 6000 can pass articles to the transit conveyor for delivery to the packing robot 8000 without folding after a threshold number of repositioning retries (e.g., 1-3 retries) so that the repositioning robot 6000 can further process remaining deformable articles in a load of laundry for folding without losing more than 3-10 minutes of time retrying repositioning of a single article. Alternatively, the repositioning robot 6000 can pass articles to the transit conveyor 6070 for delivery to the folding robot 7000 without folding after a threshold number of repositioning retries (e.g., 1-3 retries) so that the folding table can fold the insufficiently repositioned article 10 to a closest desired size and aspect ratio. For example, if the article 10 is a pair of pants with one leg inside out, the folding robot 7000 can fold the non-flat pair of pants despite the imperfect positioning.

Figure 28:
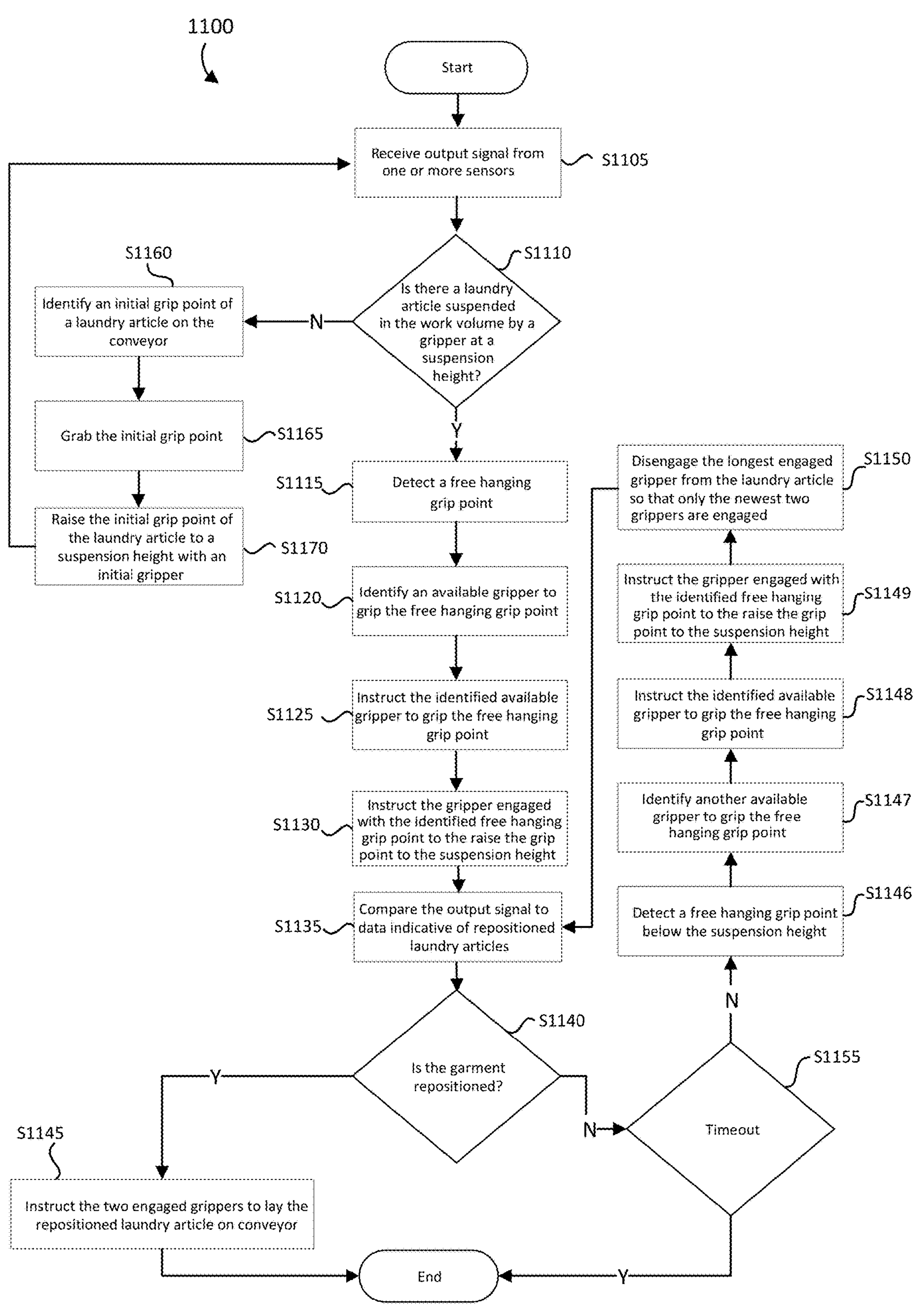
FIG. 28 depicts a schematic of an example method of repositioning a laundry article with a repositioning robot of an autonomous robotic laundry process line.

Referring now to FIG. 28, any of the implementations described previously with regard to a repositioning robot 6000 are applicable to implementations described herein with regard to a method 1100 of robotically repositioning a laundry article (e.g., also referred to herein as a deformable laundry article 10 for folding.

In implementations, the method 1100 can include, receiving S1105, at a controller, such as the controller 6005 of the repositioning robot 6000, one or more output signals from two or more sensors configured to at least one of detect one of one or more features and capture one or more images of the laundry article. The controller is configured to determine S1110, based on the received one or more output signals, whether the deformable laundry article is suspended above a workspace floor (e.g., conveyor 6030) from a suspension height by a first gripper of three or more movable grippers in operative communication with the controller, the three or more moveable grippers being anchored aside (e.g., proximate and adjacent) the conveyor. The controller is configured to detect S1115, based on the received one or more output signals, a grip point disposed on the deformable laundry article below the suspension height, identify 1120 an available gripper, e.g., a second moveable gripper of the three or more movable grippers, for engaging the grip point, and instruct 1125 the second one of the three or more movable grippers to engage the grip point of the suspended laundry articles and lift 1130 the grip point to the suspension height. In implementations, the controller is further configured to select one of the three or more grippers closest to the grip point prior to instructing the second of the three or more grippers to engage the grip point. Additionally or alternatively, in implementations, the controller can be configured to instruct an engaged one of the three or more grippers to at least one of translate (e.g., in the x-axis and/or y-axis) and rotate (e.g, about the z-axis $L_Z$) the laundry article 10 for alignment of the shared gripper axis with either the x or y axis of the work volume in preparate for gripping of a new low point by available another of the three or more grippers.

In implementations, the controller 6005 is configured to select the second moveable gripper to grip the identified grip point based on a movement direction. For example, in implementations, the controller executes an algorithm comprising a hard coded direction (e.g., CCW, CW) for selecting a next available gripper and also for selecting a direction of rotation of the shared gripping axis AS, as will be described subsequently with regard to implementations. Additionally or alternatively, in implementations, the controller 6005 is configured to determine the second grip point (e.g., the grip point immediately following an initial hoist within the work volume) by analyzing the sensor output and determining a low point of the suspended laundry article 10. The controller then determines whether the low point is to the right or left of an axis extending between the base of the arm associated with the first gripper and the suspension point where the first gripper is engaged with the laundry article. If the low point is to the right of the axis, the controller instructs an available arm closest to the low point on the right to grip the low point and raise the suspended laundry article counterclockwise (CCW). If the low point is to the left of the axis, the controller instructs a available arm closest to the low point to the left configured to grip the low point and raise the suspended laundry article clockwise (CW). Subsequent grippers 6105 can grip the article 10 in the hard coded (e.g., predetermined) direction, or, alternatively, the direction of the second grip can determine the direction of all subsequent grips (e.g. the next arm 6110 and gripper 6105 in either of the CCW or CW direction that grips the next low point).

Additionally or alternatively, in implementations, with a first and second tipper engaged along a shared axis AS, the controller 6005 is configured to instruct a longest engaged one of the two engaged grippers along the shared gripper axis AS to translate parallel to one of an x-axis $L_{HX}$ and a y-axis $L_{HY}$ of the conveyor such that a low point of the article is disposed within reach of an available, unengaged gripper. As will be described with regard to FIG. 35, the shared axis AS between the two engaged grippers will be rotated parallel to either the x-axis Lx or the y-axis Ly. The direction of rotation of the longest engaged gripper can be hard coded (e.g., predetermined) so that each subsequent rotation of a shared axis AS aligns the newly formed shared axis AS parallel with an alternating one of the x-axis Lx and Ly axis and moves in the hard coded direction of next available gripper selection such that the sequentially formed shared axes rotate around a x-axis $L_Z$ of the work volume in the hard coded direction.

Additionally, in implementations an initial hoist of an article within a work volume comprises moving the gripper of the initially engaged lifter 6100*a-d* to a center of the work area 6032 defined as the projection of the work volume 6035 on the floor 6030 of the repositioning robot. For example, for the circular work area 6032 of FIGS. 6A and 6B, the center falls at the intersection of two diameters of the work area 6032.

Returning to FIG. 28, once the second moveable gripper engages and lifts the grip point to the suspension height such that the first and second grippers form a shared axis AS between them, the method 1100 can the include comparing 1135 the output signal received from the one or more sensors 6128*a-d*, 6040*a-b* to data stored in a memory in communication with the controller, the data being indicative of one or more repositioned laundry articles. The method includes determining 1140, based on the comparison, whether the laundry article engaged with the first and second grippers matches the data indicative of the one or more repositioned laundry articles. As described above with regard to implementations of the repositioning robot 6000, the controller 6005 can rely on a trained convolutional neural network that operates quickly on at least one of 2-D and 3-D data.

As previously described, in implementations, the memory 6010 comprises a trained neural network, for example a convolutional neural network, configured to classify images from at least one of a 2-D camera and a 3-D point cloud sensor. For example, as previously described with regard to FIG. 29, a neural network 300 can be trained with a set of training data 305. For example, a plurality of photographs of known classes of articles can be manually tagged in a database with class identifiers. After training, the neural network 300 comprises a set of weights that can be used for neural network inference to determine whether an input 330 (e.g., output signal from the two or more sensors 6040*a*, 6040*b* of the repositioning robot 6000) is within one of the trained classes.

The comparison of the output signal to the data indicative of one or more repositioned deformable laundry articles comprises an analysis based on the neural network. In an implementation, the comparison comprises generating a descriptor based on the output signal of the two or more sensors 6040*a*, 6040*b*, and classifying, using the neural network, the output signal based on the descriptor. The neural network is configured to output a probability that the output signal corresponds to a class of the stored data indicative of one or more repositioned deformable laundry articles. The classes of trained data in the neural network comprises data associated with many types of deformable laundry articles that are repositioned and ready for folding.

As shown in Table 3, in implementations, the classes of trained data comprise various classed trained on at least one of 3D and 2D images for enabling controller 6005 to decide a next action for the repositioning robot 6000:

TABLE 3

| 3D Classes | 2D Classes |
|---|---|
| Flat (e.g., repositioned for folding) | Facing forward (e.g., open front shirt) |
| Not flat | Facing away (e.g., open front shirt) |
| One gripper missing (e.g., missed grasp) | |
| Garment on floor (e.g., conveyor 6030) | |
| Garment held by only one arm | |
| Flat but inverted | |
| Open front shirt upright, facing away (e.g., away from camera) | |
| Open front shirt upright, facing forward (e.g., facing camera) | |
| Open front shirt sideways, facing away (e.g., away from camera) | |
| Open front shirt sideways, facing forward (e.g., facing camera) | |
| Shake out the hoisted garment | |

Alternatively or additionally, one or more of the plurality of trained classes of table 4 cab be trained on either or both of 2D and 3D images.

As shown in Table 4, in implementations, for example, the next action for the repositioning robot 6000 comprises one of the following based on the neural network classification of the article 10 in the repositioning robot 6000:

TABLE 4

| Options for Next Action |
|---|
| Keep going |
| Sweep repositioned article onto floor conveyor |
| Miss recovery |
| Do shirt fold with sleeves gripped |
| Do shirt fold with one sleeve and one front corner gripped |
| Do a shake |
| Invert, then sweep flat |

The actions of table 4 comprise a non-exhaustive list. For example, specific routines can be executed on the robot 6000 by the controller 6005 for each of the open front shirt conditions, (e.g., Open front shirt upright, facing away (e.g., away from camera), Open front shirt upright, facing forward (e.g., facing camera), Open front shirt sideways, facing away (e.g., away from camera), Open front shirt sideways, facing forward (e.g., facing camera)). Additionally or alternatively, the classes of Table 3 are also the actions of Table 4 and the class descriptor of the trained classifier informs the controller of the next action rather than a particular state of an article or recognition of an article type. In implementations, controller receives a descriptor output from the trained classifier, the descriptor being indicative of a next action by the repositioning robot and the next action being one of a plurality of trained classes. The controller then instructs one or more motor drives associated with pan, tilt, and extend motors of each of the lifters of the three or more lifters to execute the received next action. In implementations, the next action comprises at least one of executing an iterative repositioning sequence for a not flat article, sweeping the repositioned flat article onto the floor, executing a recovery sequence for a missed grab, inverting a flat but inverted article, executing a shirt fold with sleeves gripped, executing a shirt fold with one sleeve and one front corner gripped, retrieving an article on the floor, and executing a shake.

If the deformable laundry article 10 is determined to be repositioned, the controller is configured to instruct 1145 the first and second grippers of the three or more lifters to lay the laundry article 10 onto the conveyor 6030 and release the laundry article. If the controller does not determine that the laundry article 10 is repositioned (e.g., the laundry article is "not flat" and not ready for folding by the folding robot 7000), the method 1100 further comprises detecting S1146 a free hanging grip point below the suspension height, identifying S1147 another available gripper of the three or more grippers 6105*a-b* to grip the free hanging grip point, instructing S1148 the identified available gripper to grip the free hanging grip point, instructing S1149 the gripper engaged with the identified free hanging grip point to raise the grip point to the suspension height, instructing 1150 the longest engaged gripper to release the laundry article.

As described previously, in implementations, the controller 6005 can instruct one or more engaged grippers rotate the shared gripper axis AS to at least one of translate and rotate the suspended article before a low point grab by an available gripper. For example, the series of sequential schematics of boxes G1-G3 of FIG. 35 depict a top down schematic view of the conveyor 6030 and work area 6032 of a repositioning robot 6000 comprising four lifters 6100*a-d* disposed about the conveyor 6030. In an initial grip, as shown in box G1, a first lifter 6100*b* hoisted the article 10 in the work volume, shown projected on the conveyor 6030 as the work area 6032, and moved to the center of the work area 6032. Based on a pre-determined clockwise (CW) direction for subsequent grips and axis rotation, gripper 6105*a* of an available lifter 6100*a* gripped the article 10 and hoisted the article to the suspension height of the first engaged gripper 6105*b*. In implementations, the first lifter 6100*b* may have rotated or translated the first engaged gripper 6105 to align the first shared axis AS1 parallel to an x-axis LAX of the coordinate space.

With the first shared axis AS1 aligned parallel to an x-axis $L_{HX}$ of the coordinate space, an available gripper 6105*d* in the CW direction around the work area 6032 grabs (e.g., grips) a low point of the article 10 and hoists the grabbed low point to the suspension height SH. The longest engaged gripper, e.g., the gripper 6105*b* of the first lifter, then releases the article 10 and rotates along arrow A1' to move out of the way of subsequent grabs and axis rotations. The longest engaged gripper 6105*a* is engaged along a shared axis AS2 with the most recently engaged gripper 6105*d*. The longest engaged gripper 6105*a* rotates in the direction of arrow A2 such that the shared axis AS2 becomes AS2' in a new orientation parallel with the y-axis $Y_{HY}$ of the work area 6032. In implementations, the rotation (clockwise, counter-clockwise) will rotate the shared axis to be parallel to either the x-axis of the work area 6032 or the y-axis and the subsequent rotations will alternate between the two. In implementations, the rotation of the shared axis is the same as the predetermined direction of grabs (e.g., clockwise or counterclockwise). In implementations, the rotation of the shared axis need not be the same as the predetermined direction of grabs. In implementations, the controller 6005 will always rotate first engaged gripper by default in either the clockwise or counterclockwise direction.

As depicted in box G2, with the shared axis A2' oriented parallel to the y-axis $L_{HY}$, an available lifter in the clockwise direction 6100*c* grabs a low point of the article 10. As shown in box G3, the longest engaged lifter 6100*a* releases the article and moves the gripper 6105*a* away from article 10 to avoid interfering with the other lifters and/or the detection field of view of one or more sensors trained on the work volume. The controller 6005 then instructs the longest engaged gripper 6100*d* to rotate along arrow a3' such that the shared axis AS3 rotates along arrow a3. A repositioned shared axis AS4 is parallel with the x-axis Lux of the work area 6032. At each rotation of a shared axis, the neural network will return a descriptor to the controller comprising a next action such as those described previously with regard to table 4. Additionally or alternatively, the controller is configured to determine a next action based on receiving a class descriptor indicative of a status of the article.

Additionally or alternatively, in implementations comprising a wrist assembly 6170 that swivels and tilts at a hinge joint 6165, such as that previously described with regard to implementations, each hoist to the suspension height also comprises swiveling the gripper 6105 to ensure no part of the article 10 is twisted over a finger of the gripper during the rotation of the shared axis. For example, in implementations, the shared axis AS grabs alternate between being rotated parallel to the x-axis $L_{HX}$ and the y-axis $L_{HY}$ as previously described. In implementations, for example, a first lifter 6110*a* engages a gripper with the article 10 and hoists the article. A second lifter 6100*b* engages its gripper 6105*b*, moves to the right to align the shared axis AS parallel to the y-axis $L_{HY}$, thereby twisting the article 10 around the left finger of the gripper 6105*b*. A subsequent rotation can further twist the article around the left finger. With a wrist assembly 6170 that swivels, the controller 6005 can instruct the swivel joint 6167 to swivel as the gripper 6105*b* is raised to the suspension height, ensuring the article is never twisted over a finger of the gripper 6105*b*. Additionally, in implementations, the controller 6005 is configured to select a direction of the swivel based on the rotational direction (CCW or CW) of the arm pan.

The method 1100 can further iteratively comprise performing the detecting S1146, identifying S1147, instructing S1148-S1149, translating and/or rotating, and disengaging S1150 steps until at least one of determining 1140 a match of the output signal to the data indicative of one or more repositioned laundry articles and reaching S1155 a threshold timeout. For example, the data indicative of one or more repositioned laundry articles comprises data indicative of the laundry article being sufficiently flat for successful folding to predetermined size specifications (e.g., a 10×12 inch rectangle, 5×6 inch, 10×6 inch, etc.). Being "sufficiently flat" can include an article comprising one or more wrinkles, folded over edges, or inverted portions. In implementations, the method 1100 can comprise instructing the longest engaged gripper to release the laundry article as soon as the identified available third gripper engages the grip point. In other implementations, the method 1100 can comprise instructing the longest engaged gripper to release the laundry article after the identified available third gripper engages the grip point and lifts the engaged grip point to the suspension height. In implementations, the controller can be configured to determine a sequence of grips and releases based on at least one of article type and size.

The threshold timeout can be at least one of reaching or exceeding a threshold number of iterations without determining a match to the data and reaching or exceeding a threshold time limit without determining a match. In implementations, the threshold number of iterations comprises a number of grips ranging between about 2 and 20. In implementations, the threshold time limit is between about 5 seconds and 2 minutes.

For example, as shown in table 5, the timeout thresholds can be determined by article type.

TABLE 5

| Article Type | 1 | 2 | 3 | 4 | 5 |
|---|---|---|---|---|---|
| Maximum number of grips | 2 | 10 | 15 | 5 | 8 |
| Time out threshold (seconds) | 5 | 30 | 60 | 30 | 60 |

Each article type 1-5 can time out after one of two conditions is reached: a maximum number of grips or a time limit is reached. For example, article type 1 includes socks and underwear, article type 2 includes pants and long-sleeved tee shirts, article type 3 includes open front or button down shirts, article type 4 includes short-sleeved tee shirts, and article type 5 includes sheets and tablecloths. Article type 1 can be a smaller type of laundry article 10 and perhaps one that does not require repositioning, such as a sock. The controller may determine after two grips or 5 seconds of iteratively gripping and releasing the sock that it is repositioned. Article type 3 can include more complicated articles that require more grips and longer time span to reach a repositioned state. For example, article type 3 can include a button down shirt and the method 1100 can time out after one or both of 15 grips and 60 seconds. Article type 5 can be a larger and/or longer laundry article, such as a bed sheet, that requires more handling and a longer time limit. For example, repositioning a queen or king sized bed sheet could take up to 8 grips and 60 seconds to reach a repositioned state.

Additionally or alternatively, as shown in table 6, the timeout thresholds can be determined by article weight.

TABLE 6

| | Article Weight (Kg) | | | | |
|---|---|---|---|---|---|
| | <1 | 1-2.5 | 2.5-5 | 5-7.5 | 7.5-10 |
| Maximum number of grips | 2 | 10 | 15 | 20 | 20 |
| Time out threshold (seconds) | 30 | 60 | 60 | 120 | 120 |

Additionally or alternatively, as shown in table 7, the timeout thresholds can be determined by article size.

TABLE 7

| | Article Size (cm) | | | | |
|---|---|---|---|---|---|
| | 4-20 | 20-30 | 30-40 | 40-50 | 50-75 |
| Maximum number of grips | 2 | 5 | 5 | 7 | 10 |
| Time out threshold (seconds) | 5 | 7 | 7 | 10 | 30 |

Additionally or alternatively, the controller 6005 can determine that the method 1100 of repositioning terminates when the one or more sensors 6128*a-d*, 6040*a-b* detect that a surface area of the repositioned article is no longer growing.

If at least one of the time out thresholds, e.g., the number of grips and the time limit, are exceeded, the method 1100 of repositioning terminates. In implementations, this includes releasing the laundry article 10 onto the conveyor for transit to either of the folding robot 7000 or packing robots 8000 without repositioning. Alternatively, exceeding a timeout threshold comprises releasing the laundry article 10 onto the conveyor and restarting the method of repositioning 1100. If after a second restart, the article 10 is not repositioned and the timeout threshold(s) are reached, then the controller can be configured to release the article for transfer without having been repositioned. Additionally or alternatively, the controller can be configured to trigger an alert for human intervention, such as an audible or visible alarm (e.g., flashing light beacon) at the robot 6000 and/or on a bodily worn haptic feedback device, such a smartwatch or smartphone, or on a GUI of a computer terminal or handheld device in wired or wireless communication with the controller.

In implementations, the time out thresholds are not inclusive of settling time, or the time for a laundry to stop swinging after a grip and lift to the suspension height. In implementations, the settling time can be in a range of about 0.25 to 60 seconds, depending on at least one of article type, size, and weight. The method can include determining a rate of motion of a swinging laundry article and selecting a subsequent grip point once the rate of motion decreases to a threshold rate and/or range of distances swept by the laundry article swinging in a pendulum motion. In implementations, the method can further comprise instructing at least one of a pan, tilt, and extend motor to jiggle the arm in a direction opposite an initial swing direction of a gripped article 10 in order to dampen the swinging motion. For example, when a lifter engages an article on the floor 6030 of the work volume 6035 and subsequently raises the article to a hoist height, the article will naturally swing from the raised gripper. The controller can be configured, at or near the top of the hoist, to instruct the gripper to quickly move in at least one zig zag motion to counteract the swinging motion, with the initial portion of the zig zag being opposite the initial swing direction of the article. In implementations, the controller is further configured to anticipate an initial swing direction based on the angle at which an article is hoisted.

Alternatively, in implementations, the method 1100 can include an additional repositioning determination (not shown) between detecting S1110 the presence of an article 10 and detecting a grip point S1115. If a laundry article 10 requires no repositioning from the outset, the controller 6005 instructs an engaged gripper to lower the article 10 into a container (not shown) dedicated to collecting one or more unfoldable and/or small articles 10*a-n* that do not require repositioning or folding (e.g., socks, bikinis, braziers, etc.) or onto the conveyor 6030 for advancing without repositioning or folding. In implementations, the container is configured to be disposed on a transfer conveyor configured to route the container of small and/or unfoldable articles directly to the packing robot 8000, circumventing the remainder of the process line 100. Additionally or alternatively, the controller can determine a laundry article 10 disposed on the conveyor 6030 does not require repositioning (e.g., a sock, bathing suit, baby hat, etc.) and instruct the conveyor to transfer the laundry article 10 to at least one of a transfer conveyor configured to route articles directly to the packing robot 8000, circumventing the remainder of the process line 100, or to the folding robot 7000 for passing on through the process line 100 to the packing robot 8000 without folding. In the latter implementation the controller 6005 of the repositioning robot informs the controller 7005 of the folding robot 7000 that the article does not require folding via the communication network 230.

In implementations, the method 1100 can include the initial grab of the laundry article 10 being performed by a lifter associated with the clean laundry separating robot 5000 preceding the repositioning robot 6000. The lifter associated with the clean laundry separating robot 5000 can extend into the work volume 6035 of the repositioning robot 6000 such that the laundry article 10 does not touch the conveyor 6030 prior to repositioning. In other implementations, the laundry article is introduced onto the conveyor by clean laundry separating robot 5000, and a lifter 6100*a-d* of the repositioning robot 6000 grips the laundry article 10 and raises it off of and up from the conveyor 6030 to the suspension height. In implementations, the clean laundry separating robot 5000 could introduce the laundry article 10 to the work volume by dropping it in from a height. Alternatively, a conveyor could place the laundry article 10 at an edge of the work volume 6035 and the conveyor 6030 of the repositioning robot could move the laundry article to a center of the work area 6032. In implementations an arm 6110*a-d* associated with a lifter 6100*a-d* of the repositioning robot could reach outside of the work volume 6035 to retrieve the laundry article from the clean laundry separating robot 6000.

Once the laundry article 10 is received by the repositioning robot and positioned within the work area 6032 on the conveyor 6030, the controller is configured to determine an initial grip point. In implementations, the initial grip point can be a highest point of the article 10 lying on the conveyor 6030 as determined by a 3-D sensor. The 3-D sensor can be of any of the types of sensors previously described (e.g., a laser range finder, stereo camera, etc.) that detects the highest point and identifies the coordinates of that highest point. For example, the sensor can be at least one of the two or more sensors 6128, 6128*a-d*, 6040, 6040*a-b* previously described with regard to embodiments.

In implementations, the coordinates of an initial grip point are determined based on an output signal from a 2D or 3D camera located at a fixed location at a known height above the conveyor.

In implementations, the lifters 6100*a-b* comprise spherical coordinate arms 6110*a-b* for optimizing speed and accuracy of each gripper grabbing a grip point. The spherical coordinate arms 6110*a-d* comprise a fine position control of +/−5 mm.

In implementations, for large articles 10, the controller 6005 can be configured to determine a grip point based on a determination of a middle point or bisector of an article. The controller can be configured to instruct a third arm to lift the article from the middle grip point during a repositioning maneuver or during an initial grip to ensure the lowest point of the article 10 is off the table when the initial grip is raised to the suspension height.

Additionally, in implementations, at least one of an initial grab and any subsequent grab comprises a "shake" of the article. In implementations, the controller 6005 is configured to drive the at least one of the pan drive 6310 and tilt drive 6310 of an engage lifter 6100 in at least one of alternating side-to-side and alternating up and down motions to shake a grasped deformable article 10 at the suspension height. By shaking an article at the hoist height, the engaged lifter 6100 can untangle an article that may be stuck to itself, e.g., statically attracted or twisted, and can assist with unfurling a crumpled or bunched up article so that it drapes freely for successful repositioning.

Figure 30:
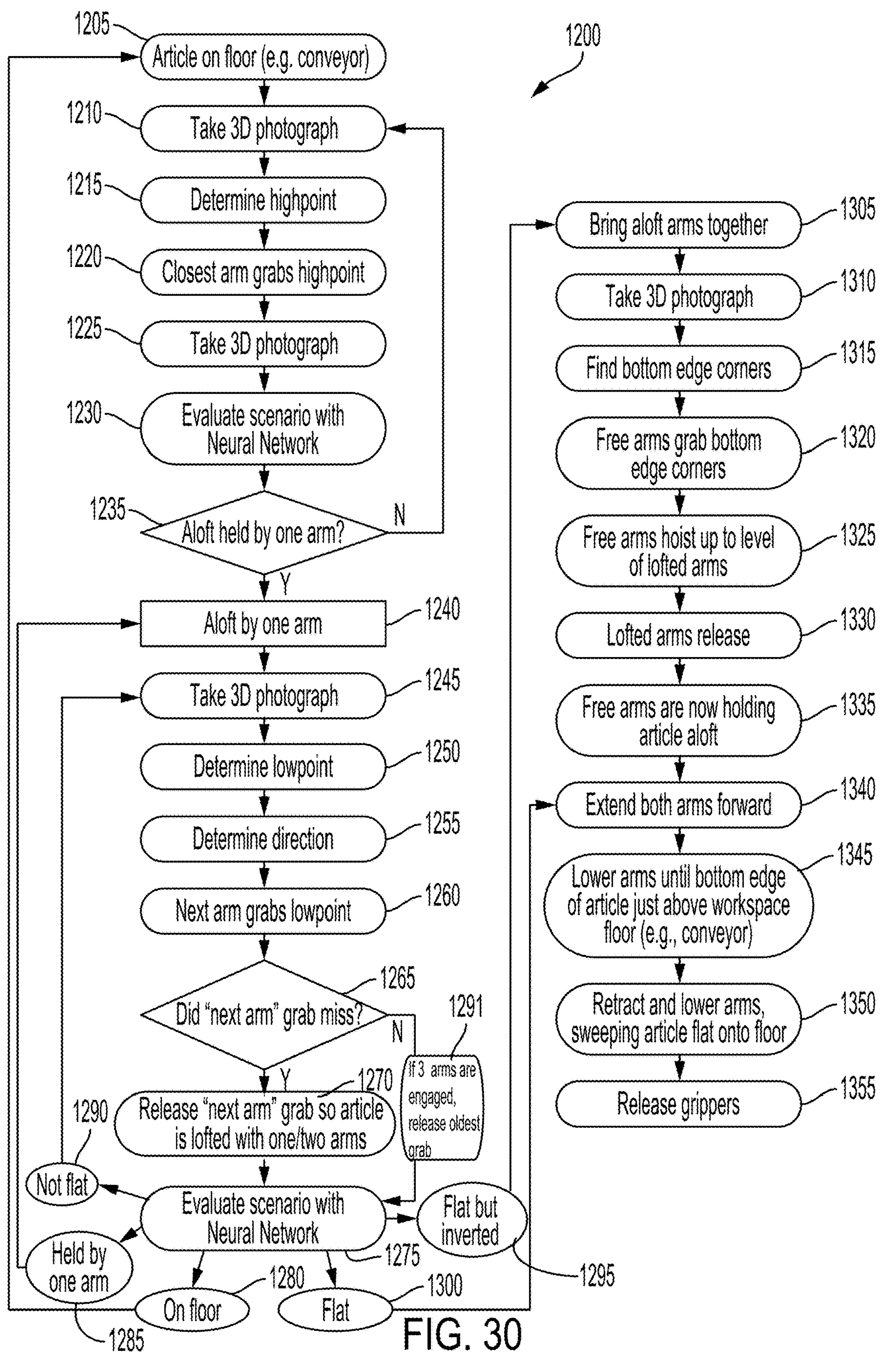
FIG. 30 is a state diagram showing an example of a state machine for a repositioning robot.

As described with regard to preceding implementations and with regard to tables 3 and 4, the repositioning robot 6000 is a state machine that autonomously determines a next action based on a current state and received sensor signals (e.g., signal(s) output from one or more cameras 6128*a-d*, 6040*a-b* detecting a current state of a deformable laundry article 10 within the work volume 6035). FIG. 30 depicts an implementation of a state diagram 1200 for the repositioning robot 6000 showing a number of transitions, data inputs, decisions, and behavior instances between states of engagement, motion, and disengagement of the one or more lifters 6100*a-d* and associated grippers 6105*a-d*. Any of the implementations described previously with regard to a repositioning robot 6000 are applicable to implementations described herein with regard to the state diagram 1200.

With a deformable article 10 on the conveyor 6030 (e.g., floor of the work volume) in an initial state 1205 of introduction to the repositioning robot 6000, the controller 6005 instructs one or more sensors 6128*a-d*, 6040*a-b* to take 1210*a* 3D photograph of the article in the work volume 6035. From this, the controller 6005 executes an algorithm to determine 1215 a highpoint of the article based on the 3D photograph. The controller determines which arm 6110*a* of a plurality of lifters 6100*a-d* is closest to the highpoint and instructs that arm 6110*a* to grab 1220 the highpoint. Again, the controller 6005 instructs the one or more sensors to take 1225*a* 3D photograph of the article 10 in the work volume and then evaluates 1230 the 3D photograph with a neural network, as described herein with regard to implementations. In implementations, the neural network processing can occur at the controller 6005 and/or on another processor in wired or wireless communication with the controller 6005, such as that of remote terminal 205.

Based on the output of the neural network, the controller 6005 will determine whether the article requires further processing by the repositioning robot to reposition the article for folding or whether the article does not require folding (e.g., of a class not suitable for folding as previously described with regard to implementations of threshold timeouts and article size and or type, e.g., socks).

The controller 6005 will determine 1235 a state of the lifters 6100*a-d* and whether the article 10 is aloft in the work volume and held by the one gripper 6105*a* of the one arm 6110*a* that was instructed to engage the article. If the article is not aloft and held by the one arm, the controller 6005 determines that the gripper 6105*a* did not engage and lift the article 10 from the work volume floor (e.g., the conveyor 6030). The state is determined to be unchanged and the controller 6005 returns to the initial processing step of taking 1210 a 3D photograph of the article 10 on the conveyor.

If the article 10 is determined to be aloft by one arm 1240 within the work volume (e.g., lifted above the conveyor 6030) and gripped by the one gripper 6105*a* of the associated arm 6110*a*, the controller 6005 instructs one or more sensors 6128*a-d*, 6040*a-b* to take 1245*a* 3D photograph of the article aloft (e.g., dangling) in the work volume 6035. From this, the controller 6005 executes an algorithm to determine 1250 a lowpoint of the article based on the 3D photograph. In implementations, the lowpoint can be the lowest detectable point. Additionally or alternatively, the lowpoint can be one or more points on the article in a lowest 25% or less of the article. The controller 6005 determines 1225, based on the 3D photograph, a of the lowest point on the article 10, either to the left or the right of an axis between the base of the arm 6110*a* and the gripper 6015*a*, and based on the determined direction, instructs a "next arm" 6110*b* of a "next lifter" 6100*b* to engage its associated gripper 6105*b* with the lowpoint. As described previously with regard to implementations, the direction of rotation of a shared axis and direction of a next available gripper of a "next lifter" can be predetermined (e.g., CCW, CW). The controller 6005 can determine 1265 whether a grab by the "next lifter" 6100*b* was missed, and instruct the gripper 6105*b* of the previous grasp to release 1270 the grab, essentially executing a standard release routine of opening the gripper 6105*b* and moving down and/or back from the suspension height. Based on determining a missed state, the controller 6005 will execute the following steps which will attempt again to grab the low point if the "next arm" 6110 missed the grabbing the low point.

The controller 1275 evaluates one or more concurrently received images, comprising at least one of 3D images and 2D images, with the neural network to determine a state of the article within the work volume (e.g., determine whether the garment is "repositioned" and ready for folding).

As depicted in Table 3, the trained classifier of the neural network can resolve that the article 10 is in at least one of the following states and/or provide a descriptor indicative with next actions comprising the following: on the floor 1280, held by one arm 1285 (e.g., missed grasp), not flat 1290, flat but inverted 1295, and flat 1300. Additionally, in some particular garment cases, such as will be described with regard to implementations, a next action can be specific to an article type. For example, in implementations, a descriptor class comprises an open front shirt comprising a right side up orientation and a sideways orientation, and optionally comprises a second class comprising the open front of the shirt facing toward available lifters and facing away from available lifters. In implementations, the first class can be trained on 3D images and the second class can be trained on 2-D images. Additionally or alternatively, all of the classes can be trained on 3D images.

If the neural network determines the article is on the floor, the controller 6005 determines the repositioning robot is in the initial state 1205 and returns to instructing the lifters 6100*a-d* accordingly. If the neural network determines the article is held aloft by one arm, the controller 6005 returns to the state of being aloft by one arm 1240, moves the engaged arm back to the center of the workspace 6032, and returns to instructing the lifters 6100*a-d* accordingly. This effectively will retry a missed grab in the previously described state of a "next arm" 6100 missing the grab with its gripper 6105. Additionally or alternatively, in implementations, because a controller 6005 might not know whether the first engaged gripper dropped the article or whether the gripper of the "next arm" missed a grab, the controller 6005 can be configured to determine, based on an input signal of a sensor 6128*a-d*, 6040*a-b*, where pixels lie in an image and determine which gripper is closest to the pixels representing the suspended article and therefore engaged with the article. As described previously with regard to implementations, the field of view 6042, 6044 of a camera sensor 6128, 6128*a-d*, 6040*a*, 6040*b* comprises the entire height of the work volume 6035 such that a sensor is configured to detect whether a hoisted gripper is engaged with a suspended article 10 or missed a grab. If the neural network determines 1265 that the gripper did not miss a grab, that the grippers of three arms are engaged 1291, and that the article is not flat (e.g., requires additional repositioning before the folding robot 7000 can fold the article), the controller 6005 instructs the oldest of three engaged grippers to release its grab, and the controller 6005 returns to the state of taking 1245 a 3D photograph of the article aloft in the work volume to instruct another round of grabbing and hoisting to a suspension height SH.

If the neural network resolves that the article is flat but inverted (e.g., upside down from a preferred lowering position), the controller 6005 will instruct the two engaged grippers 6105*a-b* to lift to the same height, bringing 1305 the aloft arms 6110*a-b* together in a vertical plane. The controller 6005 instructs one or more sensors 6128*a-d*, 6040*a-b* to take 1310*a* 3D photograph of the article aloft (e.g., dangling) in the work volume 6035. From this, the controller 6005 executes an algorithm to determine 1315 the bottom edge corners of the article based on the 3D photograph. The controller 6005 instructs available (e.g., not engaged with the article) grippers 6105*c-d* of unoccupied lifters 6100*c-d* to engage with 1320 the bottom edge corners. The controller 6005 instructs the newly engaged lifters 6100*c-d* to hoist 1325 up to the vertical plane of the aloft arms 6110*a-b*. The controller 6005 then instructs the two originally engaged lifters 6100*a-b* to release the article such that the two most recently engaged lifters 6100*a-d* are holding 1335 the article aloft in the work volume. The article is now flat and no longer inverted.

Flat but inverted articles 10 are typically pants because pant legs are long and dominate the low point of the hoisted article in the first and second grabs. Because pant legs are long, they tend to twist. So in the flat by inverted state, the controller 6005 address this by having two unengaged grippers of two available lifters grab the bottom (e.g., waistband) of the pants and hoist that up, releasing the previously grabbed, potentially twisted legs from the first two hoisted grippers. The pants legs then hang down, untwisted, with the waist band gripped and hoisted to the suspension height.

Grabbing the waistband of a pair of pants that is flat but inverted can be more efficiently accomplished in implementations of a lifter 6100 comprising a wrist assembly, such as the pivoting and swiveling wrist assembly 6170 previously described with regard to implementations. In some instances, the dangling waistband of flat but inverted pants is not straight but instead curves in a "C" or "U" shape that makes it difficult for a rigid (non-hinged and non-swiveling) gripper assembly to grasp at an edge. In implementations of an arm comprising a hinged and swiveling wrist assembly, however, the controller can instruct the wrist drive 6355 to move the gripper to a pose that is perpendicular to the dangling edge of the horseshoe. In implementations, the controller 6005 can detect an edge by pattern matching the "C" or "U" shape in each direction. Alternatively or additionally, because the edges of the "C" or "U" is parallel or approximately parallel to either the x-axis Lux or y-axis $L_{HY}$, the controller 6005 can be configured to align an available gripper 6105 parallel to the same x-axis or y-axis, which will be approximately perpendicular to the alignment of the shared axis between the two engaged grippers 6105. Because the gripper 6105 comprises a wrist assembly, the gripper can swivel and/or tilt at a hinge joint to assume the pose necessary to align with the edges of the curved waistband.

Additionally or alternatively, in implementations, detecting an edge of an article for grasping comprises the controller 6005 receiving a sensor signal comprising a point cloud and detecting an edge based on a mesh determination. Additionally or alternatively, in implementations, the controller 6005 is configured to execute a principal component analysis in 3D space to determine a pose of the gripper.

Returning now to FIG. 30, if the neural network resolves that the article 10 is flat (and not inverted), the controller 6005 instructs the two engaged lifters of the plurality of lifters 6100*a-d* to extend both arms 6110 to move toward 1340 one end of the conveyor 6030 and lower 1345 until a bottom edge of the article is just above the conveyor. The controller 6005 instructs the arms 6110 of the two engaged lifters of the plurality of lifters to retract and lower 1350, sweeping the article flat onto the conveyor. Once the controller 6005 determines based on at least one of sensor input determinative of the article being on the conveyor and being a vertical position of the engaged grippers being disposed on or slightly above the conveyor floor, the controller 6005 instructs the engaged two of the plurality of grippers 6105*a-d* to release 1355 the article. A flat classification determines the controller will sweet the article onto the floor for handing off to the folding robot 7000. A flat article can be a t-shirt held sideways or an open front shirt facing up and ready for sweeping and subsequent folding. As described previously, a repositioned, "flat" garment can comprise a number of wrinkles or bent portions. A flat garment is one that is repositioned sufficiently for subsequent folding by the folding robot 7000.

As previously described with regard to implementations, the controller 6005 can determine that an article is stuck to itself, e.g., statically attracted or twisted, and can take the action of instructing one or more of the arms to "shake" the article to assist with unfurling a crumpled or bunched up article so that it drapes freely for successful repositioning. As described with regard to implementations, at least one of an initial grab and any subsequent grab can comprises a "shake" of the article. In implementations, the controller

6005 is configured to drive the at least one of the pan drive 6310 and tilt drive 6310 of an engage lifter 6100 in at least one of alternating side-to-side and alternating up and down motions to shake a grasped deformable article 10 at the suspension height to untangle, unstick, and/or shake out a bunched up article 10.

In implementations, the neural network returns an "on the floor" descriptor 1280 indicative of the article being on the floor (e.g., conveyor 6030) and the next action begins with the article being on the floor 1205 and the controller taking a 3D photograph 1210 to determine 1215 a high point such that a closest arm grabs 1229 the highpoint for a hoist.

Figure 31A:
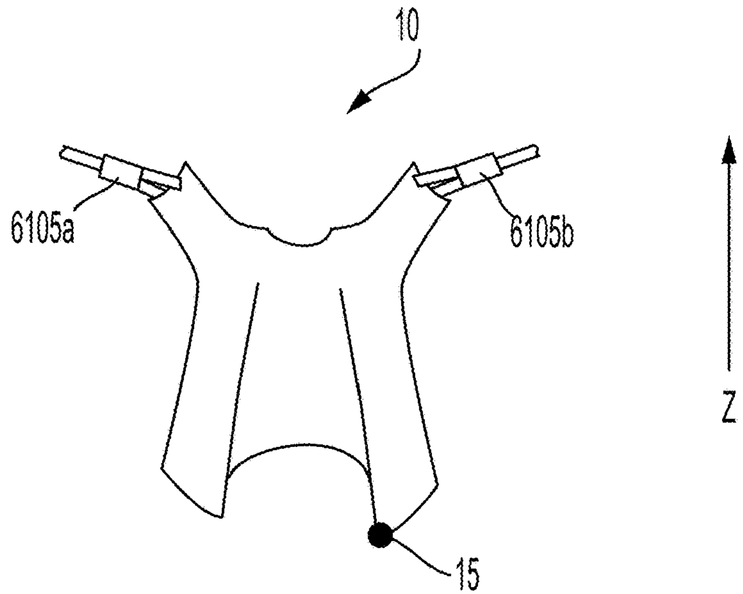
FIG. 31A depicts a front view of an open front shirt suspended from the sleeves by two lifters of the repositioning robot.
Figure 31B:
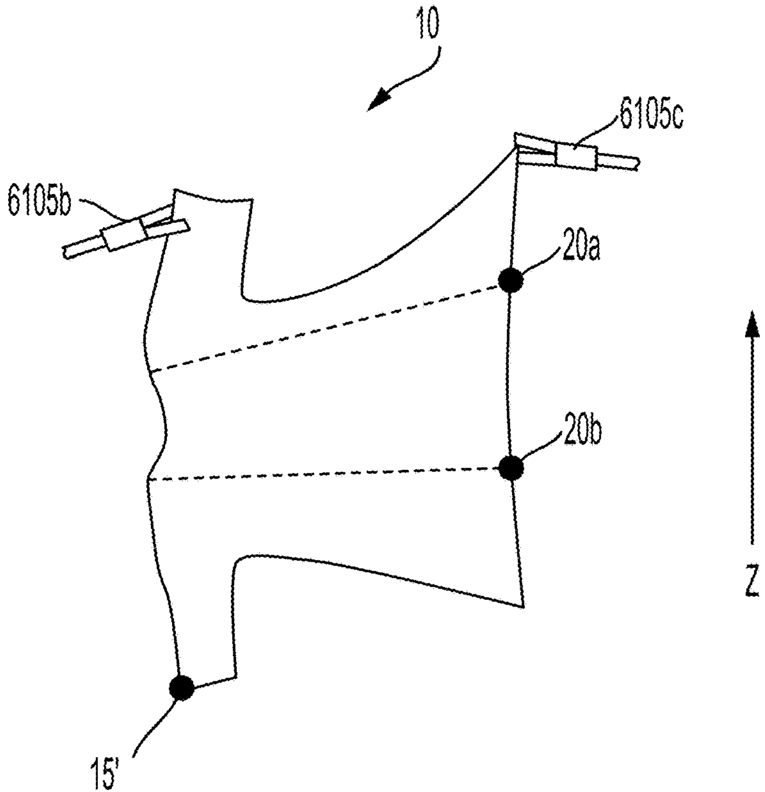
FIG. 31B depicts a front view of an open front shirt suspended sideways from one sleeve and one corner by two lifters of the repositioning robot.

Returning to the state of an open front shirt, the controller 6005 can instruct one or more arms 6100*a-b* based on a determined first class of open front shirt comprising a right side up orientation and a sideways orientation, and an optionally second class comprising the open front of the shirt facing toward available lifters and facing away from available lifters. FIG. 31A depicts an open front shirt hanging right side up in the work volume of a repositioning robot, each sleeve grasped by one of two engaged grippers 6105*a-b*. In implementations, the trained 3-D image classifier of the neural network is configured to identify the open front shirt and a trained 2-D classifier is configured to determine that the inside of the shirt is facing two unengaged lifters 6105*c-d*. In implementations, the controller 6005 is configured to identify a lowest grip point 15 at a bottom corner of the shirt. The controller 6005 instructs a gripper 6105*c* of an available lifter 6100*c* to grab the lowest grip point 15 and rise to the suspension height such that the open front shirt hanging sideways in the work volume, as shown in FIG. 31B, suspended by one sleeve and a bottom corner of the shirt while the first engaged gripper 6105*a* releases its grip.

Figures 32A, 32B:
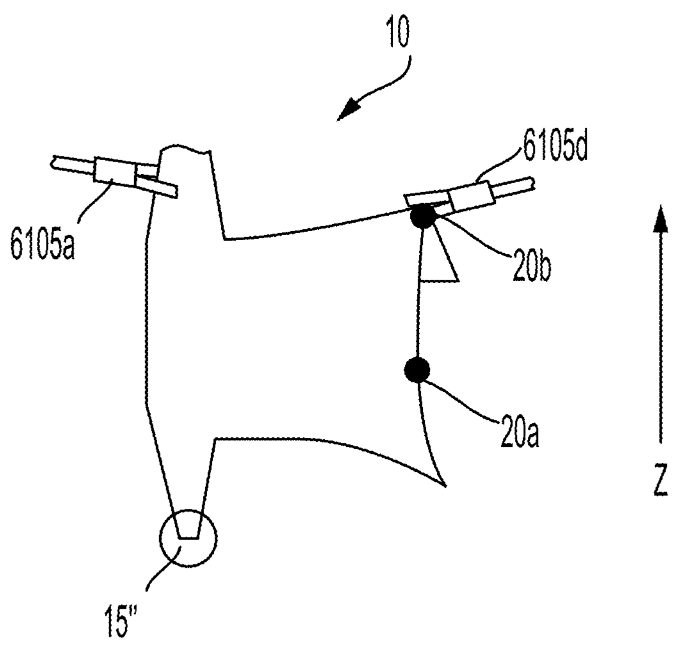
FIG. 32A depicts a rear view of an open front shirt suspended sideways from one sleeve and one corner by two lifters of the repositioning robot.
FIG. 32B depicts the open front shirt of FIG. 32A suspended by four lifters of the repositioning robot.

In implementations, the controller 6005 determines approximately where two seam points 20*a*, 20*b* land long a bottom edge of the shirt, which is oriented vertically, parallel to the z-axis Z. In implementations, lower seam point 20*b* can be located approximately three quarters of the distance down the edge. The controller 6005 can instruct each one of two unengaged grippers 6105*a, d* to grab one of the lowest seam point 20*b* and the lowest point 15' on the dangling sleeve such that the shirt is suspended by a sleeve and an edge point, as shown in the back facing view of FIG. 32A. The controller can then instruct the two unengaged grippers 6105*b*, 6510*c* to grab the lowest seam point 20*a* and lowest point 15" on the dangling sleeve. As depicted in FIG. 32B, without releasing any of the engaged grippers 6105*a-d*, the four engaged lifters 6100*a-d* associated with the four engaged grippers 6105*a-d* can lay the shirt flat on the workspace floor 6030. (Gripper 6105*d* engaged with point 20*b* is omitted for clarity in FIG. 32B.)

Figure 33:
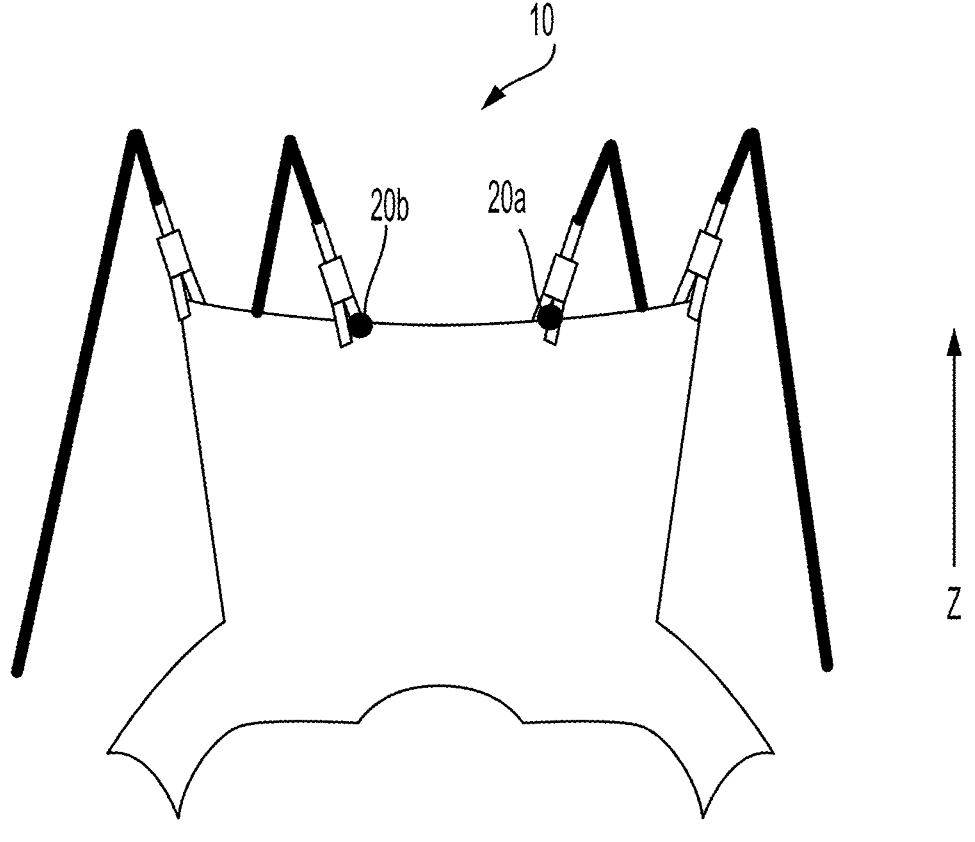
FIG. 33 depicts a rear view of an open front shirt suspended upside down by four lifters of the repositioning robot.
Figure 34:
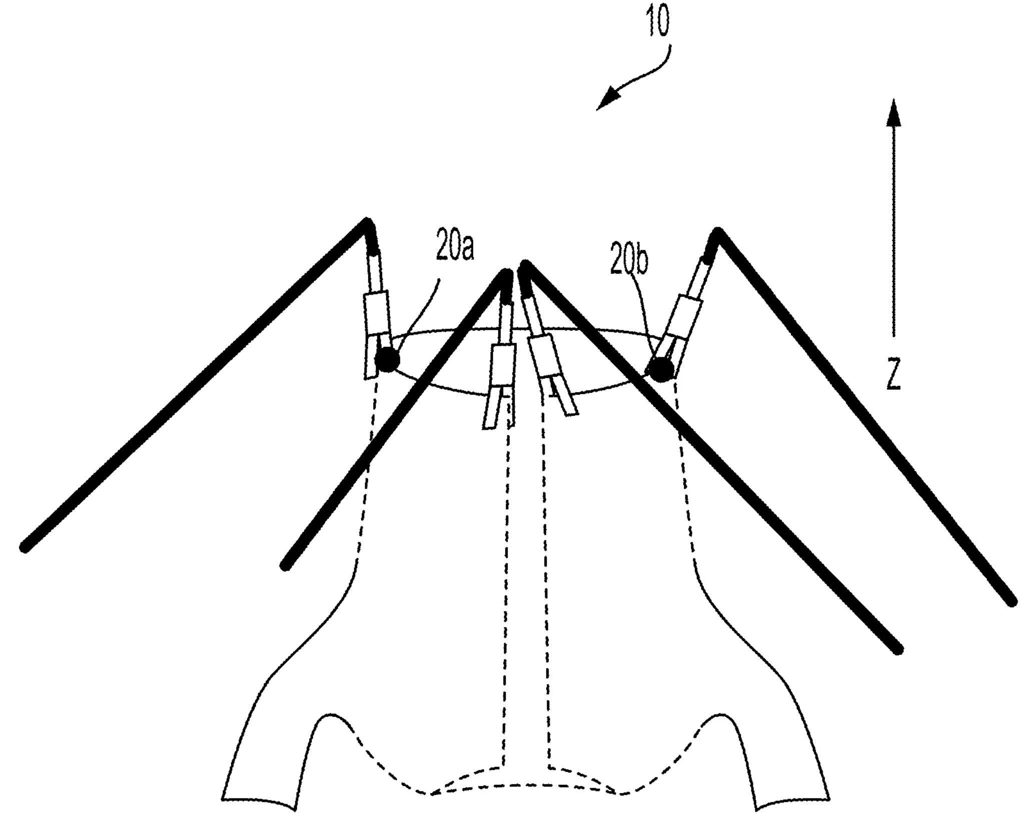
FIG. 34 depicts a front view of the open front shirt of FIG. 33 suspended and partially folded by four lifters of the repositioning robot.

Additionally, or alternatively, in implementations in which the lifters 6100*a-d* comprise a wrist assembly 6170 comprising swivel and hinge joints, the controller can instruct the grippers 6105*a* of the lifters 6100*a-d* to conduct a series of grips such that two lifters, with wrists tilted at their hinge joints, are engaged with corner points of the shirt. Two other grippers with flexible wrists can similarly tilt at their hinge joints to grab the two seam points 20*a*, 20*b*, as shown in FIG. 33. The four engaged grippers can then close the open front shirt with the sleeves dangling down and then the lifters can sweep the shirt flat on the workspace floor 6030.

In implementations, the hinged wrist assembly 6170 can therefore perform one or more "folds" of an article prior to handing the article off to a folding autonomous folding robot 7000. In other implementations, for example, the repositioning robot can perform similar "pre-sweeping" folds for thin and/or lightweight articles (e.g., silk camisoles, thin scarves) that would be otherwise difficult for the folding robot 7000 to initiate folding.

Example embodiments of the present inventive concepts may be embodied in various devices, apparatuses, and/or methods. For example, example embodiments of the present inventive concepts may be embodied in hardware and/or in software (including firmware, resident software, micro-code, etc.). Furthermore, example embodiments of the present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of the present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g. a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Although the subject matter contained herein has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Other examples are within the scope and spirit of the description and claims. Additionally, certain functions described above can be implemented using software, hardware, firmware, hardwiring, or combinations of any of these. Features implementing functions can also be physically located at various positions, including being distributed such that portions of functions are implemented at different physical locations.

As used herein, a "neural network" refers to machine learning structures. Neural networks include one or more layers of "neurons" that each receive input information and produce an output as, for example, a weighted sum of the inputs with an optional internal bias value within the neuron, or some other predetermined function that produces an output numeric value based on a combination of the input values to the neuron. The weights that are assigned to different inputs in the structure of the neural network are produced during a training process for the neural network. A simple neural network includes an input layer of neurons connected to an output layer of neurons. The output layer of neurons is configured to produce outputs based on numeric functions applied to the inputs received at the output layer such as threshold functions with parameters that are produced during a training process. A neural network may include "deep" neural networks in which multiple layers of "hidden" neurons are arranged between the input layer and the output layer with varying structures for the hidden layers including fully connected layers where the output of a neuron in a first layer is connected to an input of each neuron in the next layer or partially connected layers where the outputs of neurons in a first layer are only connected to inputs of a portion of the neurons in the next layer.

A "pose" is the position and orientation of an object in a reference frame. In some embodiments, the pose is a position and orientation of a deformable laundry article. The pose can be specified by a position in two-(x,y) or three-dimensions (x,y,z) and a heading (θ). The pose can also be further specified by an orientation including a deformable shape or volume of the laundry article, which may take into account folds, creases, curves or other shapes and positions of the laundry article. The reference frame may be a global reference frame that is fixed to the environment or may be a relative reference frame that is in relationship to another object in the environment.

"Deformable" means that a shape of an article can be bent or folded. Deformable laundry articles are typically fabric clothing or washable household items as described herein. Deformable laundry articles do not typically hold a particular or stiff shape when lifted or manipulated.

"Intelligently sorted" refers to grouping or ordering articles, for example, by size, weight, shape, function, color, fabric type, washing and/or drying requirements or other characteristics.

The foregoing is illustrative of the present invention and is not to be construed as limiting thereof. Although a few example embodiments of this invention have been described, those skilled in the art will readily appreciate that many modifications are possible in the example embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A robotic system for spreading out and folding a laundry article, comprising:

at least three lifters disposed about a perimeter of a surface, each one of the at least three lifters being configured to move at least one of independently of and in tandem with at least one other of the at least three lifters to at least one of releasably engage and spread out the laundry article above the surface, two or more sensors disposed at two or more fixed locations about the surface, each of the two or more sensors configured to detect the laundry article at least one of suspended above the surface and placed on the surface; and a controller in operative communication with the two or more sensors and the at least three lifters, the controller configured to:

receive one or more output signals from one or more of the two or more sensors, determine whether the laundry article suspended by two of the at least three lifters is spread out, and instruct, based on a determination of the laundry article being spread out, one or more of the at least three lifters to fold the spread out laundry article one or more times.

2. The system of claim 1, wherein the controller is further configured to instruct the one and the at least one other of the at least three lifters to lower the folded laundry article onto the surface.

3. The system of claim 2, further comprising a folding device configured to receive the lowered laundry article for additional folding.

4. The system of claim 1, wherein one or more of the at least three lifters comprise a wrist assembly comprising swivel and hinge joints.

5. The system of claim 4, wherein the wrist assembly is configured to tilt at the hinge joint to fold the spread out laundry article.

6. The system of claim 1, wherein the controller is further configured to identify, based on the received signal, at least one of a seam, a corner, and one or more sleeves of the laundry article, and instruct one or more of the at least three lifters to grasp the laundry article at the identified at least one of a seam, a corner, and one or more sleeves.

7. The system of claim 1, wherein the controller is further configured to be in operative communication with a memory comprising a neural network.

8. The system of claim 7, wherein the controller is configured to determine based processing on the received one or more output signals with the neural network whether the laundry article is spread out.

9. The system of claim 8, wherein the one or more output signals comprises one or more images.

10. The system of claim 8, wherein the controller is configured to determine, based on processing the received one or more output signals with the neural network, an article type and one or more features of the laundry article.

11. The system of claim 10, wherein the one or more features are indicative of at least one of a position and orientation of the article relative to the two or more sensors, a topology of the laundry article, one or more edges of the laundry article, and one or more corners of the laundry article.

12. The system of claim 8, wherein the neural network comprises a trained classifier configured to generate a descriptor indicative of trained class including at least one of spread out and not spread out.

13. The system of claim 12, wherein the trained classifier comprises a plurality of classes trained on images of at least one of a plurality of article types and sizes of a plurality of laundry articles.

14. The system of claim 12, wherein the controller is configured to determine, based processing on the received one or more output signals with the neural network, the laundry article is an open front shirt.

15. The system of claim 14, wherein the controller is further configured to determine, prior to instructing one or more of the at least three lifters to folding the laundry article, an orientation of a front and back of the open front shirt relative to the two or more sensors, and instruct the at least two engaged ones the at least three lifters to lay flat the folded laundry article onto the surface with the open front shirt at least one of face down and face up.

16. A method of folding an open front garment comprising:

instructing two or more lifters of at least three lifters disposed about a surface to engage at least one of a corner, a seam, an edge, and a sleeve of an open front garment hoisted above the surface by one or more of the at least three lifters, the at least three lifters being instructed by a controller in operable communication with the at least three lifters, determining at the controller, based on one or more received sensors signals output by two or more sensors configured to detect the open front garment on and above the surface, an orientation of the hoisted open front garment relative to the two or more sensors; and instructing at least two of the two or more engaged lifters to close an open front of the hoisted open front garment.

17. The method of claim 16, further comprising instructing three or more engaged lifters to lower the closed open front garment flat onto the surface in a preferred orientation comprising one face up or face down.

18. The method of claim 16, wherein the at least three lifters each comprise a gripper disposed on a hinged wrist, and wherein closing the open front of the hoisted open front garment comprises bending the hinged wrist of one or more engaged grippers.

19. The method of claim 16, further comprising, prior to closing the open front, instructing two or more of the at least three lifters to orient the hoisted open front garment at least one of sideways to the surface and sleeves dangling down.

20. The method of claim 16, wherein determining the orientation of the hoisted open front garment comprises determining the open front garment is at least one of right side up, sideways to the surface, and having an open front facing toward or away from one or more available lifters of the at least three lifters.

21. The method of claim 20, wherein the controller is in operative communication with a memory comprising a neural network comprising a trained classifier configured to generate a descriptor being one of a plurality of trained classes comprising at least one of orientation, article type, and open front direction toward or away from one or more available lifters.

22. The method of claim 21, wherein the controller is configured to receive a descriptor output from the trained classifier, and an instructed next action being based on one of a plurality of trained classes.

23. The method of claim 22, wherein the plurality of trained classes are manually tagged on training data comprising a plurality of images of known classes of articles, the images being ascertained by the two or more sensors.

24. The method of claim 23 wherein the two or more sensors comprise stationary sensors collocated with two or more corresponding ones of the at least three lifters and comprising overlapping fields of view trained on a volume of space above the surface within which the three or more lifters move to reposition the open front garment.

25. The method of claim 23, wherein the plurality of images of the training data comprises at least one of a 2-D camera image and a 3-D point cloud sensor image.

* * * * *